United States Patent
Lee et al.

(10) Patent No.: US 12,323,433 B2
(45) Date of Patent: Jun. 3, 2025

(54) ELECTRONIC DEVICE FOR TRANSMITTING AND/OR RECEIVING IDENTITY INFORMATION AND OPERATING METHOD THEREOF

(71) Applicant: SAMSUNG ELECTRONICS CO., LTD., Gyeonggi-do (KR)

(72) Inventors: Gyujin Lee, Gyeonggi-do (KR); Suhyun Kim, Gyeonggi-do (KR); Yunsik Bae, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 328 days.

(21) Appl. No.: 17/950,939

(22) Filed: Sep. 22, 2022

(65) Prior Publication Data

US 2023/0091254 A1 Mar. 23, 2023

Related U.S. Application Data

(63) Continuation of application No. PCT/KR2022/013815, filed on Sep. 15, 2022.

(30) Foreign Application Priority Data

Sep. 23, 2021 (KR) .................. 10-2021-0125526

(51) Int. Cl.
H04L 9/40 (2022.01)
(52) U.S. Cl.
CPC ............ H04L 63/123 (2013.01); H04L 63/06 (2013.01)
(58) Field of Classification Search
None
See application file for complete search history.

(56) References Cited

U.S. PATENT DOCUMENTS 9,756,461 B1 9/2017 Hu et al.
10,645,575 B2 5/2020 Amin et al.
(Continued)

FOREIGN PATENT DOCUMENTS

KR 20130111165 A 10/2013
KR 20180115998 A 10/2018

OTHER PUBLICATIONS

International Search Report with English Translation and Written Opinion for International Application No. PCT/KR2022/013815; International Filing Date Sep. 15, 2022; Date of Mailing Dec. 13, 2022; 11 pages.

*Primary Examiner* — Christopher B Robinson
*Assistant Examiner* — Tania M Pena-Santana
(74) *Attorney, Agent, or Firm* — CANTOR COLBURN LLP

(57) ABSTRACT

According to an embodiment, an electronic device may include a communication circuit and at least one processor operatively connected to the communication circuit, and the at least one processor may be configured to connect, via the communication circuit, a communication with a first external electronic device, receive, from the first external electronic device via the communication circuit, a first packet requesting generation of a temporary identity resolving key (IRK) of the electronic device by a second external electronic device, generate a temporary IRK, set a validity period for the temporary IRK, and transmit, to the first external electronic device via the communication circuit, a second packet including the temporary IRK and the validity period for the temporary IRK.

17 Claims, 15 Drawing Sheets

(56) References Cited

U.S. PATENT DOCUMENTS

| | | | |
|---|---|---|---|
| 10,855,643 B2 | 12/2020 | Zhang et al. | |
| 11,115,818 B2 | 9/2021 | Bradley et al. | |
| 2013/0259230 A1* | 10/2013 | Polo | H04L 63/0272 |
| | | | 380/270 |
| 2016/0099936 A1 | 4/2016 | Enke | |
| 2017/0093856 A1 | 3/2017 | Alexandru et al. | |
| 2018/0007555 A1 | 1/2018 | Ziv et al. | |
| 2018/0198752 A1 | 7/2018 | Zhang et al. | |
| 2019/0108324 A1 | 4/2019 | Graube et al. | |
| 2019/0356478 A1 | 11/2019 | Young et al. | |
| 2021/0028928 A1* | 1/2021 | Hariharan | H04L 63/10 |
| 2021/0127262 A1* | 4/2021 | Park | H04W 12/50 |
| 2021/0167872 A1* | 6/2021 | Nagata | H04W 8/005 |
| 2022/0343705 A1* | 10/2022 | Verma | G07C 9/00309 |

\* cited by examiner

ELECTRONIC DEVICE FOR TRANSMITTING AND/OR RECEIVING IDENTITY INFORMATION AND OPERATING METHOD THEREOF

CROSS-REFERENCE TO RELATED APPLICATION(S)

This application is a bypass continuation application of International Application No. PCT/KR2022/013815, which was filed on Sep. 15, 2022, and is based on and claims priority to Korean Patent Application No. 10-2021-0125526, which was filed in the Korean Intellectual Property Office on Sep. 23, 2021, the disclosures of which are incorporated by reference herein in their entireties.

BACKGROUND

1. Field

An embodiment of the disclosure relate to an electronic device for transmitting and/or receiving identification information and an operating method thereof.

2. Description of Related Art

Recently, with the development of an information communication technology, various wireless communication technologies and various services have been developed. In particular, a Bluetooth™ scheme, e.g., a Bluetooth™ low energy (BLE) scheme, which is one of short-range communication schemes has been actively used, and in the BLE scheme, low capacity data may be transmitted and/or received with low power in a frequency band of about 2.4 GHz.

Electronic devices using the BLE scheme may operate in an active mode during time for performing a connection operation, a data transmission operation, and/or a data reception operation between the electronic devices, and operate in a sleep mode during other times. So, power consumption of the electronic devices using the BLE scheme may be reduced compared to when a legacy Bluetooth™ scheme is used. Accordingly, the BLE scheme may be mainly used in electronic devices in which power supply is limited, such as a health care device, a sensor device, or a wearable device (e.g., an earphone, a smart watch, or smart glasses).

Meanwhile, in a wireless communication network, for avoiding tracking from an attacker, a BLE privacy process using a resolvable private address (RPA) which is generated using an identity resolving key (IRK) indicating identity of an electronic device and a random value, a BLE pairing process in which electronic devices may share each other's IRKs, and an IRK process in which the electronic device shares an IRK of another electronic device which the electronic device has recognized in advance with still another electronic device have been proposed.

In a wireless communication network, an IRK is identification information indicating identity of an electronic device, and the IRK is very important for security of the entire wireless network. In the wireless communication network, a BLE pairing process is a process in which security authentication is also performed, and IRKs of electronic devices may be shared with each other through the BLE pairing process.

As such, in the current wireless communication network, the IRKs of the electronic devices are shared through the BLE pairing process, but if a Bluetooth™ IRK is exposed, a security level for the Bluetooth™ IRK may not be guaranteed. In addition, if the Bluetooth™ IRK is exposed, a security level for not only the Bluetooth™ IRK but also an RPA which is generated based on the Bluetooth™ IRK may not be guaranteed, so a security level for a BLE communication which is based on a BLE scheme in the wireless communication network may not be guaranteed either.

SUMMARY

An embodiment of the disclosure may provide an electronic device for transmitting and/or receiving identification information and an operating method thereof in a wireless communication network.

An embodiment of the disclosure may provide an electronic device for transmitting and/or receiving identification information based on whether a BLE pairing process has been performed and an operating method thereof in a wireless communication network.

According to an embodiment of the disclosure, an electronic device may include a communication circuit and at least one processor operatively connected to the communication circuit.

According to an embodiment of the disclosure, the at least one processor may be configured to connect, via the communication circuit, a communication with a first external electronic device.

According to an embodiment of the disclosure, the at least one processor may be configured to receive, from the first external electronic device via the communication circuit, a first packet requesting generation of a temporary identity resolving key (IRK) of the electronic device by a second external electronic device.

According to an embodiment of the disclosure, the at least one processor may be configured to generate a temporary IRK.

According to an embodiment of the disclosure, the at least one processor may be configured to set a validity period for the temporary IRK.

According to an embodiment of the disclosure, the at least one processor may be configured to transmit, to the first external electronic device via the communication circuit, a second packet including the temporary IRK and the validity period for the temporary IRK.

According to an embodiment of the disclosure, an electronic device may include a communication circuit, and at least one processor operatively connected to the communication circuit.

According to an embodiment of the disclosure, the at least one processor may be configured to connect, via the communication circuit, a communication with a first external electronic device and a second external electronic device.

According to an embodiment of the disclosure, the at least one processor may be configured to receive, from the first external electronic device via the communication circuit, a first packet requesting generation of a temporary identity resolving key (IRK) of the second external electronic device.

According to an embodiment of the disclosure, the at least one processor may be configured to transmit, to the second external electronic device via the communication circuit, a second packet requesting generation of the temporary IRK by the first external electronic device.

According to an embodiment of the disclosure, the at least one processor may be configured to receive, from the second external electronic device via the communication circuit, a third packet including the temporary IRK of the second external electronic device and a validity period for the temporary IRK.

According to an embodiment of the disclosure, the at least one processor may be configured to transmit, to the first external electronic device via the communication circuit, a fourth packet including the temporary IRK and the validity period for the temporary IRK.

According to an embodiment of the disclosure, an electronic device may include a communication circuit, and at least one processor operatively connected to the communication circuit.

According to an embodiment of the disclosure, the at least one processor may be configured to connect, via the communication circuit, a communication with a first external electronic device.

According to an embodiment of the disclosure, the at least one processor may be configured to transmit, to the first external electronic device via the communication circuit, a first packet requesting generation of a temporary identity resolving key (IRK) of a second external electronic device.

According to an embodiment of the disclosure, the at least one processor may be configured to receive, from the first external electronic device via the communication circuit, a second packet including the temporary IRK of the second external electronic device and a validity period for the temporary IRK.

According to an embodiment of the disclosure, an operating method of an electronic device may include connecting a communication with a first external electronic device.

According to an embodiment of the disclosure, the operating method may further include receiving, from the first external electronic device, a first packet requesting generation of a temporary identity resolving key (IRK) of the electronic device by a second external electronic device.

According to an embodiment of the disclosure, the operating method may further include generating a temporary IRK.

According to an embodiment of the disclosure, the operating method may further include setting a validity period for the temporary IRK.

According to an embodiment of the disclosure, the operating method may further include transmitting, to the first external electronic device, a second packet including the temporary IRK and the validity period for the temporary IRK.

According to an embodiment of the disclosure, an operating method of an electronic device may include connecting a communication with a first external electronic device and a second external electronic device.

According to an embodiment of the disclosure, the operating method may further include receiving, from the first external electronic device, a first packet requesting generation of a temporary identity resolving key (IRK) of the second external electronic device.

According to an embodiment of the disclosure, the operating method may further include transmitting, to the second external electronic device, a second packet requesting generation of the temporary IRK by the first external electronic device.

According to an embodiment of the disclosure, the operating method may further include receiving, from the second external electronic device, a third packet including the temporary IRK of the second external electronic device and a validity period for the temporary IRK.

According to an embodiment of the disclosure, the operating method may further include transmitting, to the first external electronic device, a fourth packet including the temporary IRK and the validity period for the temporary IRK.

According to an embodiment of the disclosure, an operating method of an electronic device may include connecting a communication with a first external electronic device.

According to an embodiment of the disclosure, the operating method may further include transmitting, to the first external electronic device, a first packet requesting generation of a temporary identity resolving key (IRK) of a second external electronic device.

According to an embodiment of the disclosure, the operating method may further include receiving, from the first external electronic device, a second packet including the temporary IRK of the second external electronic device and a validity period for the temporary IRK.

According to an embodiment, a non-transitory computer readable storage medium may include one or more programs, the one or more programs comprising instructions configured to, when executed by at least one processor of an electronic device, cause the electronic device to, connect a communication with a first external electronic device.

According to an embodiment, the instructions may be further configured to cause the electronic device to, receive, from the first external electronic device, a first packet requesting generation of a temporary identity resolving key (IRK) of the electronic device by a second external electronic device.

According to an embodiment, the instructions may be further configured to cause the electronic device to, generate a temporary IRK.

According to an embodiment, the instructions may be further configured to cause the electronic device to, set a validity period for the temporary IRK.

According to an embodiment, the instructions may be further configured to cause the electronic device to, transmit, to the first external electronic device, a second packet including the temporary IRK and the validity period for the temporary IRK.

According to an embodiment, a non-transitory computer readable storage medium may include one or more programs, the one or more programs comprising instructions configured to, when executed by at least one processor of an electronic device, cause the electronic device to, connect a communication with a first external electronic device and a second external electronic device.

According to an embodiment, the instructions may be further configured to cause the electronic device to, receive, from the first external electronic device, a first packet requesting generation of a temporary identity resolving key (IRK) of the second external electronic device.

According to an embodiment, the instructions may be further configured to cause the electronic device to, transmit, to the second external electronic device, a second packet requesting generation of the temporary IRK by the first external electronic device.

According to an embodiment, the instructions may be further configured to cause the electronic device to, receive, from the second external electronic device, a third packet including the temporary IRK of the second external electronic device and a validity period for the temporary IRK.

According to an embodiment, the instructions may be further configured to cause the electronic device to, transmit, to the first external electronic device, a fourth packet including the temporary IRK and the validity period for the temporary IRK.

According to an embodiment, a non-transitory computer readable storage medium may include one or more programs, the one or more programs comprising instructions configured to, when executed by at least one processor of an electronic device, cause the electronic device to, connect a communication with a first external electronic device.

According to an embodiment, the instructions may be further configured to cause the electronic device to, transmit, to the first external electronic device, a first packet requesting generation of a temporary identity resolving key (IRK) of a second external electronic device.

According to an embodiment, the instructions may be further configured to cause the electronic device to, receive, from the first external electronic device, a second packet including the temporary IRK of the second external electronic device and a validity period for the temporary IRK.

DETAILED DESCRIPTION

Figure 1:
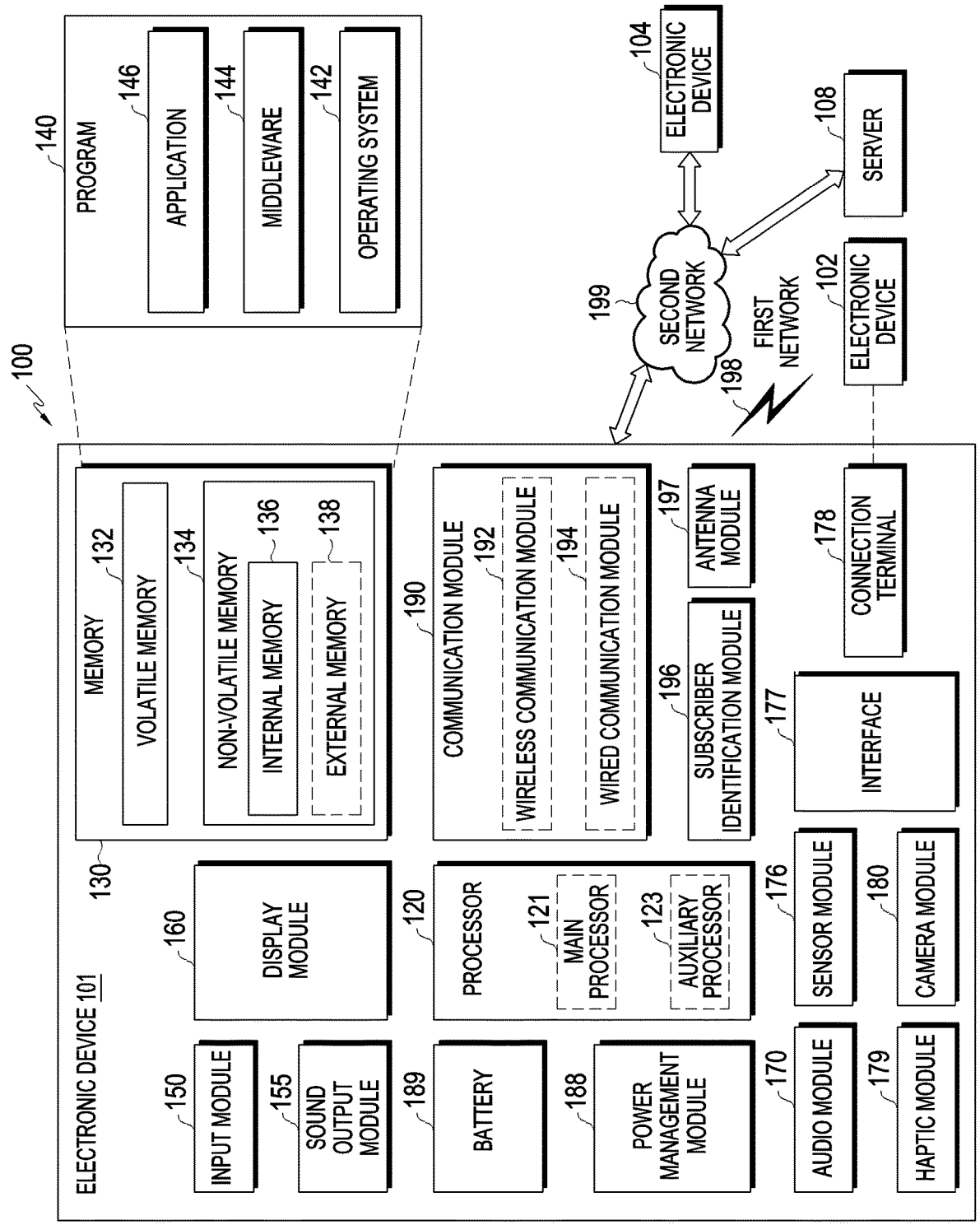
FIG. 1 is a block diagram schematically illustrating an electronic device within a network environment according to an embodiment.

Hereinafter, an embodiment of the disclosure will be described in detail with reference to the accompanying drawings. In the following description of an embodiment of the disclosure, a detailed description of relevant known functions or configurations incorporated herein will be omitted when it is determined that the description may make the subject matter of an embodiment of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe an embodiment, and are not intended to limit the disclosure. Alternatively, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Alternatively, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

Alternatively, a singular expression used herein may include a plural expression unless they are definitely different in the context. As used herein, such an expression as "comprises" or "include", or the like should not be interpreted to necessarily include all elements or all operations described in the specification, and should be interpreted to be allowed to exclude some of them or further include additional elements or operations.

Alternatively, the terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, an embodiment of the disclosure will be described in detail with reference to the accompanying drawings. Regardless of drawing signs, the same or like elements are provided with the same reference numeral, and a repeated description thereof will be omitted. Alternatively, in describing an embodiment of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

Hereinafter, a terminal will be described in an embodiment of the disclosure, but the terminal may be referred to as an electronic device, a mobile station, a mobile equipment (ME), a user equipment (UE), a user terminal (UT), a subscriber station (SS), a wireless device, a handheld device, and an access terminal (AT). Alternatively, in an embodiment of the disclosure, the terminal may be a device having a communication function such as, for example, a mobile phone, a personal digital assistant (PDA), a smart phone, a wireless MODEM, and a notebook.

In a detailed description of an embodiment of the disclosure, a standard specified by Bluetooth™ special interest group (SIG) is referred to, but the main subject of the disclosure can be somewhat modified and applied to other communication systems having a similar technical background without departing from the scope of the disclosure, and the modifications can be made on the basis of determination of those skilled in the art.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one of the components (e.g., the connecting terminal 178) may be omitted from the electronic device 101, or one or more other components may be added in the electronic device 101. In an embodiment, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to an embodiment and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or two or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Meanwhile, Bluetooth™ SIG has proposed a Bluetooth™ low energy (BLE) scheme, and in the BLE scheme, data may be transmitted and/or received with low power.

Figure 2:
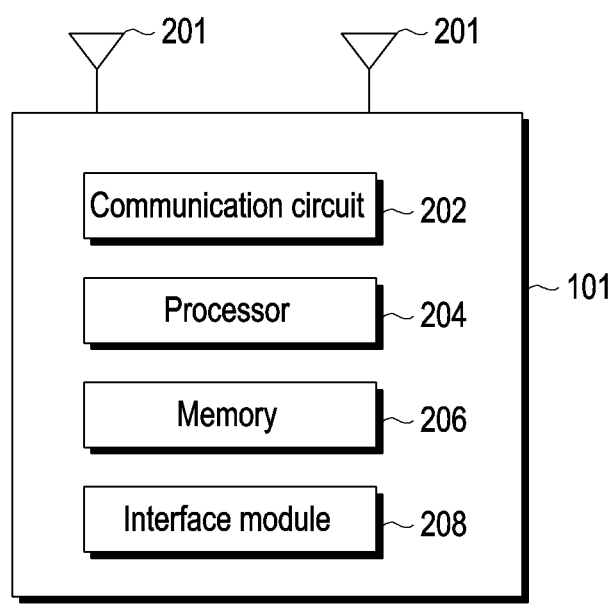
FIG. 2 is a block diagram of an electronic device according to an embodiment.

FIG. 2 is a block diagram of an electronic device 101 according to an embodiment.

Referring to FIG. 2, an electronic device (e.g., an electronic device 101 in FIG. 1) may be a device implementing a BLE scheme.

The electronic device 101 may include a communication circuit 202 (e.g., a communication module 190 in FIG. 1) which transmits and receives signals with an external electronic device (e.g., an electronic device 102 or 104 in FIG. 1), for example, a peer device by using one or more antennas 201.

The electronic device 101 may include a processor 204 (e.g., a processor 120 in FIG. 1) which may be implemented in one or more single-core processors or one or more multi-core processors, and a memory 206 (e.g., a memory 130 in FIG. 1) which stores instructions for an operation of the electronic device 101.

The electronic device 101 may include an interface module 208 (e.g., an interface 177 in FIG. 1) which provides a wired and/or wireless interface for communicating with components outside a network. At least a portion of the one or more antennas 201, the communication circuit 202, or the interface module 208 may be implemented as, for example, at least a portion of the communication module 190 and the antenna module 197 in FIG. 1.

According to an embodiment, the electronic device 101 may include a plurality of communication circuits, one of the plurality of communication circuits may be a communication circuit which is based on a Wi-Fi scheme, and another of the plurality of communication circuits may be a communication circuit which is based on a Bluetooth™ scheme, e.g., a BLE scheme.

According to an embodiment, the plurality of communication circuits may include a communication circuit 202, and the communication circuit 202 may be a communication circuit which is based on the Wi-Fi scheme or a communication circuit which is based on the BLE scheme.

According to an embodiment, the electronic device 101 does not separately include a communication circuit which is based on the Wi-Fi scheme and a communication circuit which is based on the BLE scheme, and may include one communication circuit capable of supporting both the Wi-Fi scheme and the BLE scheme. According to an embodiment, the one communication circuit capable of supporting both the Wi-Fi scheme and the BLE scheme may be the communication circuit 202.

According to an embodiment of the disclosure, an electronic device (e.g., a first electronic device 601 in FIG. 6, a first electronic device 701 in FIG. 7, a first electronic device 1601 in FIG. 16, or a first electronic device 1801 in FIG. 18) may include a communication circuit 202, and at least one processor 204 operatively connected to the communication circuit 202.

Figure 6:
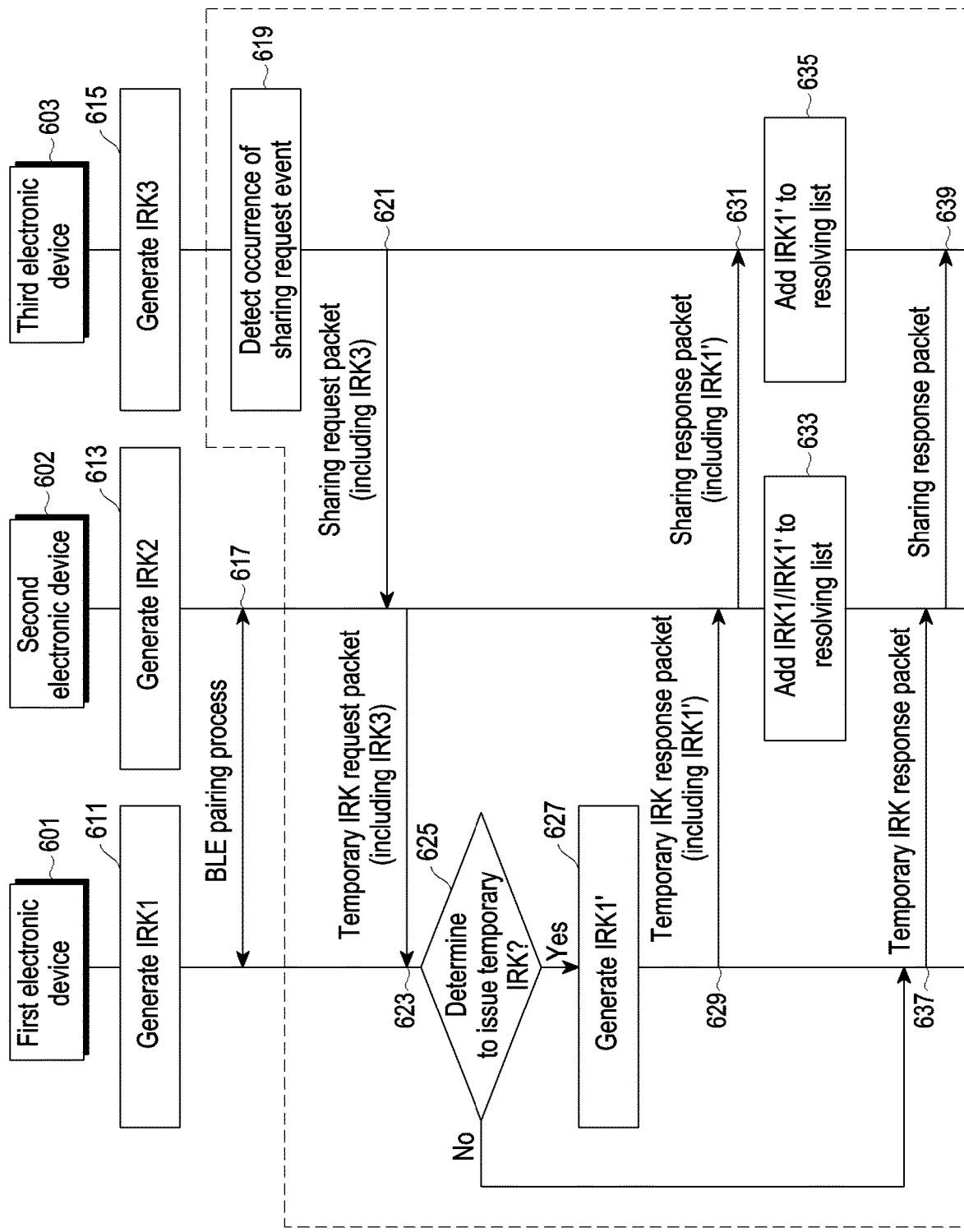
FIG. 6 is a diagram schematically illustrating an example of an IRK sharing process in a wireless communication network according to an embodiment.
Figure 7:
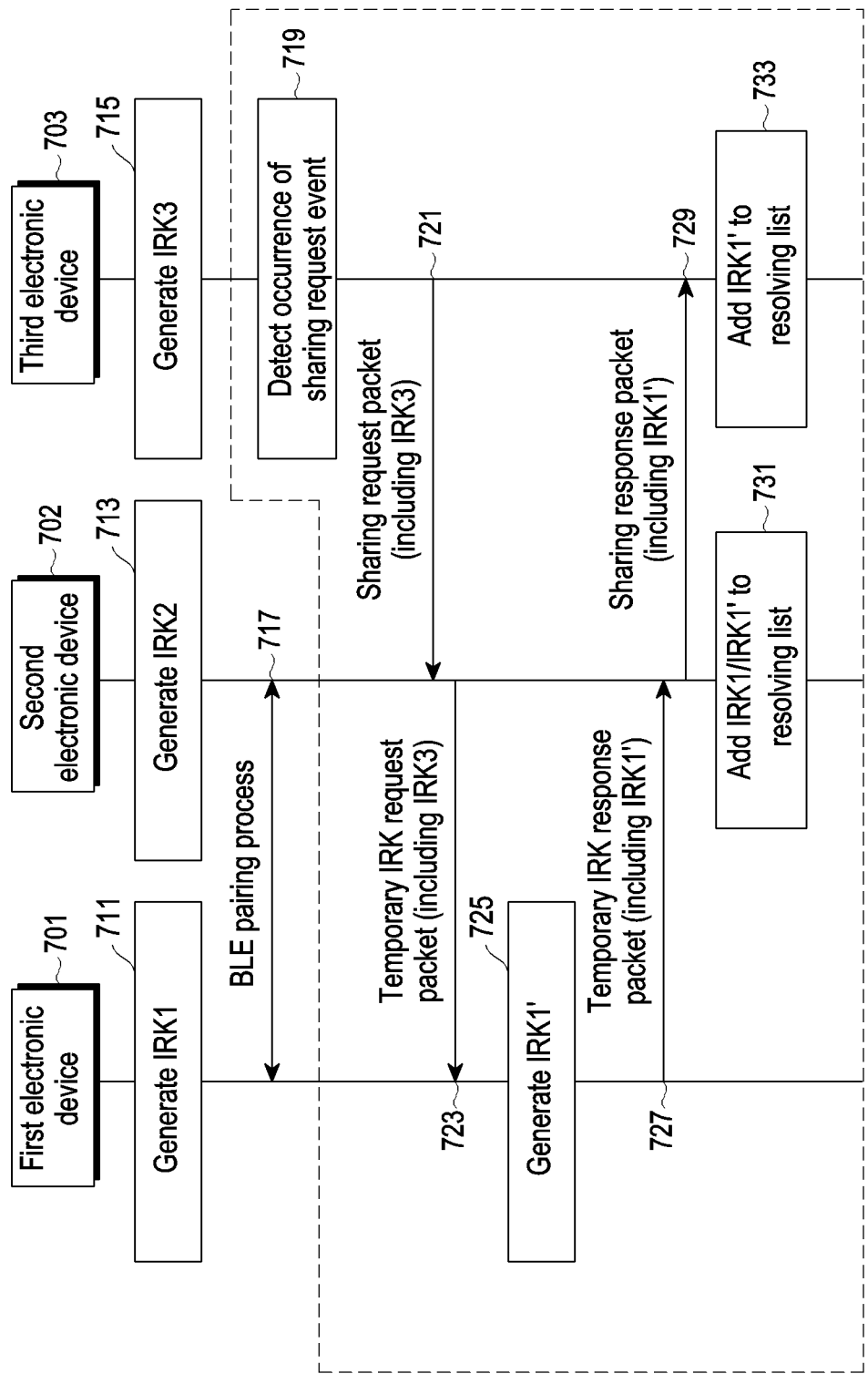
FIG. 7 is a diagram schematically illustrating another example of an IRK sharing process in a wireless communication network according to an embodiment.
Figure 16:
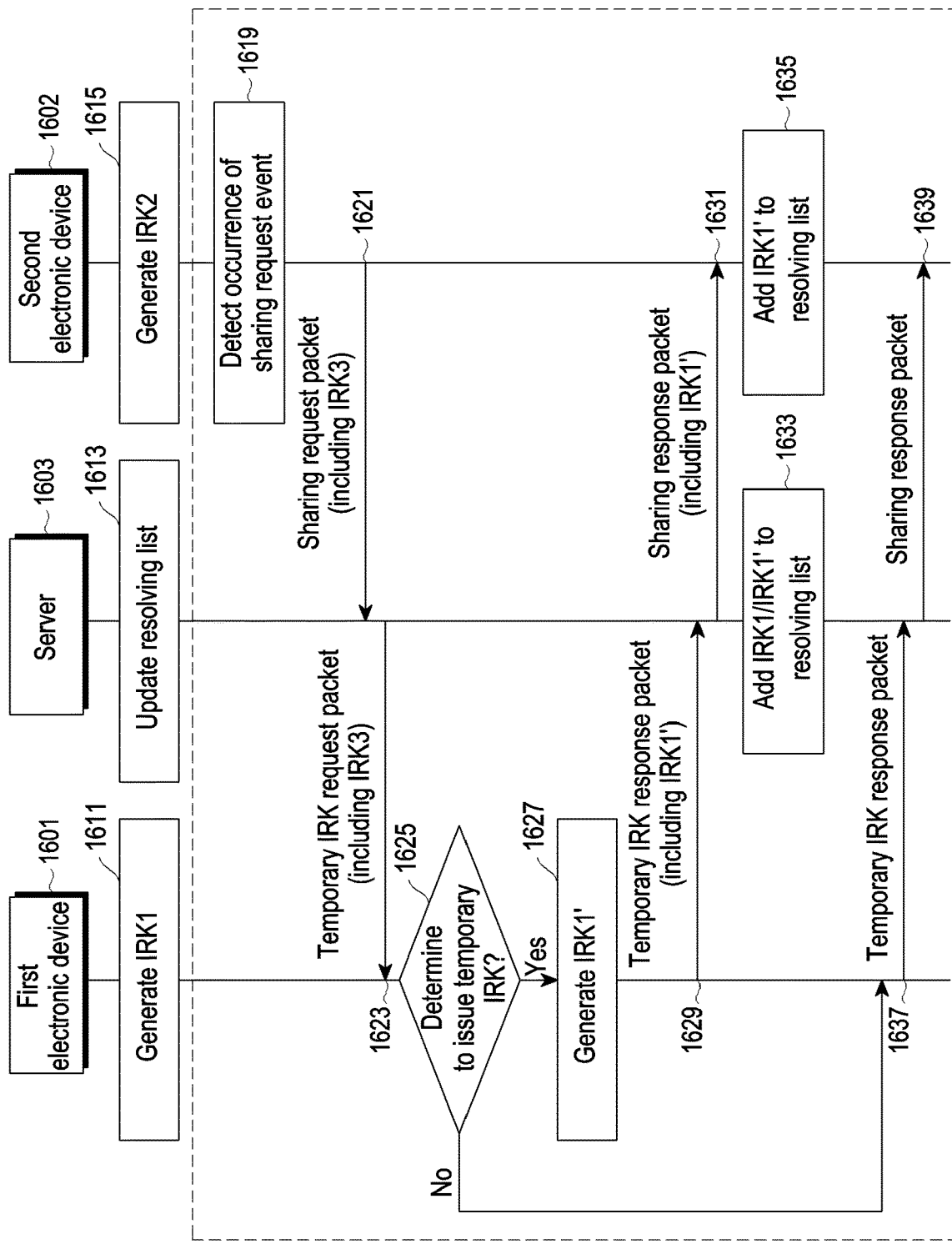
FIG. 16 is a diagram schematically illustrating still another example of an IRK sharing process in a wireless communication network according to an embodiment.
Figure 18:
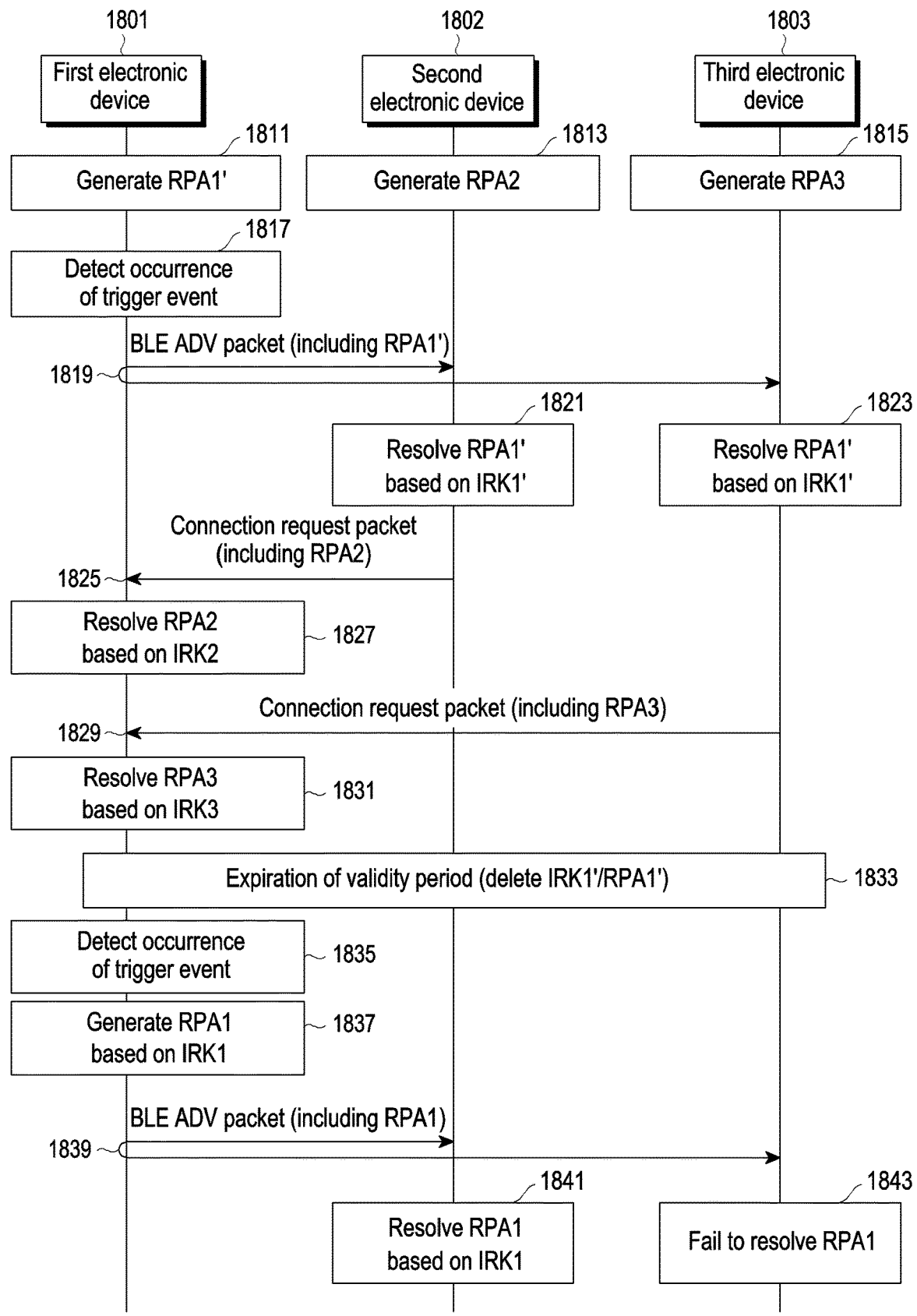
FIG. 18 is a diagram schematically illustrating an example of a BLE privacy process according to an embodiment.

According to an embodiment of the disclosure, the at least one processor 204 may be configured to connect, via the communication circuit 202, a communication with a first external electronic device (e.g., a second electronic device 602 in FIG. 6, a second electronic device 702 in FIG. 7, a server 1603 in FIG. 16, or a second electronic device 1802 in FIG. 18).

According to an embodiment of the disclosure, the at least one processor 204 may be further configured to receive, from the first external electronic device (e.g., the second electronic device 602 in FIG. 6, the second electronic device 702 in FIG. 7, the server 1603 in FIG. 16, or the second electronic device 1802 in FIG. 18) via the communication circuit 202, a first packet requesting generation of a temporary identity resolving key (IRK) of the electronic device (e.g., the first electronic device 601 in FIG. 6, the first electronic device 701 in FIG. 7, the first electronic device 1601 in FIG. 16, or the first electronic device 1801 in FIG. 18) by a second external electronic device (e.g., a third electronic device 603 in FIG. 6, a third electronic device 703 in FIG. 7, a second electronic device 1602 in FIG. 16, or a third electronic device 1803 in FIG. 18).

According to an embodiment of the disclosure, the at least one processor 204 may be further configured to generate a temporary IRK.

According to an embodiment of the disclosure, the at least one processor 204 may be further configured to set a validity period for the temporary IRK.

According to an embodiment of the disclosure, the at least one processor 204 may be further configured to transmit, to the first external electronic device (e.g., the second electronic device 602 in FIG. 6, the second electronic device 702 in FIG. 7, the server 1603 in FIG. 16, or the second electronic device 1802 in FIG. 18) via the communication circuit 202, a second packet including the temporary IRK and the validity period for the temporary IRK.

According to an embodiment of the disclosure, the at least one processor 204 may be configured to set the validity period for the temporary IRK based on a validity period for the temporary IRK which is included in the first packet and is requested by the second external electronic device (e.g., the third electronic device 603 in FIG. 6, the third electronic device 703 in FIG. 7, the second electronic device 1602 in FIG. 16, or the third electronic device 1803 in FIG. 18).

According to an embodiment of the disclosure, the at least one processor 204 may be further configured to, based on information, which is included in the first packet, related to an authority which the second external electronic device (e.g., the third electronic device 603 in FIG. 6, the third electronic device 703 in FIG. 7, the second electronic device 1602 in FIG. 16, or the third electronic device 1803 in FIG. 18) requests to have if the second external electronic device (e.g., the third electronic device 603 in FIG. 6, the third electronic device 703 in FIG. 7, the second electronic device 1602 in FIG. 16, or the third electronic device 1803 in FIG. 18) accesses the electronic device (e.g., the first electronic device 601 in FIG. 6, the first electronic device 701 in FIG. 7, the first electronic device 1601 in FIG. 16, or the first electronic device 1801 in FIG. 18), set an authority which the second external electronic device (e.g., the third electronic device 603 in FIG. 6, the third electronic device 703 in FIG. 7, the second electronic device 1602 in FIG. 16, or the third electronic device 1803 in FIG. 18) is permitted to have if the second external electronic device (e.g., the third electronic device 603 in FIG. 6, the third electronic device 703 in FIG. 7, the second electronic device 1602 in FIG. 16, or the third electronic device 1803 in FIG. 18) accesses the electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the second packet may further include information related to the authority which the second external electronic device (e.g., the third electronic device 603 in FIG. 6, the third electronic device 703 in FIG. 7, the second electronic device 1602 in FIG. 16, or the third electronic device 1803 in FIG. 18) is permitted to have if the second external electronic device (e.g., the third electronic device 603 in FIG. 6, the third electronic device 703 in FIG. 7, the second electronic device 1602 in FIG. 16, or the third electronic device 1803 in FIG. 18) accesses the electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the at least one processor 204 may be further configured to, based on a first address, which is included in the first packet, to be used for a communication with the electronic device (e.g., the first electronic device 601 in FIG. 6, the first electronic device 701 in FIG. 7, the first electronic device 1601 in FIG. 16, or the first electronic device 1801 in FIG. 18) by the second external electronic device (e.g., the third electronic device 603 in FIG. 6, the third electronic device 703 in FIG. 7, the second electronic device 1602 in FIG. 16, or the third electronic device 1803 in FIG. 18), set a second address to be used for the communication with the electronic device (e.g., the first electronic device 601 in FIG. 6, the first electronic device 701 in FIG. 7, the first electronic device 1601 in FIG. 16, or the first electronic device 1801 in FIG. 18) by the second external electronic device (e.g., the third electronic device 603 in FIG. 6, the third electronic device 703 in FIG. 7, the second electronic device 1602 in FIG. 16, or the third electronic device 1803 in FIG. 18).

According to an embodiment of the disclosure, the second packet may further include the second address to be used for the communication with the electronic device (e.g., the first electronic device 601 in FIG. 6, the first electronic device 701 in FIG. 7, the first electronic device 1601 in FIG. 16, or the first electronic device 1801 in FIG. 18) by the second external electronic device (e.g., the third electronic device 603 in FIG. 6, the third electronic device 703 in FIG. 7, the second electronic device 1602 in FIG. 16, or the third electronic device 1803 in FIG. 18).

According to an embodiment of the disclosure, the at least one processor 204 may be further configured to detect that a trigger event triggering advertisement packet transmission occurs.

According to an embodiment of the disclosure, the at least one processor 204 may be further configured to generate an advertisement packet including a resolvable private address (RPA) generated based on the temporary IRK.

According to an embodiment of the disclosure, the at least one processor 204 may be further configured to transmit, via the communication circuit 202, the advertisement packet.

According to an embodiment of the disclosure, the at least one processor 204 may be further configured to delete the temporary IRK based on identifying that the validity period for the temporary IRK has expired.

According to an embodiment of the disclosure, an electronic device (e.g., a second electronic device 602 in FIG. 6, a second electronic device 702 in FIG. 7, a server 1603 in FIG. 16, or a second electronic device 1802 in FIG. 18) may include a communication circuit 202, and at least one processor 204 operatively connected to the communication circuit 202.

According to an embodiment of the disclosure, the at least one processor 204 may be further configured to the at least one processor 204 may be configured to connect, via the communication circuit 202, a communication with a first external electronic device (e.g., a third electronic device 603 in FIG. 6, a third electronic device 703 in FIG. 7, a second electronic device 1602 in FIG. 16, or a third electronic device 1803 in FIG. 18) and a second external electronic device (e.g., a first electronic device 601 in FIG. 6, a first electronic device 701 in FIG. 7, a first electronic device 1601 in FIG. 16, or a first electronic device 1801 in FIG. 18).

According to an embodiment of the disclosure, the at least one processor 204 may be further configured to receive, from the first external electronic device (e.g., the third electronic device 603 in FIG. 6, the third electronic device 703 in FIG. 7, the second electronic device 1602 in FIG. 16, or the third electronic device 1803 in FIG. 18) via the communication circuit 202, a first packet requesting generation of a temporary identity resolving key (IRK) of the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the at least one processor 204 may be further configured to transmit, to the second external electronic device (e.g., the first electronic device 601 in FIG. 6, the first electronic device 701 in FIG. 7, the first electronic device 1601 in FIG. 16, or the first electronic device 1801 in FIG. 18) via the communication circuit 202, a second packet requesting generation of the temporary IRK by the first external electronic device (e.g., the third electronic device 603 in FIG. 6, the third electronic device 703 in FIG. 7, the second electronic device 1602 in FIG. 16, or the third electronic device 1803 in FIG. 18).

According to an embodiment of the disclosure, the at least one processor 204 may be further configured to receive, from the second external electronic device (e.g., the first electronic device 601 in FIG. 6, the first electronic device 701 in FIG. 7, the first electronic device 1601 in FIG. 16, or the first electronic device 1801 in FIG. 18) via the communication circuit 202, a third packet including the temporary IRK of the second external electronic device (e.g., the first electronic device 601 in FIG. 6, the first electronic device 701 in FIG. 7, the first electronic device 1601 in FIG. 16, or the first electronic device 1801 in FIG. 18) and a validity period for the temporary IRK.

According to an embodiment of the disclosure, the at least one processor 204 may be further configured to transmit, to the first external electronic device (e.g., the third electronic device 603 in FIG. 6, the third electronic device 703 in FIG. 7, the second electronic device 1602 in FIG. 16, or the third electronic device 1803 in FIG. 18) via the communication circuit 202, a fourth packet including the temporary IRK and the validity period for the temporary IRK.

According to an embodiment of the disclosure, the electronic device (e.g., the second electronic device 602 in FIG. 6, the second electronic device 702 in FIG. 7, the server 1603 in FIG. 16, or the second electronic device 1802 in FIG. 18) may further include a memory 206, and the at least one processor 204 may be further configured to map an IRK of the second external electronic device (e.g., the first electronic device 601 in FIG. 6, the first electronic device 701 in FIG. 7, the first electronic device 1601 in FIG. 16, or the first electronic device 1801 in FIG. 18) and the temporary IRK and store a mapped result in the memory 206.

According to an embodiment of the disclosure, the at least one processor 204 may be further configured to receive, via the communication circuit 202, an advertisement packet, and in response to identifying that a resolvable private address (RPA) included in the advertisement packet is resolvable based on the temporary IRK, identify that the advertisement packet is an advertisement packet transmitted by the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the at least one processor 204 may be further configured to delete the temporary IRK based on identifying that the validity period for the temporary IRK has expired.

According to an embodiment of the disclosure, the validity period for the temporary IRK included in the third packet may be set based on a validity period for the temporary IRK requested by the first external electronic device (e.g., the third electronic device 603 in FIG. 6, the third electronic device 703 in FIG. 7, the second electronic device 1602 in FIG. 16, or the third electronic device 1803 in FIG. 18) included in the first packet.

According to an embodiment of the disclosure, the third packet may further include information related to an authority which the first external electronic device (e.g., the third electronic device 603 in FIG. 6, the third electronic device 703 in FIG. 7, the second electronic device 1602 in FIG. 16, or the third electronic device 1803 in FIG. 18) is permitted to have if the first external electronic device (e.g., the third electronic device 603 in FIG. 6, the third electronic device 703 in FIG. 7, the second electronic device 1602 in FIG. 16, or the third electronic device 1803 in FIG. 18) accesses the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the information may be set based on information, which is included in the first packet, related to authority which the first external electronic device (e.g., the third electronic device 603 in FIG. 6, the third electronic device 703 in FIG. 7, the second electronic device 1602 in FIG. 16, or the third electronic device 1803 in FIG. 18) requests to have if the first external electronic device (e.g., the third electronic device 603 in FIG. 6, the third electronic device 703 in FIG. 7, the second electronic device 1602 in FIG. 16, or the third electronic device 1803 in FIG. 18) accesses the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the third packet may further include a first address to be used by the first external electronic device (e.g., the third electronic device 603 in FIG. 6, the third electronic device 703 in FIG. 7, the second electronic device 1602 in FIG. 16, or the third electronic device 1803 in FIG. 18) for a communication with the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the first address may be set based on a second address, which is included in the first packet, to be used by the first external electronic device (e.g., the third electronic device 603 in FIG. 6, the third electronic device 703 in FIG. 7, the second electronic device 1602 in FIG. 16, or the third electronic device 1803 in FIG. 18) for the communication with the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, an electronic device (e.g., a third electronic device 603 in FIG. 6, a third electronic device 703 in FIG. 7, a second electronic device 1602 in FIG. 16, or a third electronic device 1803 in FIG. 18) may include a communication circuit 202, and at least one processor 204 operatively connected to the communication circuit 202.

According to an embodiment of the disclosure, the at least one processor 204 may be configured to connect, via the communication circuit 202, a communication with a first external electronic device (e.g., a second electronic device 602 in FIG. 6, a second electronic device 702 in FIG. 7, a server 1603 in FIG. 16, or a second electronic device 1802 in FIG. 18).

According to an embodiment of the disclosure, the at least one processor 204 may be further configured to transmit, to the first external electronic device (e.g., the second electronic device 602 in FIG. 6, the second electronic device 702 in FIG. 7, the server 1603 in FIG. 16, or the second electronic device 1802 in FIG. 18) via the communication circuit 202, a first packet requesting generation of a temporary identity resolving key (IRK) of a second external electronic device (e.g., a first electronic device 601 in FIG. 6, a first electronic device 701 in FIG. 7, a first electronic device 1601 in FIG. 16, or a first electronic device 1801 in FIG. 18).

According to an embodiment of the disclosure, the at least one processor 204 may be further configured to receive, from the first external electronic device (e.g., the second electronic device 602 in FIG. 6, the second electronic device 702 in FIG. 7, the server 1603 in FIG. 16, or the second electronic device 1802 in FIG. 18) via the communication circuit 202, a second packet including the temporary IRK of the second external electronic device (e.g., the first electronic device 601 in FIG. 6, the first electronic device 701 in FIG. 7, the first electronic device 1601 in FIG. 16, or the first electronic device 1801 in FIG. 18) and a validity period for the temporary IRK.

According to an embodiment of the disclosure, the at least one processor 204 may be further configured to receive, via the communication circuit 202, an advertisement packet, and in response to identifying that a resolvable private address (RPA) included in the advertisement packet is resolvable based on the temporary IRK, identify that the advertisement packet is an advertisement packet transmitted by the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the at least one processor 204 may be further configured to delete the temporary IRK based on identifying that the validity period for the temporary IRK has expired.

According to an embodiment of the disclosure, the validity period for the temporary IRK may be set based on a validity period for the temporary IRK requested by the electronic device (e.g., the third electronic device 603 in FIG. 6, the third electronic device 703 in FIG. 7, the second electronic device 1602 in FIG. 16, or the third electronic device 1803 in FIG. 18) included in the first packet.

According to an embodiment of the disclosure, the second packet may further include information related to an authority which the electronic device (e.g., the third electronic device 603 in FIG. 6, the third electronic device 703 in FIG. 7, the second electronic device 1602 in FIG. 16, or the third electronic device 1803 in FIG. 18) is permitted to have if the electronic device (e.g., the third electronic device 603 in FIG. 6, the third electronic device 703 in FIG. 7, the second electronic device 1602 in FIG. 16, or the third electronic device 1803 in FIG. 18) accesses the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the information may be set based on information, which is included in the first packet, related to an authority which the electronic device (e.g., the third electronic device 603 in FIG. 6, the third electronic device 703 in FIG. 7, the second electronic device 1602 in FIG. 16, or the third electronic device 1803 in FIG. 18) requests to have if the electronic device (e.g., the third electronic device 603 in FIG. 6, the third electronic device 703 in FIG. 7, the second electronic device 1602 in FIG. 16, or the third electronic device 1803 in FIG. 18) accesses the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the second packet may further include a first address to be used by the electronic device (e.g., the third electronic device 603 in FIG. 6, the third electronic device 703 in FIG. 7, the second electronic device 1602 in FIG. 16, or the third electronic device 1803 in FIG. 18) for a communication with the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the first address may be set based on a second address, which is included in the first packet, to be used by the electronic device (e.g., the third electronic device 603 in FIG. 6, the third electronic device 703 in FIG. 7, the second electronic device 1602 in FIG. 16, or the third electronic device 1803 in FIG. 18) for the communication with the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the temporary IRK may be different from an IRK of the second external electronic device (e.g., the first electronic device 601 in FIG. 6, the first electronic device 701 in FIG. 7, the first electronic device 1601 in FIG. 16, or the first electronic device 1801 in FIG. 18).

A BLE privacy process in a wireless communication network will be described as follows.

In a wireless communication network, a BLE privacy function may refer to a function in which an electronic device reduces a capability of tracking the electronic device by frequently changing a device address. In order for an electronic device using the BLE privacy function to reconnect to known electronic devices, a device address, which is a private address, may be resolvable by external electronic devices.

In an embodiment, the private address may be generated using an identity resolving key (IRK) of the electronic device exchanged during a bonding procedure (e.g., a BLE pairing process). In an embodiment, the private address of the electronic device may be a resolvable private address (RPA). The RPA may be generated based on a Bluetooth™ IRK and a random value. For example, the RPA may be implemented with 48 bits, and may be divided into a first part and a second part. In an embodiment, the first part may be a 24-bit random part prand, and the second part may be a 24-bit hash part hash. In an embodiment, a least significant octet of the RPA may be a least significant octet of hash, and a most significant octet of the RPA may be a most significant octet of prand.

In an embodiment, if the electronic device transmits a BLE advertisement (BLE ADV) packet, the electronic device may use the RPA as an address of the electronic device, thereby avoiding tracking from an attacker.

An example of a format of a BLE ADV packet in a wireless communication network will be described with reference to FIG. 3.

Figure 3:
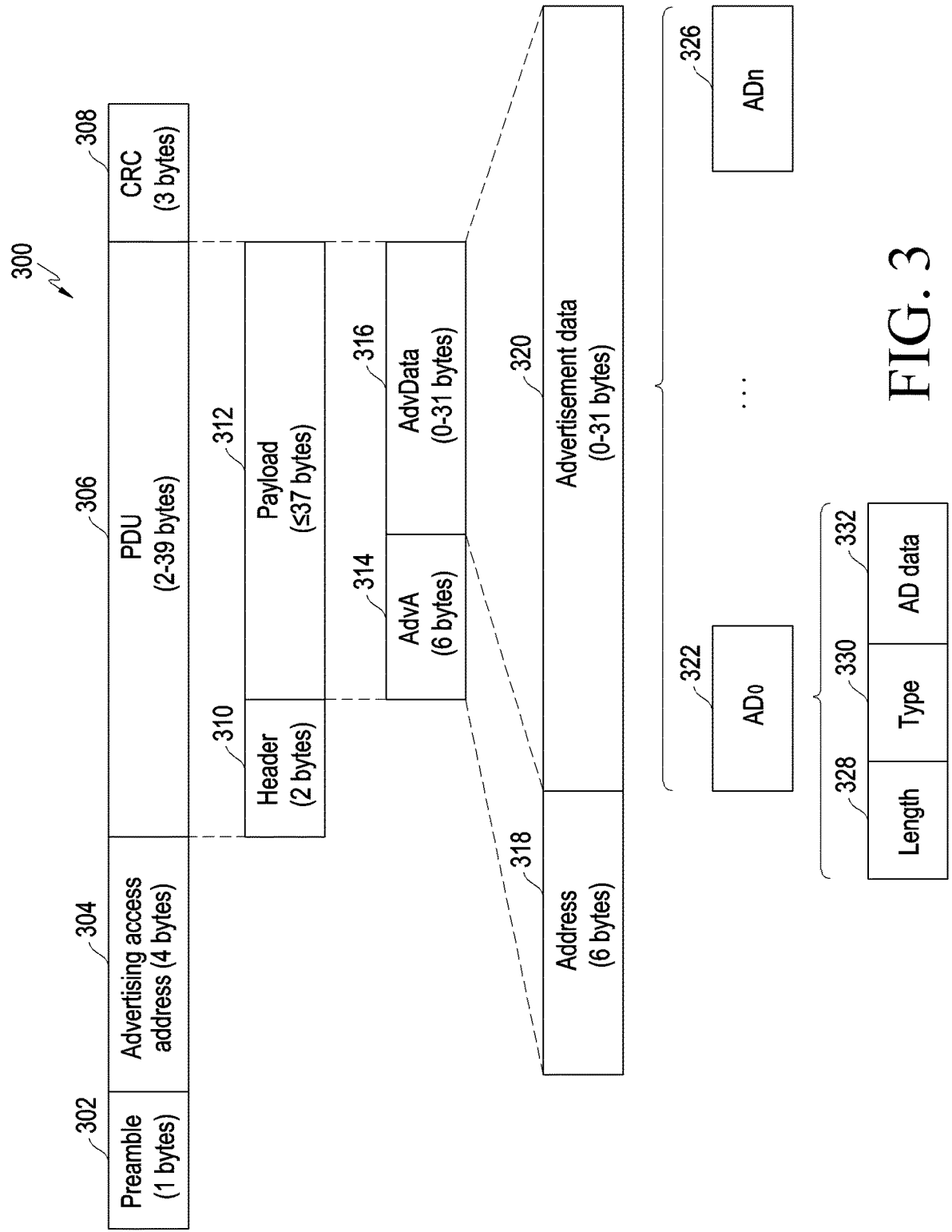
FIG. 3 is a diagram schematically illustrating an example of a BLE ADV packet in a wireless communication network according to an embodiment.

FIG. 3 is a diagram schematically illustrating an example of a BLE ADV packet in a wireless communication network according to an embodiment.

Referring to FIG. 3, a BLE ADV packet 300 may include a preamble field 302, an advertising access address field 304, a packet data unit (PDU) field 306, and a cyclic redundancy check (CRC) field 308.

In an embodiment, the preamble field 302 may include information used for an external electronic device (e.g., an electronic device 102 in FIG. 1) which receives the BLE ADV packet 300 to perform frequency synchronization and/or symbol timing estimation. For example, the preamble field 302 may be implemented with one byte. In an embodiment, the preamble field 302 may include a fixed sequence of one byte in length consisting of alternating a bit value 0 and a bit value 1 based on address information included in the advertising access address field 304. For example, the preamble field 302 may include "10101010" if the address information included in the advertising access address field 304 starts with 1. As another example, the preamble field 302 may include "01010101" if the address information included in the advertising access address field 304 starts with 0.

In an embodiment, the advertising access address field 304 may include address information related to the BLE ADV packet. For example, the advertising access address field 304 may be implemented with 4 bytes.

In an embodiment, the PDU field 306 may have a variable length from a minimum of 2 bytes to a maximum of 39 bytes. The PDU field 306 may include a header field 310 and a payload field 312.

In an embodiment, the header field 310 may include information indicating a type and length of data included in the payload field 312. In an embodiment, the header field 310 may include information indicating that a type of the data included in the payload field 312 is advertisement data. For example, the header field 310 may be implemented with 2 bytes.

In an embodiment, the payload field 312 may have a variable length of 37 bytes or less, and include an advertisement access (AdvA) field 314 and an advertisement data (AdvData) field 316.

In an embodiment, the AdvA field 314 may include an address 318 of an electronic device (e.g., an electronic device 101 in FIG. 1) which transmits the BLE ADV packet 300. In an embodiment, the address 318 of the electronic device may be a medium access control (MAC) address of the electronic device. In an embodiment, the address 318 of the electronic device may be an RPA. The RPA may be implemented with, for example, 48 bits. For example, the RPA may be divided into a first part (e.g., prand which is a 24-bit random part) and a second part (e.g., hash which is a 24-bit hash part). A least significant octet of the RPA may be a least significant octet of hash, and a most significant octet of the RPA may be a most significant octet of prand.

In an embodiment, the AdvData field 316 may include advertisement data 320 of up to 31 bytes, and include one or two or more advertising data (AD) elements. The one or two or more AD elements may be, for example, N AD elements including an AD0 element 322 to an ADN element 326.

In an embodiment, each of the one or two or more AD elements may include a length field, a type field, and an AD data field. FIG. 3 exemplifies a length field 328, a type field 330, and an AD data field 332 included in the AD0 element 322. Although not shown in FIG. 3, the ADN element 326 may include a length field, a type field, and an AD data field, like the AD0 element 322.

In an embodiment, the length field 328 may include length information of the AD data field 332, and the type field 330 may include type information of data included in the AD data field 332. In an embodiment, the type field 332 may include information indicating one of data types as shown in Table 1 below.

TABLE 1

| Data type | Description |
| --- | --- |
| Universally unique identifier (UUID) | Identifier information of a service provided by an electronic device |
| Manufacturer specific data | May include at least one of data defined by manufacturer of an electronic device or data set by an electronic device. |
| Transmit power level | Information about a transmit power level used for an electronic device to transmit a BLE ADV packet |
| Slave connection interval range | Connection interval range to be used by an external electronic device receiving a BLE ADV packet |
| Service solicitation | Information about one or two or more services for receiving through an external electronic device, and it is used for inviting the external electronic device for connection. |
| Service data | Data associated with a service provided by an electronic device (may include a service UUID) |
| Uniform resource identifier (URI) | URI associated with a service provided by an electronic device |

In an embodiment, the CRC field 308 may include information used for an external electronic device to detect an error for a received BLE ADV packet. For example, the CRC field 308 may be implemented with 3 bytes.

In a wireless communication network, two electronic devices may share IRKs of the two electronic devices defined in a Bluetooth™ standard. For example, a first electronic device may store an IRK of a second electronic device in advance, and the second electronic device may store an IRK of the first electronic device in advance. In an embodiment, an IRK may be identification information indicating an identity of an electronic device, and may be a key shared through a BLE pairing process.

In an embodiment, external electronic devices which do not store an IRK of an electronic device in advance may not resolve an address (e.g., an RPA) of the electronic device. In contrast, external electronic devices storing the IRK of the electronic device in advance may resolve the RPA of the electronic device even if a random value used to generate the RPA of the electronic device is changed. Accordingly, the electronic device may avoid tracking from an attacker by periodically changing the random value used to generate the RPA. As such, tracking from the attacker may be avoided, thereby improving a security performance of a wireless communication network.

In an embodiment, a BLE pairing process in a wireless communication network will be described as follows.

First, a BLE pairing process may be a process of generating one or more shared secret keys, and an electronic device and an external electronic device which perform the BLE pairing process may share each other's IRKs. In an embodiment, sharing of IRKs by electronic devices may mean that an electronic device informs another electronic device of its own IRK, and the other electronic device stores an IRK of the electronic device in advance.

A BLE pairing and BLE privacy process in a wireless communication network will be described with reference to FIG. 4.

Figure 4:
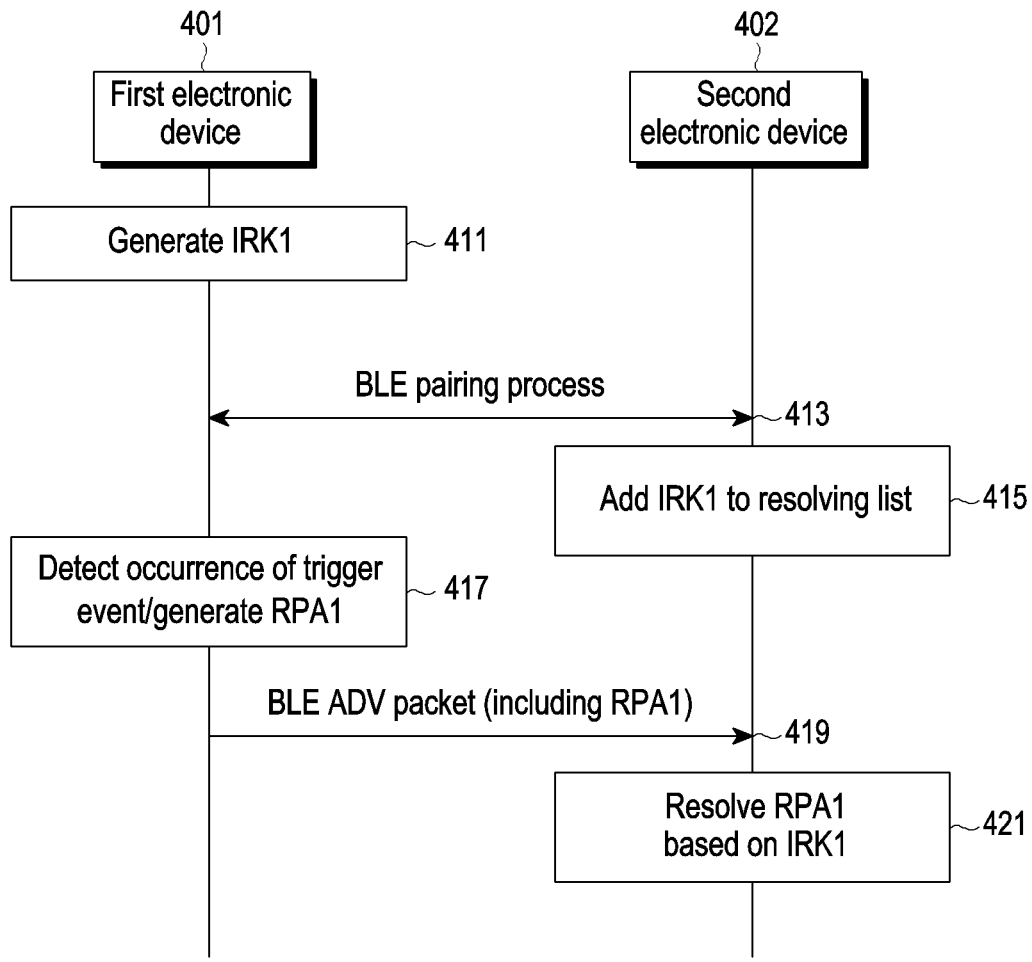
FIG. 4 is a diagram schematically illustrating an example of a BLE pairing and BLE privacy process in a wireless communication network according to an embodiment.

FIG. 4 is a diagram schematically illustrating an example of a BLE pairing and BLE privacy process in a wireless communication network according to an embodiment.

Referring to FIG. 4, a plurality of electronic devices may exist in a wireless communication network, and it will be assumed that a first electronic device 401 (e.g., an electronic device 101 in FIG. 1) and a second electronic device 402 (e.g., an electronic device 102 in FIG. 1) among the plurality of electronic devices perform a BLE pairing process.

In operation 411, the first electronic device 401 may generate an IRK. In an embodiment, it will be assumed that the IRK of the first electronic device 401 is IRK1.

In operation 413, the first electronic device 401 may perform a BLE pairing process with the second electronic device 402. As the first electronic device 401 and the second electronic device 402 perform the BLE pairing process, the first electronic device 401 and the second electronic device 402 may share each other's IRKs. In an embodiment, as the second electronic device 402 performs the BLE pairing process with the first electronic device 401, the second electronic device 402 may obtain IRK1 which is the IRK of the first electronic device 401. In operation 415, the second electronic device 402 may add IRK1 to a resolving list managed by the second electronic device 402. In an embodiment, the resolving list may include IRKs of other electronic devices obtained by the second electronic device 402.

In operation 417, the first electronic device 401 may detect occurrence of a trigger event which triggers BLE ADV transmission. In an embodiment, the trigger event may be at least one of the following.

(1) Start Search for Neighbor Electronic Devices

A trigger event may occur if an electronic device starts searching for external electronic devices (e.g., neighbor electronic devices).

(2) File Sharing Option On/Off

A trigger event may occur if an electronic device turns on or off a file sharing option.

(3) Screen On/Off

A trigger event may occur if an electronic device turns on or off a screen.

(4) Wi-Fi On/Off/Connected

A trigger event may occur if an electronic device turns on or off Wi-Fi, or if the electronic device is connected to the Wi-Fi, for example, if the electronic device is in a Wi-Fi connected state.

(5) Clipboard Copy

A trigger event may occur if an electronic device performs a clipboard copy operation.

(6) State Changed (e.g., Idle/Ringing/Off Hook)

A trigger event may occur if a state changes in an electronic device. For example, the trigger event may occur if the state of the electronic device changes to an idle state, a ringing state, or an off-hook state.

(7) Change of Connection Information of a Wearable Device being Used

A trigger event may occur if connection information for a wearable device being used in an electronic device changes.

(8) Change of Wearing Information of a Wearable Device being Used

A trigger event may occur if wearing information (e.g., information about whether a wearable device connected to an electronic device is worn on a user's body) for a wearable device being used in an electronic device changes.

(9) Use of an Application in an Electronic Device

A trigger event may occur if an electronic device uses an application (e.g., an application such as the Internet, a contact, or a note).

(10) Periodic Transmission

A trigger event may occur every period set in an electronic device. In an embodiment, a period in which the trigger event occurs may be variably set in a wireless communication network.

(11) Change in a State of an Electronic Device

If a state of an electronic device changes (for example, if a location of an electronic device changes, if a battery state of the electronic device changes, and/or a sensor value of a sensor included in the electronic device changes), a trigger event may occur.

In the disclosure, (1) start search for neighbor electronic devices, (2) file sharing option on/off, (3) screen on/off, (4) Wi-Fi on/off/connected, (5) clipboard copy, (6) state change, (7) change of connection information of a wearable device being used, (8) change in wearing information of a wearable device being used, (9) use of an application in an electronic device, (10) periodic transmission, and (11) change in a state of an electronic device have been described as cases in which the trigger event occurs, however, the cases in which the trigger event occurs may additionally include various cases as well as the corresponding cases.

The first electronic device 401 may generate an RPA of the first electronic device 401 based on IRK1 in operation 419 upon detecting the occurrence of the trigger event triggering the BLE ADV transmission in operation 417. In an embodiment, it will be assumed that the RPA of the first electronic device 401 is RPA1. In operation 419, the first electronic device 401 may transmit a BLE ADV packet including RPA1. In an embodiment, the first electronic device 401 may broadcast the BLE ADV packet including RPA1.

In operation 421, the second electronic device 402 may receive a BLE ADV packet. The second electronic device 402 may resolve an RPA (e.g., RPA1) included in the received BLE ADV packet based on the IRKs included in the resolving list managed by the second electronic device 402. The second electronic device 402 may recognize that an electronic device which transmits the received BLE ADV packet is the first electronic device 401 based on the resolved RPA.

Hereinafter, a process of resolving an RPA included in a BLE ADV packet in a wireless communication network will be described with reference to FIG. 5.

Figure 5:
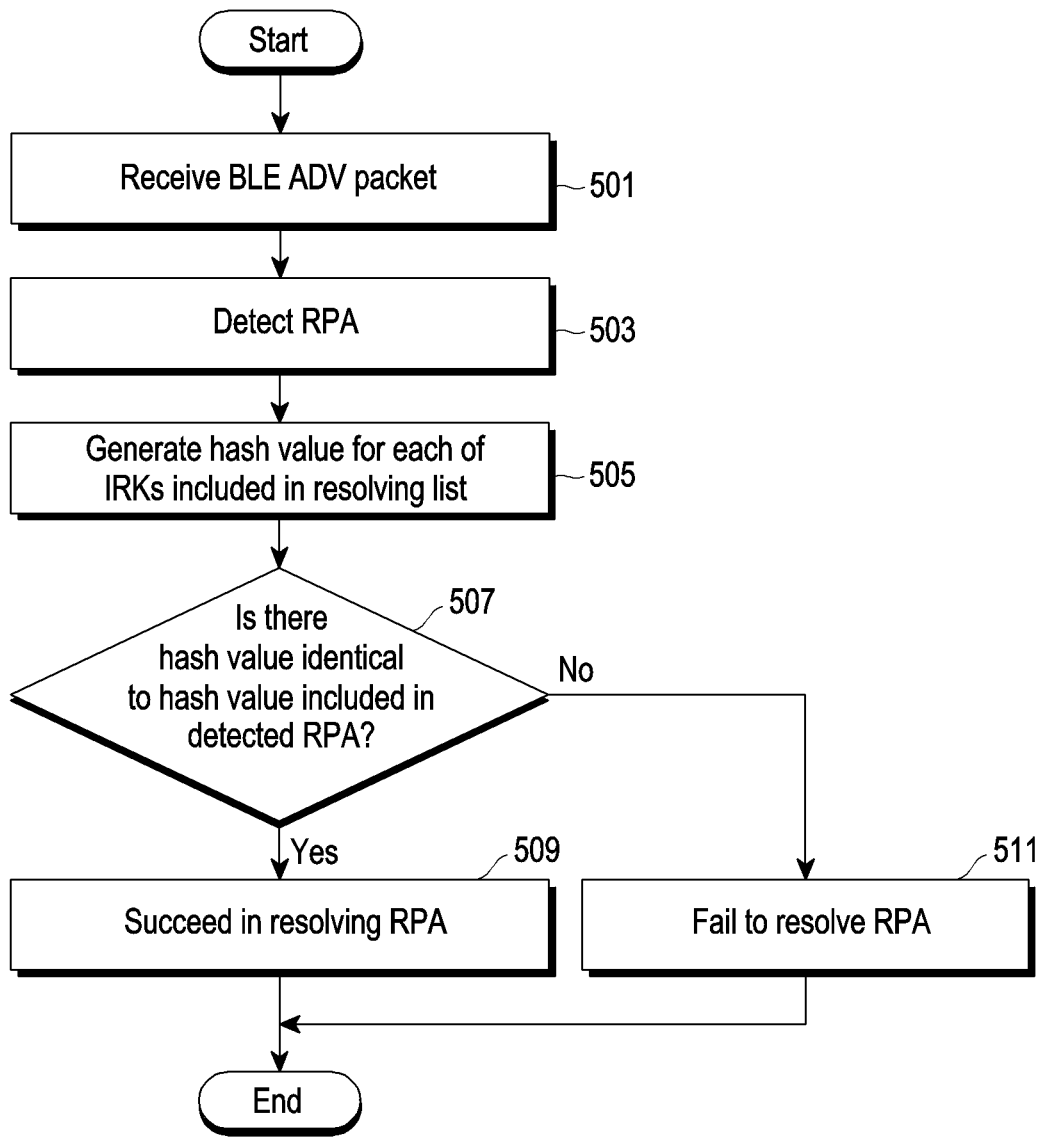
FIG. 5 is a diagram schematically illustrating an example of a process for resolving an RPA included in a BLE ADV packet in a wireless communication network according to an embodiment.

FIG. 5 is a diagram schematically illustrating an example of a process for resolving an RPA included in a BLE ADV packet in a wireless communication network according to an embodiment.

Referring to FIG. 5, in operation 501, an electronic device may receive a BLE ADV packet. In operation 503, the electronic device may detect an RPA which is an address of an external electronic device included in the received BLE ADV packet. A type of an address included in a BLE ADV packet may be other types as well as an RPA, and in FIG. 5, a case of using the RPA as the type of the address included in the BLE ADV packet is described as an example. In operation 505, the electronic device may generate a hash value based on prand included in the detected RPA and each of IRKs included in a resolving list stored by the electronic device.

In an embodiment, a hash value (e.g., a localHash value) may be generated by using a random address hash function (e.g., ah). The localHash value may be expressed as Equation 1 below.

$$localHash = ah(IRK, prand) \qquad <\text{Equation 1}>$$

In Equation 1, IRK may represent a Bluetooth™ IRK (e.g., an IRK of an external electronic device included in a resolving list which an electronic device stores) of an external electronic device which intends to generate localHash, and prand may represent a prand value extracted from the RPA (e.g., an RPA included in a BLE ADV packet received from an electronic device).

In an embodiment, the generated localHash value is compared with a hash value extracted from an RPA included in the received BLE ADV packet (e.g., an RPA of the external electronic device), and if the localHash value matches the hash value extracted from the RPA of the external electronic device, the external electronic device which transmits the BLE ADV packet may be identified as an electronic device which corresponds to an IRK used when the localHash value is generated.

In operation 507, the electronic device may identify whether there is a hash value identical to the hash value included in the detected RPA among hash values which are generated based on prand included in the detected RPA and each of the IRKs included in the resolving list stored by the electronic device. As a result of identifying, if there is the hash value identical to the hash value included in the detected RPA, an external electronic device corresponding to an IRK used to generate the hash value identical to the hash value included in the detected RPA may be identified as an external electronic device which transmits the BLE ADV packet in operation 509. Identifying the external electronic device which transmits the ADV packet may mean success in resolving the RPA included in the BLE ADV packet.

If there is no hash value identical to the hash value included in the detected RPA as the result of identifying in operation 507, the electronic device may not identify the external electronic device which transmits the BLE ADV packet, and may discard the received BLE ADV packet in operation 511. A case that the external electronic device which transmits the BLE ADV packet may not be identified may mean a case that it has failed to resolve the RPA included in the BLE ADV packet.

In FIG. 5, a case has been described that the electronic device generates the hash value based on each of the IRKs included in the resolving list stored by the electronic device, and identifies whether there is the hash value identical to the hash value included in the detected RPA among the generated hash values.

On the contrary, the electronic device may generate a hash value for any one of the IRKs included in the resolving list, identify whether the generated hash value is identical to the hash value included in the detected RPA, and if identical, identify an external electronic device which corresponds to the IRK corresponding to the generated hash value as an external electronic device which transmits the BLE ADV packet. In addition, if the generated hash value is not identical to the hash value included in the detected RPA, the electronic device may repeatedly perform the same operation sequentially for the remaining IRKs among the IRKs included in the resolving list and identify whether there is a hash value identical to the hash value included in the detected RPA.

In an embodiment, an IRK sharing process in a wireless communication network will be described as follows.

A BLE pairing process is performed between a first electronic device and a second electronic device, and thus the first electronic device and the second electronic device may obtain each other's IRKs. The second electronic device may intend to share the first electronic device with a third electronic device which does not perform the BLE pairing process with the first electronic device. In an embodiment, a case that the second electronic device shares the first electronic device with the third electronic device may mean a case of enabling the third electronic device to resolve an RPA of the first electronic device. In an embodiment, a case of enabling the third electronic device to resolve the RPA of the first electronic device may mean a case of informing the third electronic device of the IRK of the first electronic device. In an embodiment, a case of enabling the third electronic device to resolve the RPA of the first electronic device may mean a case of enabling the third electronic device to recognize that a BLE ADV packet is transmitted by the first electronic device upon receiving the BLE ADV packet including the RPA of the first electronic device.

If the second electronic device intends to share the first electronic device with the third electronic device which does not perform the BLE pairing process with the first electronic device, the BLE pairing process may be first performed between the third electronic device and the first electronic device in order for the third electronic device to resolve the RPA of the first electronic device. The BLE pairing process is a complex and time-consuming process from a point of view of a user who does not accurately recognize a communication technology, so an IRK sharing process in which the second electronic device may share, with the third electronic device which does not perform the BLE pairing process with the first electronic device, the IRK of the first electronic device obtained by performing the BLE pairing process with the first electronic device is proposed, for sharing IRKs faster between electronic devices.

In a wireless communication network, if an IRK sharing process is performed, an electronic device may resolve an RPA included in a BLE ADV packet transmitted from an external electronic device even though a BLE pairing process with the external electronic device is not performed. Even though the external electronic device does not include additional information other than the RPA of the external electronic device in the BLE ADV packet upon transmitting the BLE ADV packet, the electronic device may resolve the BLE ADV packet transmitted from the external electronic device. A Bluetooth™ IRK sharing process may allow IRKs to be shared between electronic devices without incurring additional overhead in a BLE communication.

In a wireless communication network, an IRK may be information indicating identity of an electronic device and having a very high security level. In the current BLE standard, the electronic device may share IRKs with an external electronic device by performing a BLE pairing process between the electronic device and the external electronic device, or may share IRKs of other external electronic devices recognized by the electronic device in advance with the external electronic device.

In a wireless communication network, if an IRK is exposed, a security level which is based on an RPA generated based on the IRK may not be maintained. If it is impossible to maintain the security level which is based on the RPA, a continuous attack may occur through an attacker's tracking even though the RPA is changed, and a BLE ADV packet transmission/reception operation may not be normally performed due to the attacker's attack. If the BLE ADV packet is scannable by the attacker or connectable by the attacker, packets important in a BLE communication, such as a scan request packet, a scan response packet, and a connect request packet which may be transmitted in response to the BLE ADV packet, may be attacked by the attacker. Because even the important packets in the BLE communication may be attacked by the attacker, a BLE connection may also be attacked by the attacker. The attacker's attack on the various packets and the BLE connection may significantly degrade a security performance of the wireless communication network which is based on a BLE scheme.

In an IRK sharing process currently supported by a wireless communication network, an electronic device which has performed a BLE pairing process with a first external electronic device may inform the first external electronic device of an IRK of a second external electronic device which has not performed the BLE pairing process with the first external electronic device. For example, upon receiving a sharing request packet requesting sharing of the first external electronic device from the second external electronic device which has not performed the BLE pairing process with the first external electronic device, the electronic device may transmit a sharing response packet including the IRK of the first external electronic device to the second external electronic device. Even though the first external electronic device has not performed the BLE pairing process with the second external electronic device, the IRK of the first external electronic device may be provided to the second external electronic device, so if a corresponding IRK is exposed, a security threat may occur not only in a BLE communication between the first external electronic device and the second external electronic device, but also in a BLE communication between the first external electronic device and the electronic device established by performing the BLE pairing process. If plurality of other external electronic devices (e.g., a third external electronic device and a fourth external electronic device) which have performed the BLE pairing process with the first electronic device use an IRK (e.g., an IRK of the electronic device) provided to the second external electronic device, a security threat may occur even in a BLE communication between the first electronic device and each of the third external electronic device and the fourth external electronic device.

An embodiment of the present disclosure may maintain a security performance of a BLE communication between another external electronic device which has performed a BLE pairing process with the electronic device and the electronic device by sharing a temporary IRK which is based on an IRK of the electronic device, not the IRK of the electronic device, with an external electronic device if the IRK of the electronic device is provided to the external electronic device which has not performed the BLE pairing process with the electronic device in an IRK sharing process.

FIG. 6 is a diagram schematically illustrating an example of an IRK sharing process in a wireless communication network according to an embodiment.

Referring to FIG. 6, there may be a plurality of electronic devices (e.g., a first electronic device 601 (e.g., an electronic device 101 in FIG. 1), a second electronic device 602 (e.g., an electronic device 102 in FIG. 1), and a third electronic device 603) in a wireless communication network, and it will be assumed that the first electronic device 601 and the second electronic device 602 among the plurality of electronic devices perform a BLE pairing process.

In operation 611, the first electronic device 601 may generate an IRK of the first electronic device 601. In the wireless communication network, an IRK may be assigned during a production process of an electronic device or by other methods, or randomly generated. In an embodiment, an IRK of the first electronic device 601 will be referred to as IRK1.

In operation 613, the second electronic device 602 may generate an IRK of the second electronic device 602. In an embodiment, the IRK of the second electronic device 602 will be referred to as IRK2.

In operation 615, the third electronic device 603 may generate an IRK of the third electronic device 603. In an embodiment, the IRK of the third electronic device 603 will be referred to as IRKS.

In operation 617, the first electronic device 601 and the second electronic device 602 may perform the BLE pairing process. As the first electronic device 601 and the second electronic device 602 perform the BLE pairing process, the first electronic device 601 and the second electronic device 602 may obtain each other's IRKs. In an embodiment, as the first electronic device 601 performs the BLE pairing process with the second electronic device 602, the first electronic device 601 may obtain IRK2 which is an IRK of the second electronic device 602 and add IRK2 to a resolving list managed by the first electronic device 601. In an embodiment, as the second electronic device 602 performs the BLE pairing process with the first electronic device 601, the second electronic device 602 may obtain IRK1 which is an IRK of the first electronic device 601 and add IRK1 to a resolving list managed by the second electronic device 602.

In operation 619, the third electronic device 603 may detect an event to request to share the first electronic device 601. In an embodiment, the third electronic device 603 may detect that the first electronic device 601 exists through a BLE advertisement process or a Wi-Fi discovery process, or may detect that the first electronic device 601 exists by receiving information about the first electronic device 601 through a server or cloud. In an embodiment, the third electronic device 603 may detect that the first electronic device 601 exists by receiving, from the second electronic device 602, an electronic device list including information about electronic devices recognized by the second electronic device 602.

In an embodiment, a case that the electronic device shares an external electronic device may mean a case that the electronic device allows another external electronic device to resolve an RPA of the external electronic device. In an embodiment, the case that the electronic device allows the other external electronic device to resolve the RPA of the external electronic device may mean a case of informing the other external electronic device of the IRK of the external electronic device. In an embodiment, the case that the electronic device allows the other external electronic device to resolve the RPA of the external electronic device may mean a case of enabling the other external electronic device to recognize that a BLE ADV packet is transmitted by the external electronic device upon receiving the BLE ADV packet including the RPA of the external electronic device.

Hereinafter, for convenience of a description, an event to request to share an external electronic device will be referred to as a "sharing request event", an electronic device requesting to share the external electronic device will be referred to as a "source sharing electronic device", the external electronic device requested to be shared by the electronic device will be referred to as a "target sharing electronic device", and another external electronic device requesting the source sharing electronic device to share the target sharing electronic device will be referred to as an "intermediate sharing electronic device". According to an embodiment, a sharing request event may be an event to request to generate a temporary IRK of the target sharing electronic device.

Upon detecting the sharing request event, in operation 621, the third electronic device 603 may transmit, to the second electronic device 602, a sharing request packet requesting to share the first electronic device 601 in order to share the first electronic device 601. In an embodiment, the sharing request packet may be a packet used for requesting an electronic device (e.g., a source sharing electronic device) to share an external electronic device (e.g., a target sharing electronic device). In an embodiment, the sharing request packet may be a packet requesting to generate a temporary IRK of the target sharing electronic device. In an embodiment, the sharing request packet may be a packet which is transmitted from the source sharing electronic device to the intermediate sharing electronic device and requests to generate the temporary IRK of the target sharing electronic device. In an embodiment, the sharing request packet may be implemented as a packet which is based on a BLE scheme. In an embodiment, the sharing request packet may be implemented as a packet which is based on an OOB scheme (e.g., a Wi-Fi scheme or a cellular communication scheme). FIG. 6 illustrates a case in which the third electronic device 603 requests to share the first electronic device 601 through the second electronic device 602, however, the third electronic device 603 may request to share the first electronic device 601 through a server or a cloud, this will be described in more detail below with reference to FIG. 16.

Hereinafter, a format of a sharing request packet in a wireless communication network according to an embodiment will be described with reference to FIGS. 8 and 9.

Figure 8:
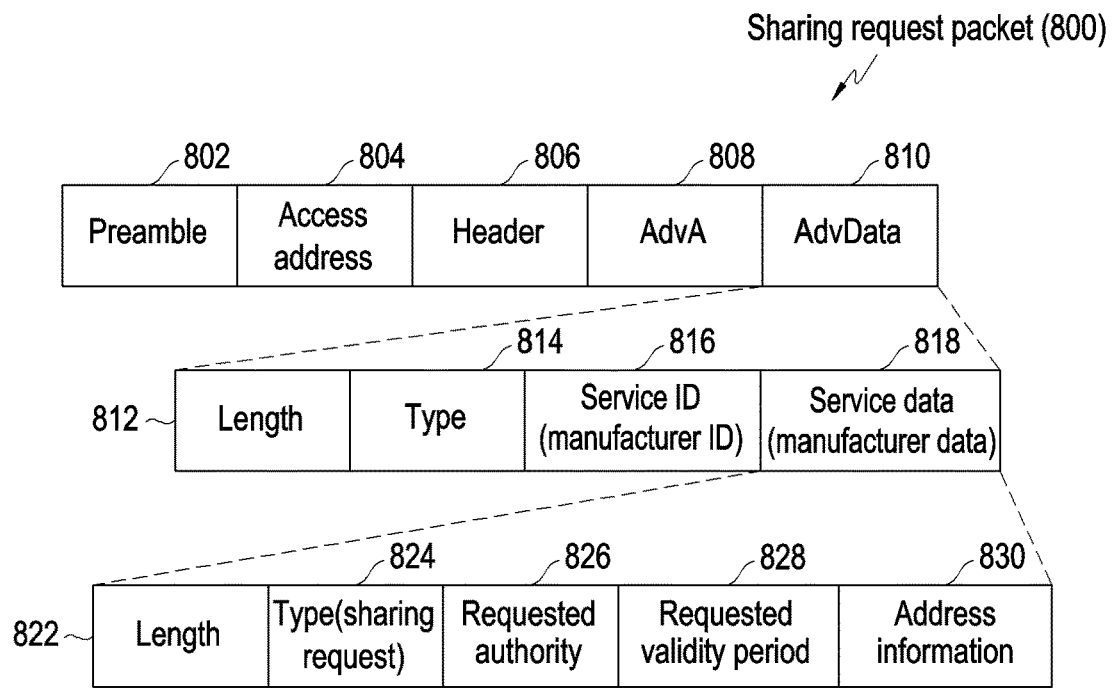
FIG. 8 is a diagram schematically illustrating an example of a format of a sharing request packet in a wireless communication network according to an embodiment.

FIG. 8 is a diagram schematically illustrating an example of a format of a sharing request packet in a wireless communication network according to an embodiment.

Referring to FIG. 8, a sharing request packet 800 illustrated in FIG. 8 may be based on a structure of a BLE ADV packet. The sharing request packet 800 may include a preamble field 802, an access address field 804, and a protocol data unit (PDU) field. In an embodiment, the PDU field may include a header field 806 and a payload field. In an embodiment, the payload field may include an AdvA field 808 and an AdvData field 810.

In an embodiment, the preamble field 802 may include information used for an electronic device (e.g., an electronic device 102 in FIG. 1 or a second electronic device 602 in FIG. 6) which receives the sharing request packet 800 to perform frequency synchronization and/or symbol timing estimation. The preamble field 802 may be implemented with, for example, one byte. In an embodiment, the preamble field 802 may include a fixed sequence of one byte in length consisting of alternating a bit value 0 and a bit value 1 based on address information included in the access address field 804. For example, the preamble field 802 may include "10101010" if the address information included in the access address field 804 starts with 1. For another example, the preamble field 802 may include "01010101" if the address information included in the access address field 804 starts with 0.

In an embodiment, the access address field 804 may include an access address related to the sharing request packet 800. In an embodiment, the sharing request packet 800 is based on the structure of the BLE ADV packet, the access address field 804 may include an access address (e.g., 0b10001110_10001001_10111110_11010110 (0x8E89BED6)) designated for an advertisement physical channel packet. For example, the access address field 804 may be implemented with four bytes.

In an embodiment, the header field 806 may include information indicating a type and a length of data included in the AdvData field 810. In an embodiment, the header field 806 may include information indicating that the type of the data included in the AdvData field 810 is advertisement data. For example, the header field 806 may be implemented with two bytes.

In an embodiment, the AdvA field 808 may include an address of an electronic device (e.g., a third electronic device 603 in FIG. 6) which transmits the sharing request packet 800. In an embodiment, the electronic device which transmits the sharing request packet 800 may be a source sharing electronic device, and an address of the source sharing electronic device may be a MAC address of the source sharing electronic device. In an embodiment, the address of the source sharing electronic device may be an RPA.

In an embodiment, the AdvData field 810 may be implemented with up to 255 bytes, and may include a length field 812, a type field 814, a service identifier (ID) field 816, and a service data field 818.

In an embodiment, the length field 812 may indicate a length of the service data field 818. The type field 814 may include type information of data included in the service data field 818. In an embodiment, the type field 814 has been described in Table 1, so a detailed description thereof will be omitted herein.

In an embodiment, the service ID field 816 may include a service ID. In an embodiment, the service ID may be a UUID for universally and uniquely identifying a service instance.

In an embodiment, the service data field 818 may include service data related to the service ID included in the service ID field 816. The service data field 818 may include a length field 822, a type field 824, a requested authority field 826, a requested validity period field 828, and an address information field 830.

In an embodiment, the length field 822 may include length information of the requested authority field 826, the requested validity period field 828, and the address information field 830. The type field 824 may include type information of the service data included in the service data field 818. In an embodiment, the type information of the service data included in the service data field 818 may indicate a sharing request. In an embodiment, the type information of the service data included in the service data field 818 may indicate that a corresponding packet is a sharing request packet.

In an embodiment, the requested authority field 826 may include information related to requested authority which the source sharing electronic device requests to have if the source sharing electronic device accesses a target sharing electronic device (e.g., a first electronic device 601 in FIG. 6). In an embodiment, the target sharing electronic device may be an electronic device which is requested to be shared by the source sharing electronic device. In an embodiment, the requested authority may indicate authority which the source sharing electronic device is capable of requesting from the target sharing electronic device. For example, the requested authority may include a list of operations which the source sharing electronic device is capable of requesting from the target sharing electronic device. For example, if the source sharing electronic device desires to perform operation A and operation B for the target sharing electronic device, the requested authority may include information related to operation A and operation B.

In an embodiment, the requested validity period field 828 may include at least one of requested validity period information indicating a validity period of a temporary IRK requested by the source sharing electronic device or requested validity period information indicating a validity period for the requested authority requested by the source sharing electronic device. In an embodiment, the validity period of the temporary IRK may indicate a period during which the target sharing electronic device uses an RPA which is based on the temporary IRK.

In an embodiment, the address information field 830 may include address information related to an address to be used by the source sharing electronic device for a BLE communication with the target sharing electronic device. In an embodiment, the address information may include one of an IRK, a temporary IRK, or a BLE address (e.g., a BLE public address, a BLE static address, a BLE RPA, and/or the like) of the source sharing electronic device. In an embodiment, if the temporary IRK of the source sharing electronic device is used as the address information, information about the validity period of the temporary IRK of the source sharing electronic device may be included together.

A case in which the AdvData field 810 is implemented in a form including the length field 812, the type field 814, the service ID field 816, and the service data field 818 has been illustrated in FIG. 8, but the AdvData field 810 may also be implemented in a form including a length field, a type field, a manufacturer ID field, and a manufacturer data field.

In an embodiment, the length field may indicate a length of the manufacturer data field. The type field may include type information of data included in the manufacturer data field. In an embodiment, the type field has been described in Table 1, so a detailed description thereof will be omitted herein.

In an embodiment, the manufacturer ID field may include a manufacturer ID. In an embodiment, the manufacturer ID may be an ID which uniquely identifies a manufacturer.

In an embodiment, the manufacturer data field may include manufacturer-specific data related to the manufacturer ID included in the manufacturer ID field. The manufacturer data field may include a length field, a type field, a requested authority field, a requested validity period field, and an address information field.

In an embodiment, the length field may include length information of the requested authority field, the requested validity period field, and the address information field. The type field may include type information of the manufacturer-specific data included in the manufacturer data field. In an embodiment, the type information of the service data included in the manufacturer data field may indicate a sharing request. The requested authority field, the requested validity period field, and the address information field included in the manufacturer data field may be implemented similarly to the requested authority field 826, the requested validity period field 828, and the address information field 830 included in the service data field 818, so a detailed description thereof will be omitted.

Figure 9:
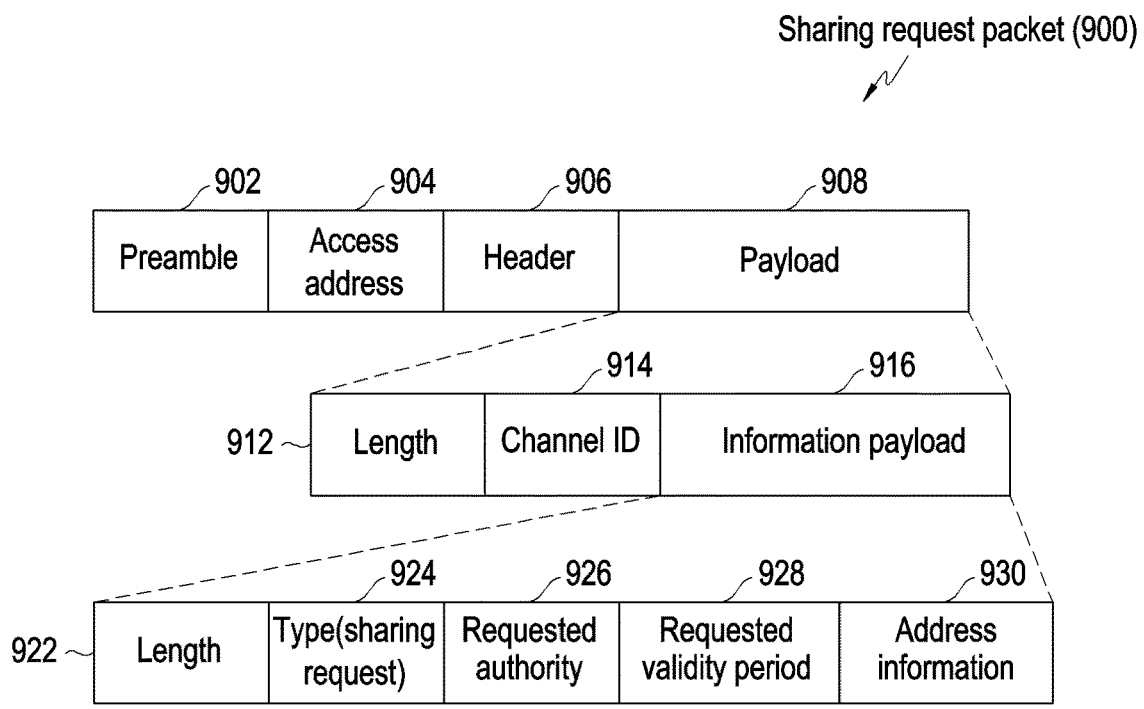
FIG. 9 is a diagram schematically illustrating another example of a format of a sharing request packet in a wireless communication network according to an embodiment.

FIG. 9 is a diagram schematically illustrating another example of a format of a sharing request packet in a wireless communication network according to an embodiment.

Referring to FIG. 9, a sharing request packet 900 illustrated in FIG. 9 may be based on a structure of a data packet. In an embodiment, the data packet may be based on a structure of a logical link control and adaptation protocol (L2CAP) protocol data unit (PDU) which may be transmitted and received after a BLE connection is established between electronic devices. The sharing request packet 900 may include a preamble field 902, an access address field 904, and a PDU field. In an embodiment, the PDU field may include a header field 906 and a payload field 908.

In an embodiment, the preamble field 902 may include information used for an electronic device (e.g., an electronic device 102 in FIG. 1 or a second electronic device 602 in FIG. 6) which receives the sharing request packet 900 to perform frequency synchronization and/or symbol timing estimation. The preamble field 902 may be implemented with, for example, one byte, and the preamble field 902 may be implemented similarly to the preamble field 802 in FIG. 8, so a detailed description thereof will be omitted.

In an embodiment, the access address field 904 may include an access address related to the sharing request packet 900. In an embodiment, the sharing request packet 900 is based on the structure of the data packet, so the access address field 904 may include an access address designated for a data channel packet. For example, the access address field 904 may be implemented with four bytes.

In an embodiment, the header field 906 may include information indicating a type and a length of data included in the payload field 908. In an embodiment, the header field 906 may include information related to the data included in the payload field 908. The information related to the data included in the payload field 908 may include a logical link identifier (LLID), a next expected sequence number (NESN), a sequence number (SN), more data (MD), constant tone extension information (CTEInfo) present (CP), a payload length, and CTEInfo. For example, the header field 906 may be implemented with two bytes.

In an embodiment, the payload field 908 may include a length field 912, a channel ID (CID) field 914, and an information payload field 916.

In an embodiment, the length field 912 may include length information indicating a length of the information payload field 916. For example, the length field 912 may be implemented with two bytes.

In an embodiment, the CID field 914 may include a CID which identifies a destination channel endpoint of the sharing request packet 900. For example, the CID field 914 may be implemented with two bytes.

In an embodiment, the information payload field 916 may include a length field 922, a type field 924, a requested authority field 926, a requested validity period field 928, and an address information field 930. For example, the information payload field 916 may be implemented with up to 65,535 bytes.

In an embodiment, the length field 922 may include length information of the requested authority field 926, the requested validity period field 928, and the address information field 930. The type field 924 may include type information of an information payload included in the information payload field 916. In an embodiment, type information of the information payload included in the information payload field 916 may indicate a sharing request. In an embodiment, the type information of the information payload included in the information payload field 916 may indicate that a corresponding packet is a sharing request packet.

In an embodiment, the requested authority field 926, the requested validity period field 928, and the address information field 930 may be implemented similarly to a requested authority field 826, a requested validity period field 828, and an address information field 830, so a detailed description thereof will be omitted.

Referring back to FIG. 6, in operation 621, the second electronic device 602 may receive the sharing request packet transmitted by the third electronic device 603. In an embodiment, it will be assumed that an address information field included in the sharing request packet includes an IRK (e.g., IRK3) of the third electronic device 603.

Upon receiving the sharing request packet from the third electronic device 603, the second electronic device 602 may generate a temporary IRK request packet based on the received sharing request packet to transmit the generated temporary IRK request packet to the first electronic device 601 in operation 623. In FIG. 6, even though it is assumed that the second electronic device 602 obtains the IRK of the first electronic device 601 as the second electronic device 602 performs the BLE pairing process with the first electronic device 601, the second electronic device 602 does not necessarily perform the BLE pairing process with the first electronic device 601, and as long as the second electronic device 602 may obtain the IRK of the first electronic device 601, the IRK sharing process in FIG. 6 may be performed. For example, the second electronic device 602 may obtain the IRK of the first electronic device 601 through another electronic device (e.g., a server, a cloud server, or another external electronic device), or may obtain the IRK of the first electronic device 601 through another electronic device logged into an account of the second electronic device 602.

Hereinafter, for convenience of a description, an electronic device which receives a sharing request packet from a source sharing electronic device, generates a temporary IRK request packet based on the received sharing request packet, and transmits the generated temporary IRK request packet to a target sharing electronic device will be referred to as "intermediate sharing electronic device". In an embodiment, the temporary IRK request packet may be a packet requesting to generate a temporary IRK of the target sharing electronic device. In an embodiment, the temporary IRK request packet may be a packet which is transmitted from the intermediate sharing electronic device to the target sharing electronic device and requests to generate the temporary IRK of the target sharing electronic device.

A format of a temporary IRK request packet in a wireless communication network according to an embodiment will be described with reference to FIGS. 10 and 11.

Figure 10:
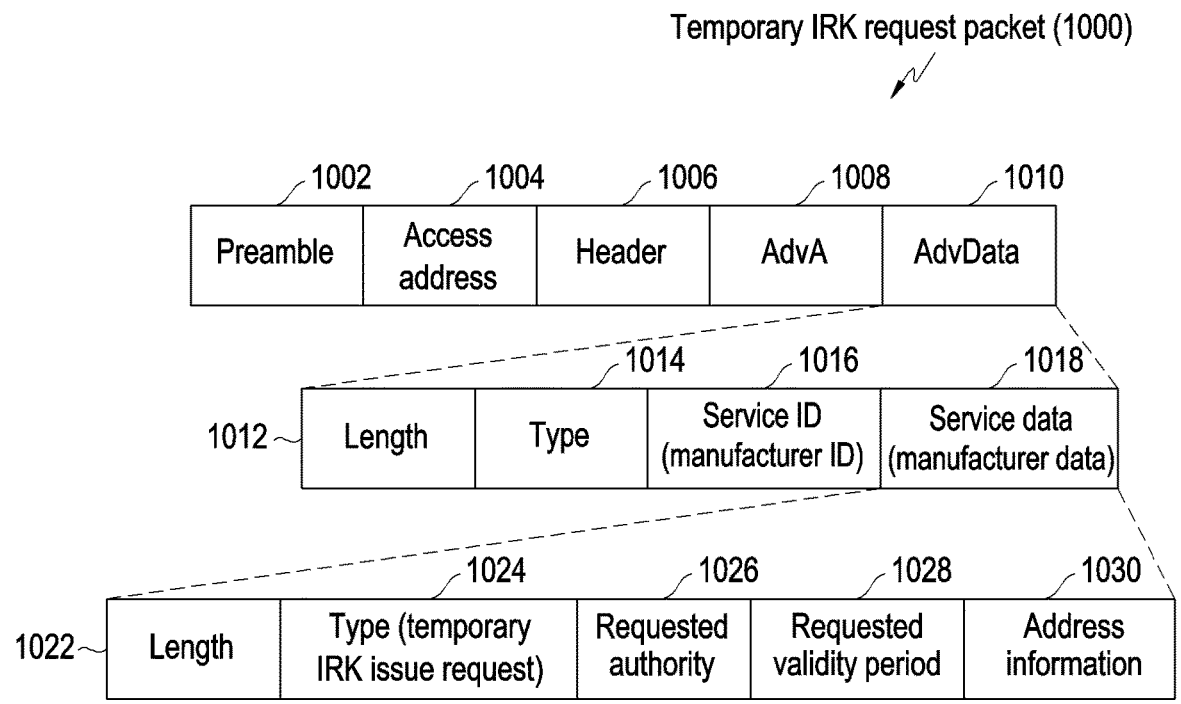
FIG. 10 is a diagram schematically illustrating an example of a format of a temporary IRK request packet in a wireless communication network according to an embodiment.

FIG. 10 is a diagram schematically illustrating an example of a format of a temporary IRK request packet in a wireless communication network according to an embodiment.

Referring to FIG. 10, a temporary IRK request packet 1000 illustrated in FIG. 10 may be based on a structure of a BLE ADV packet. The temporary IRK request packet 1000 may include a preamble field 1002, an access address field 1004, and a PDU field. In an embodiment, the PDU field may include a header field 1006 and a payload field. In an embodiment, the payload field may include an AdvA field 1008 and an AdvData field 1010.

In an embodiment, the preamble field 1002 may include information used for an electronic device (e.g., an electronic device 101 in FIG. 1 or a first electronic device 601 in FIG. 6) which receives the temporary IRK request packet 1000 to perform frequency synchronization and/or symbol timing estimation. The preamble field 1002 may be implemented with, for example, one byte. The preamble field 1002 may be implemented similarly to a preamble field 802 in FIG. 8 or a preamble field 902 in FIG. 9, so a detailed description thereof will be omitted.

In an embodiment, the access address field 1004 may include an access address related to the temporary IRK request packet 1000. In an embodiment, the temporary IRK request packet 1000 is based on the structure of the BLE ADV packet, so the access address field 1004 may include an access address (e.g., 0b10001110_10001001_10111110_11010110 (0x8E89BED6)) designated for an advertisement physical channel packet. For example, the access address field 1004 may be implemented with four bytes.

In an embodiment, the header field 1006 may include information indicating a type and a length of data included in the AdvData field 1010, and may be implemented similarly to a header field 806 in FIG. 8, so a detailed description thereof will be omitted.

In an embodiment, the AdvA field 1008 may include an address of an electronic device (e.g., a second electronic device 602 in FIG. 6) which transmits the temporary IRK request packet 1000. In an embodiment, the electronic device which transmits the temporary IRK request packet 1000 may be an intermediate sharing electronic device, and an address of the intermediate sharing electronic device may be a MAC address of the intermediate sharing electronic device. In an embodiment, the address of the intermediate sharing electronic device may be an RPA.

In an embodiment, the AdvData field 1010 may be implemented with up to 255 bytes, and may include a length field 1012, a type field 1014, a service ID field 1016, and a service data field 1018. The length field 1012, the type field 1014, and the service ID field 1016 may be implemented similarly to a length field 812, a type field 814, and a service ID field 816 in FIG. 8, so a detailed description thereof will be omitted.

In an embodiment, the service data field 1018 may include service data related to the service ID included in the service ID field 1016. The service data field 1018 may include a length field 1022, a type field 1024, a requested authority field 1026, a requested validity period field 1028, and an address information field 1030.

In an embodiment, the length field 1022 may include length information of the requested authority field 1026, the requested validity period field 1028, and the address information field 1030. The type field 1024 may include type information of the service data included in the service data field 1018. In an embodiment, the type information of the service data included in the service data field 1018 may indicate a temporary IRK issue request. In an embodiment, the type information of the service data included in the service data field 1018 may indicate that a corresponding packet is a temporary IRK request packet.

In an embodiment, the requested authority field 1026 may include information related to requested authority which the source sharing electronic device requests to have if the source sharing electronic device accesses a target sharing electronic device (e.g., a first electronic device 601 in FIG. 6). In an embodiment, the information related to the requested authority included in the requested authority field 1026 may be identical to information related to requested authority included in a requested authority field included in a sharing request packet received from the source sharing electronic device by the intermediate sharing electronic device. In an embodiment, the intermediate sharing electronic device may modify the information related to the requested authority included in the requested authority field included in the sharing request packet received from the source sharing electronic device to include the modified information related to the requested authority in the requested authority field 1026. In an embodiment, if the intermediate sharing electronic device does not permit the information related to the requested authority included in the requested authority field included in the sharing request packet received from the source sharing electronic device, the intermediate sharing electronic device may include, in a sharing response packet, information indicating that the information related to the requested authority included in the requested authority field included in the sharing request packet received from the source sharing electronic device is not permitted and transmit the sharing response packet without generating a temporary IRK request packet. The requested authority has been described in FIG. 8, so a detailed description thereof will be omitted herein.

In an embodiment, the requested validity period field 1028 may include requested validity period information indicating a validity period of a temporary IRK which the source sharing electronic device requests. In an embodiment, the requested validity period information included in the requested validity period field 1028 may be identical to requested validity period information included in a requested validity period information field included in the sharing request packet received from the source sharing electronic device by the intermediate sharing electronic device. In an embodiment, the intermediate sharing electronic device may modify the requested validity period information included in the requested validity period field included in the sharing request packet received from the source sharing electronic device to include the modified requested validity period information in the requested validity period field 1028. In an embodiment, if the intermediate sharing electronic device does not permit the requested authority validity period information included in the requested validity period field included in the sharing request packet received from the source sharing electronic device, the intermediate sharing electronic device may include, in the sharing response packet, information indicating that the requested validity period included in the requested validity period field included in the sharing request packet received from the source sharing electronic device is not permitted and transmit the sharing response packet without generating the temporary IRK request packet.

In an embodiment, the address information field 1030 may include address information related to an address which the source sharing electronic device will use for a BLE communication with the target sharing electronic device. In an embodiment, the address information included in the address information field 1030 may be identical to address information included in an address information field included in the sharing request packet received from the source sharing electronic device by the intermediate sharing electronic device. In an embodiment, the intermediate sharing electronic device may modify the address information included in the address information field included in the sharing request packet received from the source sharing electronic device to include the modified address information in the address information field 1030. In an embodiment, if the intermediate sharing electronic device does not permit the address information included in the address information field included in the sharing request packet received from the source sharing electronic device, the intermediate sharing electronic device may include, in the sharing response packet, information indicating that the address information included in the address information field included in the sharing request packet received from the source sharing electronic device is not permitted and transmit the sharing response packet without generating the temporary IRK request packet. In an embodiment, the address information included in the address information field 1030 may be address information included in an AdvA field included in the sharing request packet received by the intermediate sharing electronic device from the source sharing electronic device.

A case in which the AdvData field 1010 is implemented in a form including the length field 1012, the type field 1014, the service ID field 1016, and the service data field 1018 has been illustrated in FIG. 10, however, the AdvData field 1010 may also be implemented in a form including a length field, a type field, a manufacturer ID field, and a manufacturer data field. The length field and the manufacturer ID field included in the AdvData field 1010 may be implemented similarly to a length field and a manufacturer ID field included in an AdvData field 810 in FIG. 8, so a detailed description thereof will be omitted.

In an embodiment, the manufacturer data field may include manufacturer-specific data related to the manufacturer ID included in the manufacturer ID field. The manufacturer data field may include a length field, a type field, a requested authority field, a requested validity period field, and an address information field.

In an embodiment, the length field may include length information of the requested authority field, the requested validity period field, and the address information field. The type field may include type information of the manufacturer-specific data included in the manufacturer data field. In an embodiment, the type information of the service data included in the manufacturer data field may indicate a temporary IRK issue request. In an embodiment, the type information of the service data included in the manufacturer data field may indicate that a corresponding packet is a temporary IRK request packet.

In an embodiment, the requested authority field, the requested validity period field, and the address information field included in the manufacturer data field may be implemented similarly to a requested authority field 826, a requested validity period field 828, and an address information field 830 included in a service data field 818 in FIG. 8, so a detailed description thereof will be omitted.

Figure 11:
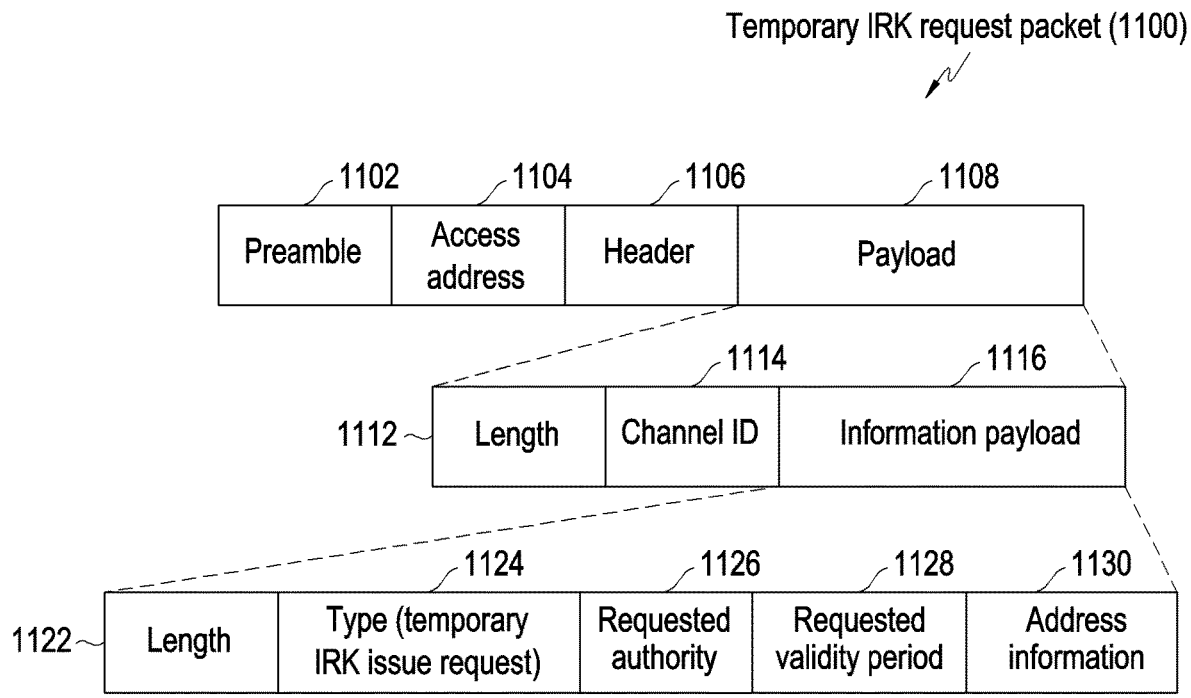
FIG. 11 is a diagram schematically illustrating another example of a format of a temporary IRK request packet according to an embodiment.

FIG. 11 is a diagram schematically illustrating another example of a format of a temporary IRK request packet according to an embodiment.

Referring to FIG. 11, a temporary IRK request packet 1100 illustrated in FIG. 11 may be based on a structure of a data packet. The temporary IRK request packet 1100 may include a preamble field 1102, an access address field 1104, and a PDU field. In an embodiment, the PDU field may include a header field 1106 and a payload field 1108.

In an embodiment, the preamble field 1102 may include information used for an electronic device (e.g., an electronic device 101 in FIG. 1 or a first electronic device 601 in FIG. 6) which receives the temporary IRK request packet 1100 to perform frequency synchronization and/or symbol timing estimation. The preamble field 1102 may be implemented with, for example, one byte, and the preamble field 1102 may be implemented similarly to a preamble field 802 in FIG. 8, a preamble field 902 in FIG. 9, or a preamble field 1002 in FIG. 10, so a detailed description thereof will be omitted.

In an embodiment, the access address field 1004 may include an access address related to the temporary IRK request packet 1100. In an embodiment temporary IRK request packet 1100 is based on the structure of the data packet, so the access address field 1104 may include an access address designated for a data channel packet. For example, the access address field 1104 may be implemented with four bytes.

In an embodiment, the header field 1106 may include information indicating a type and a length of data included in the payload field 1108. The header field 1106 may be implemented similarly to a header field 906 in FIG. 9, so a detailed description thereof will be omitted.

In an embodiment, the payload field 1108 may include a length field 1112, a CID field 1114, and an information payload field 1116.

In an embodiment, the length field 1112 may include length information indicating a length of the information payload field 1116. For example, the length field 1112 may be implemented with two bytes.

In an embodiment, the CID field 1114 may include a CID which identifies a destination channel endpoint of the temporary IRK request packet 1100. For example, the CID field 1114 may be implemented with two bytes.

In an embodiment, the information payload field 1116 may include a length field 1122, a type field 1124, a requested authority field 1126, a requested validity period field 1128, and an address information field 1130. For example, the information payload field 1116 may be implemented with up to 65,535 bytes.

In an embodiment, the length field 1122 may include length information of the requested authority field 1126, the requested validity period field 1128, and the address information field 1130. The type field 1124 may include type information of an information payload included in the information payload field 1116. In an embodiment, type information of the information payload included in the information payload field 1116 may indicate a temporary IRK issue request. In an embodiment, type information of the information payload included in the information payload field 1116 may indicate that a corresponding packet is a temporary IRK request packet.

In an embodiment, the requested authority field 1126 may include information related to requested authority which the source sharing electronic device requests to have if the source sharing electronic device accesses a target sharing electronic device (e.g., a first electronic device 601 in FIG. 6). In an embodiment, the information related to the requested authority included in the requested authority field 1126 may be identical to information related to requested authority included in a requested authority field included in a sharing request packet received from the source sharing electronic device by the intermediate sharing electronic device. In an embodiment, the intermediate sharing electronic device may modify the information related to the requested authority included in the requested authority field included in the sharing request packet received from the source sharing electronic device to include the modified information related to the requested authority in the requested authority field 1126. In an embodiment, if the intermediate sharing electronic device does not permit the information related to the requested authority included in the requested authority field included in the sharing request packet received from the source sharing electronic device, the intermediate sharing electronic device may include, in a sharing response packet, information indicating that the information related to the requested authority included in the requested authority field included in the sharing request packet received from the source sharing electronic device is not permitted and transmit the sharing response packet without generating a temporary IRK request packet. The requested authority has been described in FIG. 8, so a detailed description thereof will be omitted.

In an embodiment, the requested validity period field 1128 may include requested validity period information indicating a validity period of a temporary IRK which the source sharing electronic device requests. In an embodiment, the requested validity period information included in the requested validity period field 1128 may be identical to requested validity period information included in a requested validity period information field included in the sharing request packet received from the source sharing electronic device by the intermediate sharing electronic device. In an embodiment, the intermediate sharing electronic device may modify the requested validity period information included in the requested validity period field included in the sharing request packet received from the source sharing electronic device to include the modified requested validity period information in the requested validity period field 1128. In an embodiment, if the intermediate sharing electronic device does not permit the requested authority validity period information included in the requested validity period field included in the sharing request packet received from the source sharing electronic device, the intermediate sharing electronic device may include, in the sharing response packet, information indicating that the requested validity period included in the requested validity period field included in the sharing request packet received from the source sharing electronic device is not permitted and transmit the sharing response packet without generating the temporary IRK request packet.

In an embodiment, the address information field 1130 may include address information related to an address which the source sharing electronic device will use for a BLE communication with the target sharing electronic device. In an embodiment, the address information included in the address information field 1130 may be the identical to information included in an address information field included in the sharing request packet received from the source sharing electronic device by the intermediate sharing electronic device. In an embodiment, the intermediate sharing electronic device may modify the address information included in the address information field included in the sharing request packet received from the source sharing electronic device to include the modified address information in the address information field 1130. In an embodiment, if the intermediate sharing electronic device does not permit the address information included in the address information field included in the sharing request packet received from the source sharing electronic device, the intermediate sharing electronic device may include, in the sharing response packet, information indicating that the address information included in the address information field included in the sharing request packet received from the source sharing electronic device is not permitted and transmit the sharing response packet without generating the temporary IRK request packet. In an embodiment, the address information included in the address information field 1130 may be the address information included in the address information field included in the sharing request packet received by the intermediate sharing electronic device from the source sharing electronic device.

Referring back to FIG. 6, upon receiving the temporary IRK request packet from the second electronic device 602, the first electronic device 601 may detect that it is requested to issue the temporary IRK according to the sharing request of the third electronic device 603. In operation 625, the first electronic device 601 may determine whether to issue the temporary IRK.

In an embodiment, upon detecting that it is requested to issue the temporary IRK according to the sharing request of the third electronic device 603, the first electronic device 601 may directly issue the temporary IRK to the third electronic device 603, and in this case, operation 625 and the following operations 637 and 639 may be omitted.

If the first electronic device 601 determines to issue the temporary IRK, in operation 627, the first electronic device 601 may generate the temporary IRK of the first electronic device 601 based on the received temporary IRK request packet. In an embodiment, the temporary IRK of the first electronic device 601 will be referred to as IRK1'. In an embodiment, a scheme of generating the temporary IRK may be implemented in various forms. According to an embodiment, the temporary IRK may be generated as a random value.

In an embodiment, the first electronic device 601 may map and store the generated temporary IRK together with information related to the temporary IRK. In an embodiment, the information related to the temporary IRK may include information related to authority which the source sharing electronic device is permitted to have if the source sharing electronic device (e.g., the third electronic device 603) transmitting the sharing request packet accesses the target sharing electronic device (e.g., the first electronic device 601), a validity period permitted for the temporary IRK, and an address to be used for a BLE communication between the source sharing electronic device and the target sharing electronic device. Hereinafter, for convenience of a description, the information related to the temporary IRK will be referred to as "temporary IRK-related information".

In an embodiment, the authority which the source sharing electronic device is permitted to have if the source sharing electronic device accesses the target sharing electronic device may be identical to authority included in the requested authority field included in the sharing request packet transmitted by the source sharing electronic device. In an embodiment, the authority which the source sharing electronic device is permitted to have if the source sharing electronic device accesses the target sharing electronic device may be identical to authority included in the requested authority field included in the temporary IRK request packet transmitted by the intermediate sharing electronic device. In an embodiment, the authority which the source sharing electronic device is permitted to have if the source sharing electronic device accesses the target sharing electronic device may be authority which is generated by modifying the authority included in the requested authority field included in the sharing request packet. In an embodiment, the authority which the source sharing electronic device is permitted to have if the source sharing electronic device accesses the target sharing electronic device may be authority which is generated by modifying the authority included in the requested authority field included in the temporary IRK request packet transmitted by the intermediate sharing electronic device.

The first electronic device 601 which has generated the temporary IRK may generate a temporary IRK response packet which is a response packet to the temporary IRK request packet and transmits the generated temporary IRK response packet to the second electronic device 602 in operation 629. In an embodiment, the temporary IRK response packet may be a packet including the generated temporary IRK of the target sharing electronic device. In an embodiment, the temporary IRK response packet may be a packet which is transmitted from the target sharing electronic device to the intermediate sharing electronic device and includes the generated temporary IRK of the target sharing electronic device. In an embodiment, the temporary IRK response packet may be a packet indicating a response to a temporary IRK generation request. The temporary IRK response packet may be implemented as a packet which is based on the BLE scheme, or may be implemented as a packet which based on the 00B scheme. FIG. 6 illustrates a case in which the first electronic device 601 transmits the temporary IRK to the third electronic device 603 through the second electronic device 602, however, the first electronic device 601 may transmit the temporary IRK to the third electronic device 603 through a server or a cloud, this will be described in more detail below with reference to FIG. 16.

A format of a temporary IRK response packet in a wireless communication network according to an embodiment will be described with reference to FIGS. 12 and 13.

Figure 12:
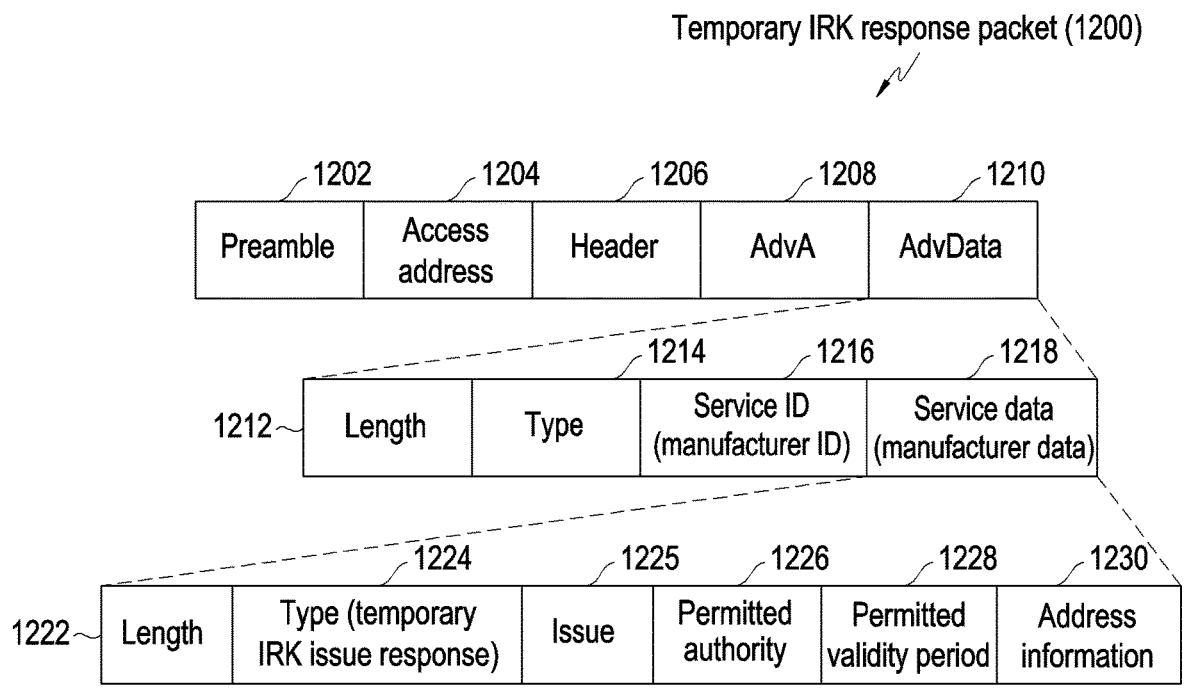
FIG. 12 is a diagram schematically illustrating an example of a format of a temporary IRK response packet according to an embodiment.

FIG. 12 is a diagram schematically illustrating an example of a format of a temporary IRK response packet according to an embodiment.

Referring to FIG. 12, a temporary IRK response packet 1200 illustrated in FIG. 12 may be based on a structure of a BLE ADV packet. The temporary IRK response packet 1200 may include a preamble field 1202, an access address field 1204, and a PDU field. In an embodiment, the PDU field may include a header field 1206 and a payload field. In an embodiment, the payload field may include an AdvA field 1208 and an AdvData field 1210.

In an embodiment, the preamble field 1202 may include information used for an electronic device (e.g., a second electronic device 602 in FIG. 6) which receives the temporary IRK response packet 1200 to perform frequency synchronization and/or symbol timing estimation. The preamble field 1202 may be implemented with, for example, one byte. The preamble field 1202 may be implemented similarly to a preamble field 802 in FIG. 8, a preamble field 902 in FIG. 9, a preamble field 1002 in FIG. 10, or a preamble field 1102 in FIG. 11, so a detailed description thereof will be omitted.

In an embodiment, the access address field 1204 may include an access address related to the temporary IRK response packet 1200. In an embodiment, temporary IRK response packet 1200 is based on the structure of the BLE ADV packet, the access address field 1204 may include an access address (e.g., 0b10001110_10001001_10111110_11010110 (0x8E89BED6)) designated for an advertisement physical channel packet. For example, the access address field 1204 may be implemented with four bytes.

According to an embodiment, the header field 1206 may include information indicating a type and a length of data included in the AdvData field 1210, and may be implemented similarly to a header field 806 in FIG. 8 or a header field 1006 in FIG. 10, so a detailed description thereof will be omitted.

In an embodiment, the AdvA field 1208 may include an address of an electronic device (e.g., a first electronic device 601 in FIG. 6) which transmits the temporary IRK response packet 1200. In an embodiment, the electronic device which transmits the temporary IRK response packet 1200 may be a target sharing electronic device, and an address of the target sharing electronic device may be a MAC address of the target sharing electronic device. In an embodiment, the address of the target sharing electronic device may be an RPA.

In an embodiment, the AdvData field 1210 may be implemented with up to 255 bytes, and may include a length field 1212, a type field 1214, a service ID field 1216, and a service data field 1218. The length field 1212, the type field 1214, and the service ID field 1216 may be implemented similarly to a length field 812, a type field 814, and a service ID field 816 in FIG. 8, or a length field 1012, a type field 1014, and a service ID field 1016 in FIG. 10, so a detailed description thereof will be omitted.

In an embodiment, the service data field 1218 may include service data related to the service ID included in the service ID field 1216. The service data field 1218 may include a length field 1222, a type field 1224, an issue field 1225, a permitted authority field 1226, a permitted validity period field 1228, and an address information field 1230.

In an embodiment, the length field 1222 may include length information of the permitted authority field 1226, the permitted validity period field 1228, and the address information field 1230. The type field 1224 may include type information of the service data included in the service data field 1218. In an embodiment, the type information of the service data included in the service data field 1218 may indicate a temporary IRK issue response. In an embodiment, the type information of the service data included in the service data field 1218 may indicate that a corresponding packet is a temporary IRK response packet.

In an embodiment, the issue field 1225 may include an issue indicator indicating whether a temporary IRK is issued, a rejection reason indicator, and a temporary IRK generated by the target sharing electronic device. For example, the issue indicator may be implemented with one bit. For example, if a bit value of the issue indicator is 1, it may indicate that the temporary IRK is issued, and if the bit value of the issue indicator is 0, it may indicate that the temporary IRK is not issued. For, the rejection reason indicator may be implemented with two bits, and the rejection reason indicator will be described in detail in a description of operation 637 below, so a detailed description thereof will be omitted. For example, the first electronic device 601 has issued the temporary IRK in operation 627, the bit value of the issue indicator may be set to 1 to indicate that the temporary IRK is issued. If the bit value of the issue indicator is set to 1 to indicate that the temporary IRK is issued, the bit value of the rejection reason indicator may be set to an arbitrary value, and the bit value of the rejection reason indicator set to the arbitrary value may be ignored.

In an embodiment, the permitted authority field 1226 may include information related to permitted authority which the source sharing electronic device is permitted to have if the source sharing electronic device accesses a target sharing electronic device (e.g., a first electronic device 601 in FIG. 6). In an embodiment, the information related to the permitted authority included in the permitted authority field 1226 may be identical to information related to requested authority included in a requested authority field included in a temporary IRK request packet received from the intermediate sharing electronic device. For example, the information related to the requested authority included in the requested authority field included in the temporary IRK request packet may be identical to information related to requested authority included in a requested authority field included in a sharing request packet received from the source sharing electronic device by the intermediate sharing electronic device. The requested authority has been described in FIG. 8, so a detailed description thereof will be omitted. In an embodiment, the information related to the permitted authority included in the permitted authority field 1226 may be different from the requested authority included in the requested authority field included in the temporary IRK request packet received from the intermediate sharing electronic device. In an embodiment, the information related to the permitted authority included in the permitted authority field 1226 may include information related to permitted authority which is generated by modifying the requested authority included in the requested authority field included in the temporary IRK request packet. For example, it will be assumed that the information related to the requested authority included in the requested authority field included in the temporary IRK request packet indicates an authority request for operation A and operation B. If the authority for operation A and operation B is requested from the source sharing electronic device, the target sharing electronic device may permit the requested authority for all of operation A and operation B, may permit the requested authority for one of operation A and operation B, or may reject the requested authority for all of operation A and operation B. For example, if the target sharing electronic device permits the authority request for all of operation A and operation B, the information related to the permitted authority included in the permitted authority field 1226 may be identical to the information related to the requested authority included in the requested authority field included in the temporary IRK request packet received from the intermediate sharing electronic device. For example, if the target sharing electronic device rejects the authority request for all of operation A and operation B, or permits the authority request for one of operation A and operation B, the information related to the permitted authority included in the permitted authority field 1226 may include the information related to the permitted authority which is generated by modifying the requested authority included in the requested authority field included in the temporary IRK request packet received from the intermediate sharing electronic device. In an embodiment, the information related to the permitted authority included in the permitted authority field 1226 may include information related to available authority regardless of the requested authority included in the requested authority field included in the temporary IRK request packet. For example, the target sharing electronic device may include the information related to the available authority (e.g., authority for operation C and operation D) irrespective of operation A and operation B.

In an embodiment, the permitted validity period field 1228 may include permitted validity period information indicating a validity period of a temporary IRK which the target sharing electronic device permits. In an embodiment, the permitted validity period information included in the permitted validity period field 1228 may be identical to requested validity period information included in a requested validity period field included in the temporary IRK request packet received from the intermediate sharing electronic device. For example, the requested validity period information included in the requested validity period field included in the temporary IRK request packet may be identical to requested validity period information included in a requested validity period field included in a sharing request packet received from the source sharing electronic device by the intermediate sharing electronic device. In an embodiment, the permitted validity period information included in the permitted validity period field 1228 may be different from the requested validity period information included in the requested validity period field included in the temporary IRK request packet received from the intermediate sharing electronic device. In an embodiment, the permitted validity period information included in the permitted validity period field 1228 may include information related to a permitted validity period which is generated by modifying the requested validity period information included in the requested validity period field included in the temporary IRK request packet. For example, if a maximum validity period for a temporary IRK which is permitted by the target sharing electronic device is time X, and the requested validity period information included in the requested validity period field included in the temporary IRK request packet indicates time Y which exceeds time X, the target sharing electronic device may not support time Y as the validity period for the temporary IRK. In this case, the target sharing electronic device may modify the validity period for the temporary IRK to time Y to include time Y in the permitted validity period field 1228.

In an embodiment, the address information field 1230 may include address information related to an address which the source sharing electronic device will use for a BLE communication with the target sharing electronic device. In an embodiment, the address information included in the address information field 1230 may be identical to or different from address information included in an address information field (e.g., an address information field 1030 in FIG. 10) included in the temporary IRK request packet. The temporary IRK response packet 1200 in which the AdvData field 1210 is implemented with a form of including the length field 1212, the type field 1214, the service ID field 1216, and the service data field 1218 has been illustrated in FIG. 12.

In an embodiment, the temporary IRK response packet 1200 may be also implemented in a form of the AdvData field 1210 including a length field, a type field, a manufacturer ID field, and a manufacturer data field. The length field and the manufacturer ID field included in the AdvData field 1210 may be implemented similarly to a length field and a manufacturer ID field included in an AdvData field 810 in FIG. 8 or a length field and a manufacturer ID field included in an AdvData field 1010 in FIG. 10, so a detailed description thereof will be omitted.

In an embodiment, the manufacturer data field may include manufacturer-specific data related to the manufacturer ID included in the manufacturer ID field. The manufacturer data field may include a length field, a type field, a permitted authority field, a permitted validity period field, an issue field, and an address information field.

In an embodiment, the length field may include length information of the permitted authority field, the permitted validity period field, and the address information field. The type field may include type information of the manufacturer-specific data included in the manufacturer data field. In an embodiment, the type information of the service data included in the manufacturer data field may indicate a temporary IRK issue response. In an embodiment, the type information of the service data included in the manufacturer data field may indicate that a corresponding packet is a temporary IRK response packet. The issue field, the permitted authority field, the permitted validity period field, and the address information field included in the manufacturer data field may be implemented similarly to the issue field 1225, the permitted authority field 1226, the permitted validity period field 1228, and the address information field 1230, so a detailed description thereof will be omitted.

Figure 13:
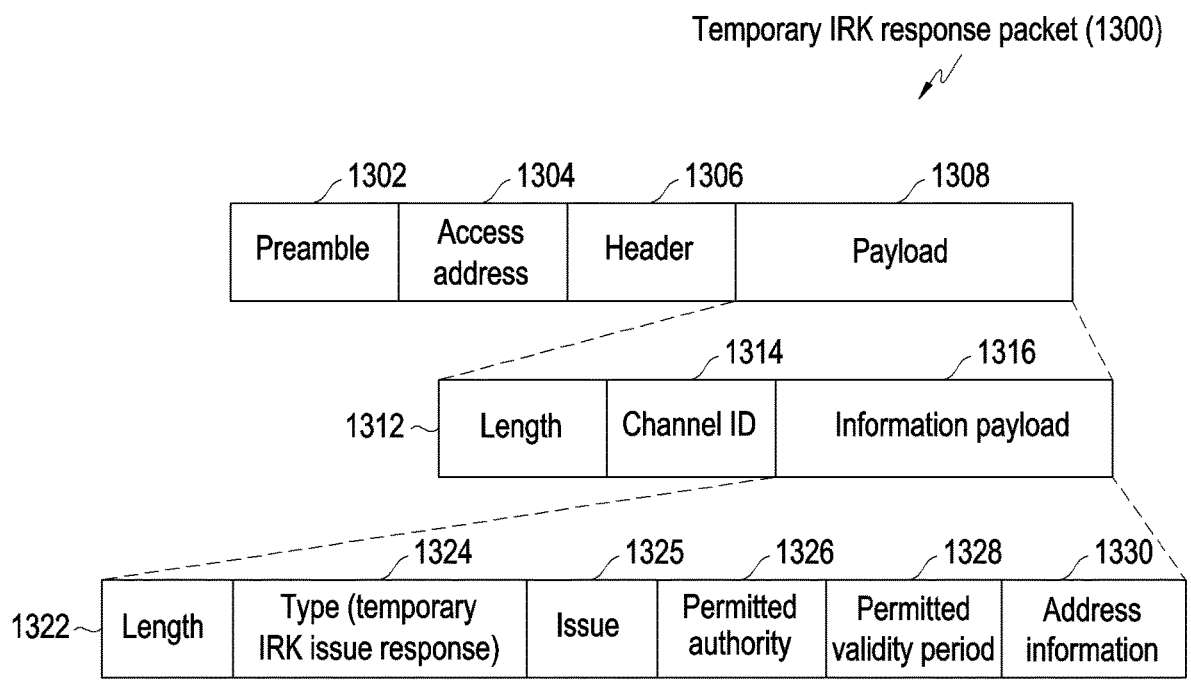
FIG. 13 is a diagram schematically illustrating another example of a format of a temporary IRK response packet according to an embodiment.

FIG. 13 is a diagram schematically illustrating an example of a format of a temporary IRK response packet according to an embodiment.

Referring to FIG. 13, a temporary IRK response packet 1300 illustrated in FIG. 13 may be based on a structure of a data packet. The temporary IRK response packet 1300 may include a preamble field 1302, an access address field 1304, and a PDU field. In an embodiment, the PDU field may include a header field 1306 and a payload field 1308.

In an embodiment, the preamble field 1302 may include information used for an electronic device (e.g., a second electronic device 602 in FIG. 6) which receives the temporary IRK response packet 1300 to perform frequency synchronization and/or symbol timing estimation. The preamble field 1302 may be implemented with, for example, one byte, and the preamble field 1302 may be implemented similarly to a preamble field 802 in FIG. 8, a preamble field 902 in FIG. 9, a preamble field 1002 in FIG. 10, a preamble field 1102 in FIG. 11, or a preamble field 1202 in FIG. 12, so a detailed description thereof will be omitted herein.

In an embodiment, the access address field 1304 may include an access address related to the temporary IRK response packet 1300. In an embodiment, the temporary IRK response packet 1300 is based on the structure of the data packet, so the access address field 1304 may include an access address designated for a data channel packet. For example, the access address field 1304 may be implemented with four bytes.

In an embodiment, the header field 1306 may include information indicating a type and a length of data included in the payload field 1308. The header field 1306 may be implemented similarly to a header field 906 in FIG. 9 or a header field 1106 in FIG. 11, so a detailed description thereof will be omitted herein.

In an embodiment, the payload field 1308 may include a length field 1312, a CID field 1314, and an information payload field 1316.

In an embodiment, the length field 1312 may include length information indicating a length of the information payload field 1316. For example, the length field 1312 may be implemented with two bytes.

In an embodiment, the CID field 1314 may include a CID which identifies a destination channel endpoint of the temporary IRK response packet 1300. For example, the CID field 1314 may be implemented with two bytes.

In an embodiment, the information payload field 1316 may include a length field 1322, a type field 1324, an issue field 1325, a permitted authority field 1326, a permitted validity period field 1328, and an address information field 1330. For example, the information payload field 1316 may be implemented with up to 65,535 bytes.

In an embodiment, the length field 1322 may include length information of the permitted authority field 1326, the permitted validity period field 1328, and the address information field 1330. The type field 1324 may include type information of the information payload included in the information payload field 1316. In an embodiment, the type information of the information payload included in the information payload field 1316 may indicate a temporary IRK issue response. In an embodiment, the type information of the information payload included in the information payload field 1316 may indicate that a corresponding packet is a temporary IRK response packet.

In an embodiment, the issue field 1325 may include an issue indicator indicating whether a temporary IRK is issued, a rejection reason indicator, and a temporary IRK generated by the target sharing electronic device. For example, the issue indicator may be implemented with one bit. For example, if a bit value of the issue indicator is 1, it may indicate that the temporary IRK is issued, and if the bit value of the issue indicator is 0, it may indicate that the temporary IRK is not issued. For, the rejection reason indicator may be implemented with two bits, and the rejection reason indicator will be described in detail in a description of operation 637 below, so a detailed description thereof will be omitted. For example, the first electronic device 601 has issued the temporary IRK in operation 627, the bit value of the issue indicator may be set to 1 to indicate that the temporary IRK is issued. If the bit value of the issue indicator is set to 1 to indicate that the temporary IRK is issued, the bit value of the rejection reason indicator may be set to an arbitrary value, and the bit value of the rejection reason indicator set to the arbitrary value may be ignored.

In an embodiment, the permitted authority field 1326 may include information related to permitted authority which the source sharing electronic device is permitted to have if the source sharing electronic device accesses a target sharing electronic device (e.g., a first electronic device 601 in FIG. 6). In an embodiment, the information related to the permitted authority included in the permitted authority field 1326 may be identical to information related to requested authority included in a requested authority field included in a temporary IRK request packet received from the intermediate sharing electronic device. For example, the information related to the requested authority included in the requested authority field included in the temporary IRK request packet may be identical to information related to a requested authority included in a requested authority field included in a sharing request packet received from the source sharing electronic device by the intermediate sharing electronic device. The requested authority has been described in FIG. 8, so a detailed description thereof will be omitted. In an embodiment, the information related to the permitted authority included in the permitted authority field 1326 may be different from the requested authority included in the requested authority field included in the temporary IRK request packet received from the intermediate sharing electronic device. In an embodiment, the information related to the permitted authority included in the permitted authority field 1326 may include information related to permitted authority generated by modifying the requested authority included in the requested authority field included in the temporary IRK request packet. The permitted authority field 1326 may be implemented similarly to a permitted authority field 1226 in FIG. 12, so a detailed description thereof will be omitted.

In an embodiment, the permitted validity period field 1328 may include permitted validity period information indicating a validity period of a temporary IRK which the target sharing electronic device permits. In an embodiment, the permitted validity period information included in the permitted validity period field 1328 may be identical to the requested validity period information included in the requested validity period field included in the temporary IRK request packet received from the intermediate electronic device. For example, the requested validity period information included in the requested validity period field included in the temporary IRK request packet may be identical to the requested validity period information included in the requested validity period field included in the sharing request packet received from the source sharing electronic device by the intermediate electronic device. In an embodiment, the permitted validity period information included in the permitted validity period field 1328 may be different from the requested validity period information included in the requested validity period field included in the temporary IRK request packet received from the intermediate sharing electronic device. In an embodiment, the permitted validity period information included in the permitted validity period field 1328 may include information related to a permitted validity period which is generated by modifying the requested validity period information included in the requested validity period field included in the temporary IRK request packet. The permitted validity period field 1328 may be implemented similarly to a permitted validity period field 1228 in FIG. 12, so a detailed description thereof will be omitted.

In an embodiment, the address information field 1330 may include address information related to an address which the source sharing electronic device will use for a BLE communication with the target sharing electronic device.

Referring back to FIG. 6, the second electronic device 602 receiving the temporary IRK response packet from the first electronic device 601 may transmit, the third electronic device 603, a sharing response packet which is a response packet to the sharing request packet in operation 631. In an embodiment, the sharing response packet may be a packet including the generated temporary IRK of the target sharing electronic device. In an embodiment, the sharing response packet may be a packet which is transmitted from the intermediate sharing electronic device to the source sharing electronic device and includes the generated temporary IRK of the target sharing electronic device. In an embodiment, the sharing response packet may be a packet indicating a response to a temporary IRK generation request. For example, the address information field included in the temporary IRK response packet may include the temporary IRK (e.g., IRK1') generated by the first electronic device 601. In an embodiment, the sharing response packet may be implemented as a packet which is based on the BLE scheme or a packet which is based on the 00B scheme.

A format of a sharing response packet in a wireless communication network according to an embodiment will be described with reference to FIGS. 14 and 15.

Figure 14:
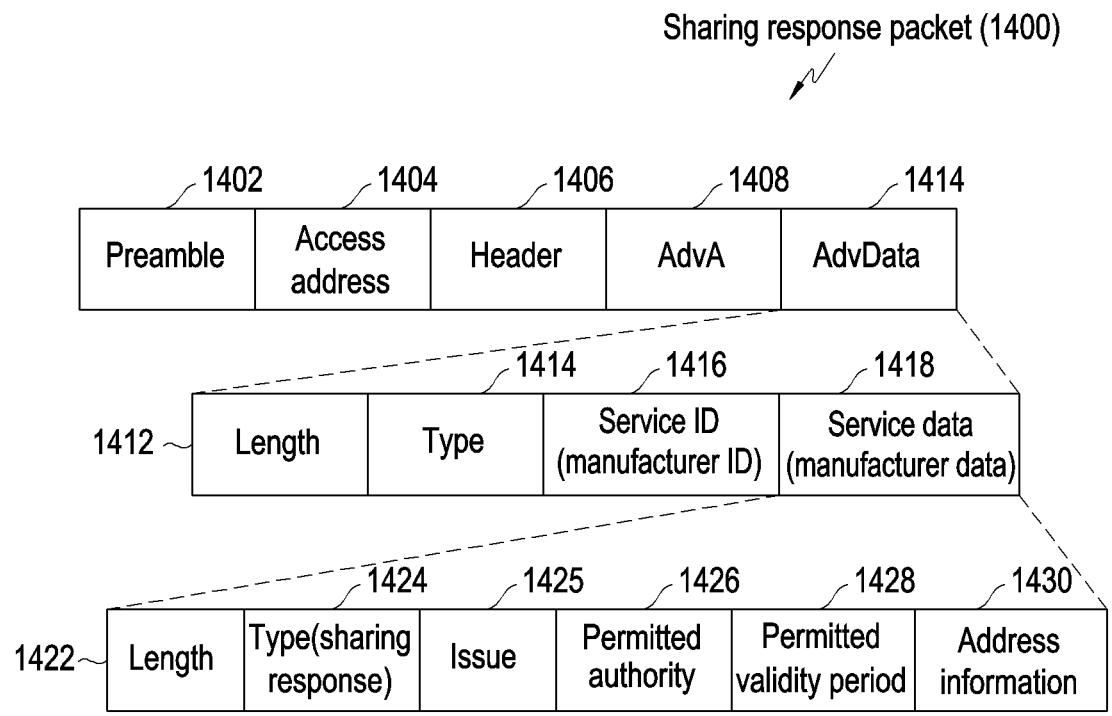
FIG. 14 is a diagram schematically illustrating an example of a format of a sharing response packet in a wireless communication network according to an embodiment.

FIG. 14 is a diagram schematically illustrating an example of a format of a sharing response packet in a wireless communication network according to an embodiment.

Referring to FIG. 14, a sharing response packet 1400 illustrated in FIG. 14 may be based on a structure of a BLE ADV packet. The sharing response packet 1400 may include a preamble field 1402, an access address field 1404, and a PDU field. In an embodiment, the PDU field may include a header field 1406 and a payload field 1408. In an embodiment, the payload field 1408 may include an AdvA field 1409 and an AdvData field 1410.

In an embodiment, the preamble field 1402 may include information used for an electronic device (e.g., a third electronic device 603 in FIG. 6) which receives the sharing response packet 1400 to perform frequency synchronization and/or symbol timing estimation. The preamble field 1402 may be implemented with, for example, one byte. The preamble field 1402 may be implemented similarly to a preamble field 802 in FIG. 8, a preamble field 902 in FIG. 9, a preamble field 1002 in FIG. 10, a preamble field 1102 in FIG. 11, a preamble field 1202 in FIG. 12, or a preamble field 1302 in FIG. 13, so a detailed description thereof will be omitted.

In an embodiment, the access address field 1004 may include an access address related to the sharing response packet 1400. In an embodiment, the sharing response packet 1400 is based on the structure of the BLE ADV packet, so the access address field 1404 may include an access address (e.g., 0b10001110_10001001_10111110_11010110 (0x8E89BED6)) designated for an advertisement physical channel packet. For example, the access address field 1404 may be implemented with four bytes.

In an embodiment, the header field 1406 may include information indicating a type and a length of data included in the AdvData field 1410, and may be implemented similarly to a header field 806 in FIG. 8, a header field 1006 in FIG. 10, or a header field 1206 in FIG. 12, so a detailed description thereof will be omitted.

In an embodiment, the AdvA field 1409 may include an address of an electronic device (e.g., a second electronic device 602 in FIG. 6) which transmits the sharing response packet 1400. In an embodiment, the electronic device which transmits the sharing response packet 1400 may be an intermediate sharing electronic device, and an address of the intermediate sharing electronic device may be a MAC address of the intermediate sharing electronic device. In an embodiment, the address of the intermediate sharing electronic device may be an RPA.

In an embodiment, the AdvData field 1410 may be implemented with up to 255 bytes, and may include a length field 1412, a type field 1414, a service ID field 1416, and a service data field 1418. The length field 1412, the type field 1414, and the service ID field 1416 may be implemented similarly to a length field 812, a type field 814, and a service ID field 816 in FIG. 8, a length field 1012, a type field 1014, and a service ID field 1016 in FIG. 10, or a length field 1212, a type field 1214, and a service ID field 1216 in FIG. 12, so a detailed description thereof will be omitted.

In an embodiment, the service data field 1418 may include service data related to the service ID included in the service ID field 1416. The service data field 1418 may include a length field 1422, a type field 1424, an issue field 1425, a permitted authority field 1426, a permitted validity period field 1428, and an address information field 1430.

In an embodiment, the length field 1422 may include length information of the permitted authority field 1426, the permitted validity period field 1428, and the address information field 1430. The type field 1424 may include type information of the service data included in the service data field 1418. In an embodiment, the type information of the service data included in the service data field 1418 may indicate a sharing response. In an embodiment, the type information of the service data included in the service data field 818 may indicate that a corresponding packet is a sharing response packet.

In an embodiment, the issue field 1425 may include an issue indicator indicating whether a temporary IRK is issued, a rejection reason indicator, and a temporary IRK generated by the target sharing electronic device. For example, the issue indicator may be implemented with one bit. For example, if a bit value of the issue indicator is 1, it may indicate that the temporary IRK is issued, and if the bit value of the issue indicator is 0, it may indicate that the temporary IRK is not issued. For example, the rejection reason indicator may be implemented with two bits, and the rejection reason indicator will be described in detail in a description of operation 637 below, so a detailed description thereof will be omitted herein. For example, the first electronic device 601 has issued the temporary IRK in operation 627, the bit value of the issue indicator may be set to 1 to indicate that the temporary IRK is issued. If the bit value of the issue indicator is set to 1 to indicate that the temporary IRK is issued, the bit value of the rejection reason indicator may be set to an arbitrary value, and the bit value of the rejection reason indicator set to the arbitrary value may be ignored.

In an embodiment, the permitted authority field 1426 may include information related to permitted authority which the source sharing electronic device is permitted to have if the source sharing electronic device accesses a target sharing electronic device (e.g., a first electronic device 601 in FIG. 6). In an embodiment, the information related to the permitted authority included in the permitted authority field 1426 may be identical to or different from information related to permitted authority included in a permitted authority field included in a temporary IRK response packet received from the target sharing electronic device. The information related to the permitted authority included in the permitted authority field 1426 may be implemented similarly to information related to permitted authority included in a permitted authority field 1426, so a detailed description thereof will be omitted herein.

In an embodiment, the permitted validity period field 1428 may include permitted validity period information indicating a validity period of a temporary IRK which the target sharing electronic device permits. In an embodiment, the permitted validity period information included in the permitted validity period field 1428 may be identical to or different from permitted validity period information included in a permitted validity period field included in the temporary IRK response packet received from the target sharing electronic device. The permitted validity period information included in the permitted validity period field 1428 may be implemented similarly to information related to permitted validity period information included in a permitted validity period field 1228 in FIG. 12, so a detailed description thereof will be omitted.

In an embodiment, the address information field 1430 may include address information related to an address which the source sharing electronic device will use for a BLE communication with the target sharing electronic device. In an embodiment, the address information included in the address information field 1430 may be identical to or different from an address included in an address information field (e.g., an address information field 1330 in FIG. 13) included in the temporary IRK response packet.

The sharing response packet 1400 in which the AdvData field 1410 is implemented with a form of including the length field 1412, the type field 1414, the service ID field 1416, and the service data field 1418 has been illustrated in FIG. 14. In an embodiment, the sharing response packet 1400 may be also implemented in a form of the AdvData field 1410 including a length field, a type field, a manufacturer ID field, and a manufacturer data field. The length field and the manufacturer ID field included in the AdvData field 1410 may be implemented similarly to a length field and a manufacturer ID field included in an AdvData field 810 in FIG. 8, a length field and a manufacturer ID field included in an AdvData field 1010 in FIG. 10, or a length field and a manufacturer ID field included in an AdvData field 1210 in FIG. 12, so a detailed description thereof will be omitted.

In an embodiment, the manufacturer data field may include manufacturer-specific data related to the manufacturer ID included in the manufacturer ID field. The manufacturer data field may include a length field, a type field, an issue field, a permitted authority field, a permitted validity period field, and an address information field.

In an embodiment, the length field may include length information of the permitted authority field, the permitted validity period field, and the address information field. The type field may include type information of the manufacturer-specific data included in the manufacturer data field. In an embodiment, the type information of the service data included in the manufacturer data field may indicate a sharing response. In an embodiment, the type information of the service data included in the manufacturer data field may indicate that a corresponding packet is a sharing response packet. The issue field, the permitted authority field, the permitted validity period field, and the address information field included in the manufacturer data field may be implemented similarly to the issue field 1425, the permitted authority field 1426, the permitted validity period field 1428, and the address information field 1430, so a detailed description thereof will be omitted.

Figure 15:
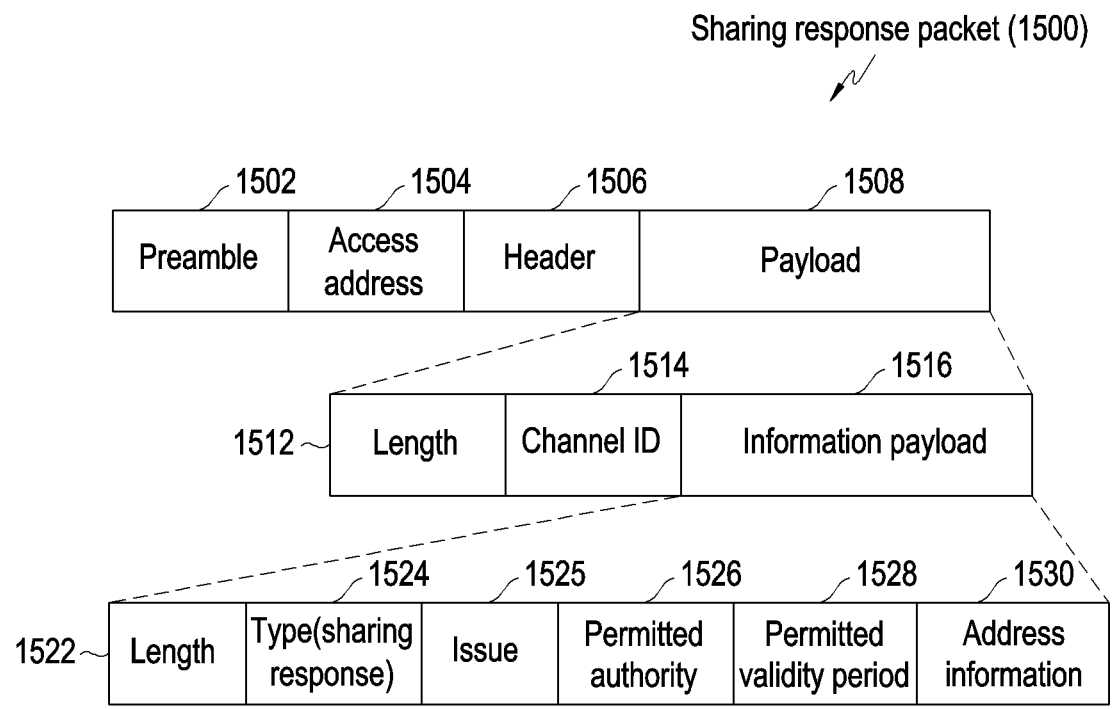
FIG. 15 is a diagram schematically illustrating another example of a format of a sharing response packet in a wireless communication network according to an embodiment.

FIG. 15 is a diagram schematically illustrating an example of a format of a sharing response packet according to an embodiment.

Referring to FIG. 15, a sharing response packet 1500 illustrated in FIG. 15 may be based on a structure of a data packet. The sharing response packet 1500 may include a preamble field 1502, an access address field 1504, and a PDU field. In an embodiment, the PDU field may include a header field 1506 and a payload field 1508.

In an embodiment, the preamble field 1502 may include information used for an electronic device (e.g., a third electronic device 603 in FIG. 6) which receives the sharing response packet 1500 to perform frequency synchronization and/or symbol timing estimation. The preamble field 1502 may be implemented with, for example, one byte, and the preamble field 1502 may be implemented similarly to a preamble field 802 in FIG. 8, a preamble field 902 in FIG. 9, a preamble field 1002 in FIG. 10, a preamble field 1102 in FIG. 11, a preamble field 1202 in FIG. 12, a preamble field 1302 in FIG. 13, or a preamble field 1402 in FIG. 14, so a detailed description thereof will be omitted herein.

In an embodiment, the access address field 1504 may include an access address related to the sharing response packet 1500. In an embodiment, the sharing response packet 1500 is based on the structure of the data packet, the access address field 1504 may include an access address designated for a data channel packet. For example, the access address field 1504 may be implemented with four bytes.

According to an embodiment, the header field 1506 may include information indicating a type and a length of data included in the payload field 1508. The header field 1506 may be implemented similarly to a header field 906 in FIG. 9, a header field 1106 in FIG. 11, or a header field 1306 in FIG. 13, so a detailed description thereof will be omitted.

In an embodiment, the payload field 1508 may include a length field 1512, a CID field 1514, and an information payload field 1516.

In an embodiment, the length field 1512 may include length information indicating a length of the information payload field 1516. For example, the length field 1512 may be implemented with two bytes.

In an embodiment, the CID field 1514 may include a CID which identifies a destination channel endpoint of the sharing response packet 1500. For example, the CID field 1514 may be implemented with two bytes.

In an embodiment, the information payload field 1516 may include a length field 1522, a type field 1524, an issue field 1525, a permitted authority field 1526, a permitted validity period field 1528, and an address information field 1530. For example, the information payload field 1516 may be implemented with up to 65,535 bytes.

In an embodiment, the length field 1522 may include length information of the permitted authority field 1526, the permitted validity period field 1528, and the address information field 1530. The type field 1524 may include type information of the information payload included in the information payload field 1516. In an embodiment, the type information of the information payload included in the information payload field 1516 may indicate a sharing response. In an embodiment, the type information of the information payload included in the information payload field 1516 may indicate that a corresponding packet is a sharing response packet.

In an embodiment, the issue field 1525 may include an issue indicator indicating whether a temporary IRK is issued, a rejection reason indicator, and a temporary IRK generated by the target sharing electronic device. For example, the issue indicator may be implemented with one bit. For example, if a bit value of the issue indicator is 1, it may indicate that the temporary IRK is issued, and if the bit value of the issue indicator is 0, it may indicate that the temporary IRK is not issued. For example, the rejection reason indicator may be implemented with two bits, and the rejection reason indicator will be described in detail in a description of operation 637 below, so a detailed description thereof will be omitted. For example, the first electronic device 601 has issued the temporary IRK in operation 627, the bit value of the issue indicator may be set to 1 to indicate that the temporary IRK is issued. If the bit value of the issue indicator is set to 1 to indicate that the temporary IRK is issued, the bit value of the rejection reason indicator may be set to an arbitrary value, and the bit value of the rejection reason indicator set to the arbitrary value may be ignored.

In an embodiment, the permitted authority field 1526 may include information related to permitted authority which the source sharing electronic device is permitted to have if the source sharing electronic device accesses a target sharing electronic device (e.g., a first electronic device 601 in FIG. 6). In an embodiment, the information related to the permitted authority included in the permitted authority field 1526 may be identical to or different from information related to permitted authority included in a permitted authority field included in a temporary IRK response packet received from the target sharing electronic device. The information related to the permitted authority included in the permitted authority field 1526 may be implemented similarly to information related to permitted authority included in a permitted authority field 1226 in FIG. 12, so a detailed description thereof will be omitted.

In an embodiment, the permitted validity period field 1528 may include permitted validity period information indicating a validity period of a temporary IRK which the target sharing electronic device permits. In an embodiment, the permitted validity period information included in the permitted validity period field 1528 may be identical to or different from permitted validity period information included in a permitted validity period field included in the temporary IRK response packet received from the target electronic device. The permitted validity period information included in the permitted validity period field 1528 may be implemented similarly to permitted validity period information included in a permitted validity period field 1228 in FIG. 12, so a detailed description thereof will be omitted.

In an embodiment, the address information field 1530 may include address information related to an address which the source sharing electronic device will use for a BLE communication with the target sharing electronic device. In an embodiment, the address information included in the address information field 1530 may be identical to or different from address information included in an address information field (e.g., an address information field 930 in FIG. 9) included in a sharing request packet.

Referring back to FIG. 6, in operation 633, the second electronic device 602 may map a temporary IRK (e.g., IRK1') and information related to the temporary IRK included in the temporary IRK response packet received from the first electronic device 601 to add a mapped result to a resolving list.

In an embodiment, the information related to the temporary IRK may include validity period information of the temporary IRK, and may further include any information required to manage the temporary IRK as well as the validity period information of the temporary IRK.

In an embodiment, after performing the BLE pairing process with the first electronic device 601, the second electronic device 602 may manage a resolving list by mapping the address of the first electronic device 601 (e.g., the address of the first electronic device 601 received from the first electronic device 601 during the BLE pairing process) and IRK1 in the resolving list. Thereafter, in operation 633, upon receiving IRK1' from the first electronic device 601, the second electronic device 602 may map the address of the first electronic device 601 and IRK1' to manage (add) the resolving list.

According to an embodiment, if an IRK of the third electronic device 603 is included in the address information field included in the sharing request packet received from the third electronic device 603, the second electronic device 602 may add the IRK (e.g., IRK3) of the third electronic device 603 to the resolving list.

In an embodiment, the temporary IRK response packet may include not only IRK1' but also an address of the first electronic device 601, and the address of the first electronic device 601 may be included in an issue field together with IRK1'.

In an embodiment, if the first electronic device 601 receives the IRK (e.g., IRK3) of the third electronic device 603 through the address information field included in the temporary IRK request packet in operation 623, the temporary IRK response packet may include not only IRK1' but also IRK3.

Although operation 633 is illustrated as being performed after operation 631 in FIG. 6, operation 633 may be performed after operation 629.

In operation 635, the third electronic device 603 may add the temporary IRK (e.g., IRK1') and information related to the temporary IRK included in the sharing response packet received from the second electronic device 602 to the resolving list. In an embodiment, the information related to the temporary IRK may include validity period information of the temporary IRK, and may further include any information required to manage the temporary IRK as well as the validity period information of the temporary IRK.

In an embodiment, in operation 625, the first electronic device 601 may determine not to issue the temporary IRK. A case in which the first electronic device 601 determines not to issue the temporary IRK will be described as follows.

In an embodiment, if the requested authority included in the requested authority field included in the temporary IRK request packet is not suitable, the first electronic device 601 may determine not to issue the temporary IRK. For example, if the requested authority included in the requested authority field is authority to request to perform operation A and operation B, and the first electronic device 601 is not capable of permitting performance of operation A and operation B, the first electronic device 601 may determine that the requested authority included in the requested authority field included in the temporary IRK request packet is not suitable, and determine not to issue the temporary IRK.

In an embodiment, if the requested validity period information included in the requested validity period field included in the temporary IRK request packet is not suitable, the first electronic device 601 may determine not to issue the temporary IRK. For example, if a maximum validity period for the temporary IRK which may be set by the first electronic device 601 is time X, and the requested validity period information included in the requested validity period field included in the temporary IRK request packet indicates time Y which exceeds time X, the first electronic device 601 may not support time Y as the validity period for the temporary IRK. In this case, the first electronic device 601 may determine not to issue the temporary IRK.

In an embodiment, if address information (e.g., address information related to an address which the source sharing electronic device will use for a BLE communication with the target sharing electronic device) included in the address information field included in the temporary IRK request packet is not suitable, the first electronic device 601 may determine not to issue the temporary IRK. For example, if the address information included in the address information field included in the temporary IRK request packet is address information managed as a blacklist in the wireless communication network, the first electronic device 601 may determine not to issue the temporary IRK.

In an embodiment, if the first electronic device 601 does not want to share the first electronic device 601 with an electronic device which has not performed a pairing process, the first electronic device 601 may determine not to issue the temporary IRK. For example, if security setting configured in the first electronic device 601 prohibits sharing of the first electronic device 601 with an electronic device which has not performed the BLE pairing process, the first electronic device 601 may determine not to issue the temporary IRK.

The first electronic device 601 determining not to issue the temporary IRK may generate a temporary IRK response packet which is a response packet to the temporary IRK request packet, and transmit the generated temporary IRK response packet to the second electronic device 602 in operation 637. As the first electronic device 601 determines not to issue the temporary IRK, the temporary IRK response packet transmitted by the first electronic device 601 in operation 637 may be different from the temporary IRK response packet transmitted in operation 629, and this will be described as follows.

Firstly, if the temporary IRK response packet is generated based on a structure of a BLE ADV packet, the temporary IRK response packet may be implemented in a form of a temporary IRK response packet illustrated in FIG. 12. However, as the first electronic device 601 determines not to issue the temporary IRK, an issue field 1225 may not include a temporary IRK generated by a target sharing electronic device. According to an embodiment, a bit value of an issue indicator included in the issue field 1225 may be set to 0, and a bit value of a rejection reason indicator included in the issue field 1225 may be set to any one of 00, 01, 10, or 11.

In an embodiment, if a temporary Bluetooth™ IRK issue is rejected, a rejection reason thereof may also be notified. For example, in a case that a rejection reason indicator is implemented with two bits, if a bit value of the rejection reason indicator is 00, it may indicate that IRK sharing is not wanted, if the bit value of the rejection reason indicator is 01, it may indicate that the requested authority is not suitable, if the bit value of the rejection reason indicator is 10, it may indicate that the requested validity period is not suitable, and if the bit value of the rejection reason indicator is 11, it may indicate that an address is not suitable.

In an embodiment, if the first electronic device 601 does not want to share the first electronic device 601 with the electronic device that has not performed the pairing process, the first electronic device 601 may determine not to issue the temporary IRK. For example, if the security setting configured in the first electronic device 601 prohibits sharing of the first electronic device 601 with the electronic device which has not performed the BLE pairing process, the first electronic device 601 may determine not to issue the temporary IRK. In this case, the first electronic device 601 may set the bit value of the issue indicator included in the temporary IRK response packet to 0 and set the bit value of the rejection reason indicator included in the temporary IRK response packet to 00.

In an embodiment, if the requested authority included in the requested authority field included in the temporary IRK request packet is not suitable, the first electronic device 601 may determine not to issue the temporary IRK. In this case, the first electronic device 601 may set the bit value of the issue indicator included in the temporary IRK response packet to 0 and set the bit value of the rejection reason indicator included in the temporary IRK response packet to 01.

In an embodiment, if the requested validity period information included in the requested validity period field included in the temporary IRK request packet is not suitable, the first electronic device 601 may determine not to issue the temporary IRK. For example, if a maximum validity period for the temporary IRK which may be set by the first electronic device 601 is time X, and the requested validity period information included in the requested validity period field included in the temporary IRK request packet indicates time Y which exceeds time X, the first electronic device 601 may not support time Y as the validity period for the temporary IRK. In this case, the first electronic device 601 may determine not to issue the temporary IRK. In this case, the first electronic device 601 may set the bit value of the issue indicator included in the temporary IRK response packet to 0 and set the bit value of the rejection reason indicator included in the temporary IRK response packet to 10.

In an embodiment, if address information (e.g., address information related to an address which the source sharing electronic device will use for a BLE communication with the target sharing electronic device) included in the address information field included in the temporary IRK request packet is not suitable, the first electronic device 601 may determine not to issue the temporary IRK. For example, if the address information included in the address information field included in the temporary IRK request packet is address information managed as a blacklist in the wireless communication network, the first electronic device 601 may determine not to issue the temporary IRK. In this case, the first electronic device 601 may set the bit value of the issue indicator included in the temporary IRK response packet to 0 and set the bit value of the rejection reason indicator included in the temporary IRK response packet to 11.

In an embodiment, as the first electronic device 601 determines not to issue the temporary IRK, the temporary IRK response packet may not include a permitted authority field 1226, a permitted validity period field 1228, and an address information field 1230.

Secondly, if the temporary IRK response packet is generated based on a structure of a data packet, the temporary IRK response packet may be implemented in a form of a temporary IRK response packet illustrated in FIG. 13. However, as the first electronic device 601 determines not to issue the temporary IRK, the bit value of the issue indicator included in the issue field 1225 may be set to 0, and the bit value of the rejection reason indicator included in the issue field 1225 may be set to any one of 00, 01, 10, or 11. The rejection reason indicator may be implemented similarly to the rejection reason indicator of the temporary IRK response packet in FIG. 12 generated based on the BLE ADV packet structure, so a detailed description thereof will be omitted.

In an embodiment, as the first electronic device 601 determines not to issue the temporary IRK, the temporary IRK response packet may not include a permitted authority field 1326, a permitted validity period field 1328, and an address information field 1330.

Upon receiving the temporary IRK response packet from the first electronic device 601, the second electronic device 602 may transmit a sharing response packet which is a response packet to the sharing request packet to the third electronic device 603 in operation 639. As the first electronic device 601 determines not to issue the temporary IRK, the sharing response packet transmitted by the second electronic device 602 in operation 639 may be different from the sharing response packet transmitted in operation 631, and this will be described as follows.

Firstly, if the sharing response packet is generated based on a structure of a BLE ADV packet, the sharing response packet may be implemented in a form of a sharing response packet illustrated in FIG. 14. However, as the first electronic device 601 determines not to issue the temporary IRK, the temporary IRK generated by the target sharing electronic device may not be included in an issue field 1425. According to an embodiment, a bit value of an issue indicator included in the issue field 1425 may be set to 0, and a bit value of a rejection reason indicator included in the issue field 1425 may be set to any one of 00, 01, 10, or 11. In an embodiment, the issue field 1425 included in the sharing response packet may be implemented in a form similar to an issue field included in the temporary IRK response packet, and the issue field included in the temporary IRK response packet has been described above, so a detailed description thereof will be omitted herein. In an embodiment, as the first electronic device 601 determines not to issue the temporary IRK, the sharing response packet may not include a permitted authority field 1426, a permitted validity period field 1428, and an address information field 1430.

Secondly, if the sharing response packet is generated based on a structure of a data packet, the sharing response packet may be implemented in a form of a sharing response packet illustrated in FIG. 15. However, as the first electronic device 601 determines not to issue the temporary IRK, the temporary IRK generated by the target sharing electronic device may not be included in an issue field 1525. According to an embodiment, a bit value of an issue indicator included in the issue field 1525 may be set to 0, and a bit value of a rejection reason indicator included in the issue field 1525 may be set to any one of 00, 01, 10, or 11. In an embodiment, the issue field 1525 included in the sharing response packet may be implemented in a form similar to an issue field included in the temporary IRK response packet, and the issue field included in the temporary IRK response packet has been described above, so a detailed description thereof will be omitted herein.

In an embodiment, as the first electronic device 601 determines not to issue the temporary IRK, the sharing response packet may not include a permitted authority field 1526, a permitted validity period field 1528, and an address information field 1530.

FIG. 7 is a diagram schematically illustrating another example of an IRK sharing process in a wireless communication network according to an embodiment.

Referring to FIG. 7, there may be a plurality of electronic devices (e.g., a first electronic device 701 (e.g., an electronic device 101 in FIG. 1), a second electronic device 702 (e.g., an electronic device 102 in FIG. 1), and a third electronic device 703) in a wireless communication network, and it will be assumed that the first electronic device 701 and the second electronic device 702 among the plurality of electronic devices perform a BLE pairing process.

Operation 711 to operation 723 (e.g., operations 711, 713, 715, 717, 719, 721, and 723) may be implemented similarly to operation 611 to operation 623 described in FIG. 6, and operation 725 to operation 733 (e.g., operations 725, 727, 729, 731, 733) may be implemented similarly to operation 627 to operation 635 described in FIG. 6, so a detailed description thereof will be omitted. In an IRK sharing process illustrated in FIG. 6, if a first electronic device 601 receives a temporary IRK request packet from a second electronic device 602, an operation (e.g., operation 625 in FIG. 6) of determining whether to issue a temporary IRK is performed, however, in FIG. 7, if the first electronic device 701 receives a temporary IRK request packet from the second electronic device 702, a temporary IRK may be issued corresponding to the temporary IRK request packet without performing an operation of determining whether to issue the temporary IRK.

FIG. 16 is a diagram schematically illustrating still another example of an IRK sharing process in a wireless communication network according to an embodiment.

Referring to FIG. 16, a plurality of electronic devices (e.g., a first electronic device 1601 (e.g., an electronic device 101 in FIG. 1) and a second electronic device 1602) and a server 1603 (e.g., a server 108 in FIG. 1) may exist in a wireless communication network, and it will be assumed that an IRK of the first electronic device 1601 is stored in the server 1603. According to an embodiment, the server 1603 may obtain the IRK of the first electronic device 1601 by performing a BLE pairing process with the first electronic device 1601 in advance, or may receive the IRK of the first electronic device 1601 from the first electronic device 1601. An IRK sharing process illustrated in FIG. 16 is the same as an IRK sharing process illustrated in FIG. 6 except that a server performs an operation of an intermediate sharing electronic device instead of a separate electronic device operating as the intermediate sharing electronic device. In this way, instead of the separate electronic device operating as the intermediate sharing electronic device, the server performs the operation of the intermediate sharing electronic device, thereby increasing efficiency of an IRK sharing process for electronic devices registered using the same account.

Operation 1619 to operation 1639 (e.g., operations 1619, 1621, 1623, 1625, 1627, 1629, 1631, 1633, 1635, 1637, 1639) in FIG. 16 may be implemented similarly to operation 619 to operation 639 in FIG. 6, however, the IRK sharing process in FIG. 16 and the IRK sharing process in FIG. 6 may be different only in that the server 1603 operates as the intermediate sharing electronic device in FIG. 16 and a second electronic device 602 operates as the intermediate sharing electronic device in FIG. 6.

In operation 1611, the first electronic device 1601 may generate an IRK of the first electronic device 1601. In the wireless communication network, an IRK may be assigned during a production process of an electronic device or by other methods, or randomly generated. In an embodiment, it will be assumed that the IRK of the first electronic device 1601 is IRK1.

In operation 1615, the second electronic device 1602 may generate an IRK of the second electronic device 1602. In an embodiment, it will be assumed that the IRK of the second electronic device 1602 is IRK2. In operation 1613, the server 1603 may update a resolving list, and the updated resolving list may include the IRK (e.g., IRK1) of the first electronic device 1601 and the IRK (e.g., IRK2) of the second electronic device 1602.

Operation 1619 to operation 1639 may be implemented similarly to operation 719 to operation 739 in FIG. 7, so a detailed description thereof will be omitted.

According to an embodiment, upon detecting that it is requested to issue a temporary IRK according to a sharing request of the server 1603, the first electronic device 1601 may directly issue the temporary IRK to the server 1603, and in this case, operations 1625, 1637, and 1639 may be omitted.

Figure 17:
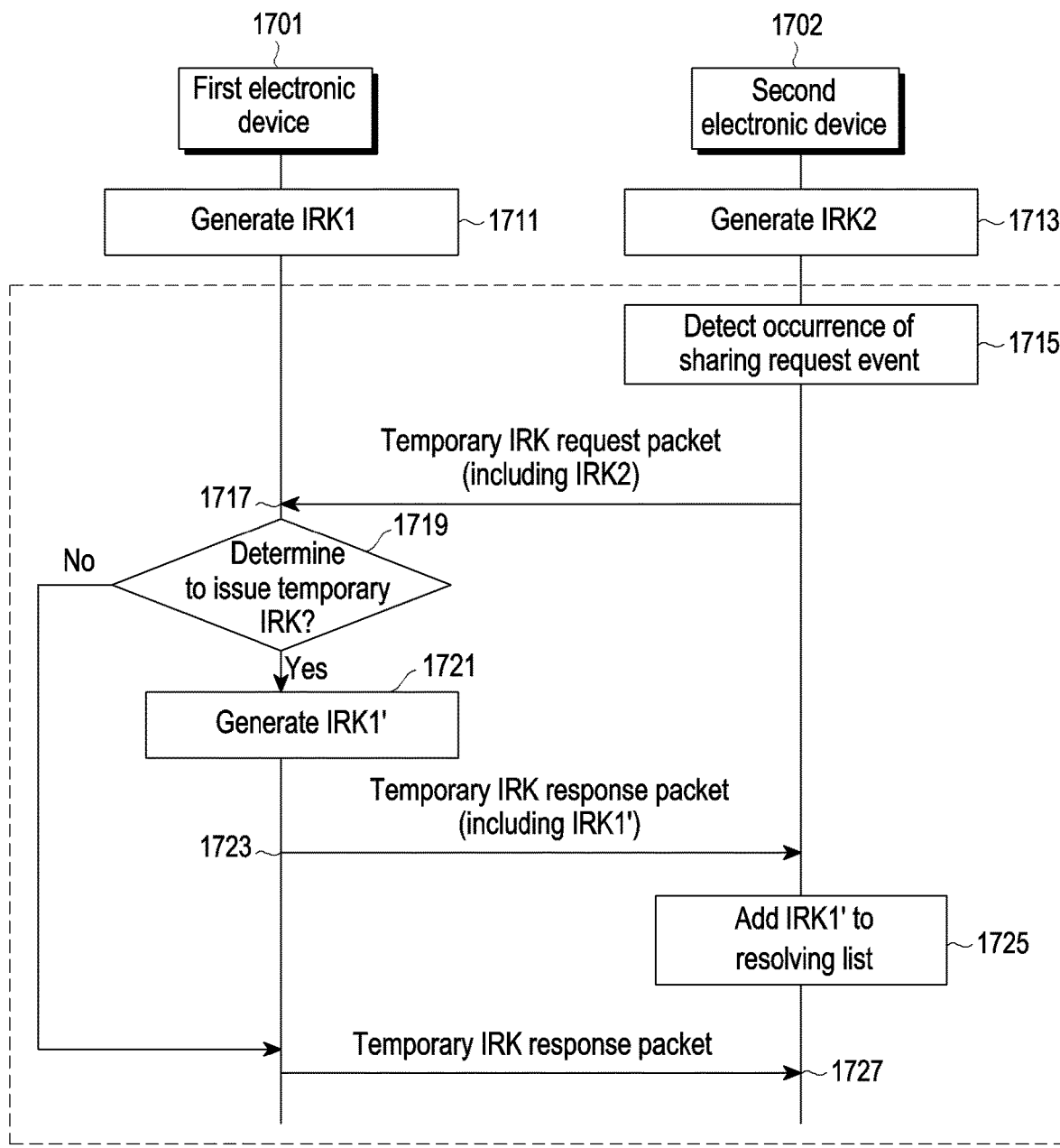
FIG. 17 is a diagram schematically illustrating still another example of an IRK sharing process in a wireless communication network according to an embodiment.

FIG. 17 is a diagram schematically illustrating still another example of an IRK sharing process according to an embodiment.

Referring to FIG. 17, a plurality of electronic devices (e.g., a first electronic device 1701 (e.g., an electronic device 101 in FIG. 1) and a second electronic device 1702) may exist in a wireless communication network. An IRK sharing process illustrated in FIG. 17 may not include an operation by an intermediate sharing electronic device, unlike an IRK sharing process in FIG. 6 and an IRK sharing process in FIG. 16. The IRK sharing process illustrated in FIG. 17 may be an IRK sharing process in a case that a source sharing electronic device directly requests sharing from a target sharing electronic device.

In operation 1711, the first electronic device 1701 may generate an IRK of the first electronic device 1701. In the wireless communication network, an IRK may be assigned during a production process of an electronic device or by other methods, or randomly generated. In an embodiment, it will be assumed that the IRK of the first electronic device 1701 is IRK1. In operation 1713, the second electronic device 1702 may generate an IRK of the second electronic device 1702. In an embodiment, it will be assumed that the IRK of the second electronic device 1702 is IRK2.

In operation 1715, the second electronic device 1702 may detect an event to request to share the first electronic device 1701. In an embodiment, the second electronic device 1702 may detect that the first electronic device 1701 exists through a BLE advertisement process or a Wi-Fi discovery process, or may detect that the first electronic device 1701 exists by receiving information about the first electronic device 1701 through a server or a cloud. As the second electronic device 1702 detects a sharing request event, in operation 1717, the second electronic device 1702 may transmit, to the first electronic device 1701, a temporary IRK request packet for requesting to issue a temporary IRK to share the first electronic device 1701. In an embodiment, the temporary IRK request packet may be implemented as a packet which is based on a BLE scheme or may be implemented as a packet which is based on an OOB scheme. The temporary IRK request packet may include requested authority information related to authority requested by the second electronic device 1702, requested validity period information related to a requested validity period for the temporary IRK, and address information (e.g., IRK2) of the second electronic device 1702. The temporary IRK request packet has been described in FIGS. 10 and 11, so a detailed description thereof will be omitted herein.

Upon receiving the temporary IRK request packet from the second electronic device 1702, the first electronic device 1701 may determine whether to issue the temporary IRK in operation 1719. According to an embodiment, if the first electronic device 1701 detects that it is requested to issue the temporary IRK according to the sharing request of the second electronic device 1702, the first electronic device 1701 may directly issue the temporary IRK to the second electronic device 1702, and in this case, operations 1719 and 1727 may be omitted. If the first electronic device 1701 determines to issue the temporary IRK, in operation 1721, the first electronic device 1701 may generate the temporary IRK of the first electronic device 1701 based on the received temporary IRK request packet. In an embodiment, the temporary IRK of the first electronic device 1701 will be referred to as IRK1'. In an embodiment, a scheme of generating the temporary IRK may be implemented in various forms. According to an embodiment, the temporary IRK may be generated as a random value.

In an embodiment, the first electronic device 1701 may map and store the generated temporary IRK together with information related to the temporary IRK. In an embodiment, the information related to the temporary IRK (e.g., temporary IRK-related information) may include information related to authority which a source sharing electronic device is permitted to have if the source sharing electronic device (e.g., the second electronic device 1702) transmitting the temporary IRK request packet accesses a target sharing electronic device (e.g., the first electronic device 1701), a permitted validity period permitted for the temporary IRK, and an address which the source sharing electronic device will use for a BLE communication with the target sharing electronic device. The temporary IRK-related information has been described in FIG. 6, so a detailed description thereof will be omitted herein.

The first electronic device 1701 which has generated the temporary IRK may generate a temporary IRK response packet which is a response packet to the temporary IRK request packet, and transmit the generated temporary IRK response packet to the second electronic device 1702 in operation 1723. The temporary IRK response packet may be implemented as a packet which based on the BLE scheme, or may be implemented as a packet which is based on the 00B scheme. The temporary IRK response packet may include permitted authority information related to permitted authority which the first electronic device 1701 permits, permitted validity period information related to a permitted valid period permitted for the temporary IRK, and address information (e.g., IRK1') of the first electronic device 1701. The temporary IRK response packet has been described in FIGS. 12 and 13, so a detailed description thereof will be omitted herein.

In operation 1725, the second electronic device 1702 may add the temporary IRK (e.g., IRK1') included in the temporary IRK response packet received from the first electronic device 1701 and information related to the temporary IRK to the resolving list. The resolving list adding operation in operation 1725 may be implemented similarly to a resolving list adding operation in operations 633 and 635 described in FIG. 6, so a detailed description thereof will be omitted.

In an embodiment, in operation 1719, the first electronic device 1701 may determine not to issue the temporary IRK. An operation if the first electronic device 1701 determines not to issue the temporary IRK may be implemented similarly to an operation if a first electronic device 601 determines not to issue a temporary IRK in FIG. 6, so a detailed description thereof will be omitted.

The first electronic device 1701 which has determined not to issue the temporary IRK may generate a temporary IRK response packet which is a response packet to the temporary IRK request packet, and transmit the generated temporary IRK response packet to the second electronic device 1702 in operation 1727. As the first electronic device 1701 determines not to issue the temporary IRK, the temporary IRK response packet transmitted by the first electronic device 1701 may be implemented similarly to a temporary IRK response packet transmitted in operation 637 in FIG. 6, so a detailed description thereof will be omitted.

FIG. 18 is a diagram schematically illustrating an example of a BLE privacy process according to an embodiment.

Referring to FIG. 18, a plurality of electronic devices may exist in a wireless communication network, and it will be assumed that a third electronic device 1803 (e.g., a third electronic device 603 in FIG. 6, a second electronic device 1602 in FIG. 16, or a second electronic device 1702 in FIG. 17) among the plurality of electronic devices has shared an IRK of a first electronic device 1801 (e.g., an electronic device 101 in FIG. 1, a first electronic device 601 in FIG. 6, a first electronic device 1601 in FIG. 16, or a first electronic device 1701 in FIG. 17) through a second electronic device 1802 (e.g., an electronic device 102 in FIG. 1 and a second electronic device 602 in FIG. 6). In an embodiment, the first electronic device 1801 may be a target sharing electronic device, the second electronic device 1802 may be an intermediate sharing electronic device, and the third electronic device 1803 may be a source sharing electronic device.

In an embodiment, the first electronic device 1801 may generate an RPA (e.g., RPA1') based on a temporary IRK (e.g., IRK1') of the first electronic device 1801 in operation 1811.

The second electronic device 1802 may generate an RPA (e.g., RPA2) based on an IRK (e.g., IRK2) of the second electronic device 1802 in operation 1813. According to an embodiment, thereafter, if address information of the second electronic device 1802 included in a connection request packet by the second electronic device 1802 is a BLE public address, a BLE fixed address, or a non-resolvable private address (NRPA), not an RPA, operation 1813 may be omitted.

The third electronic device 1803 may generate an RPA (e.g., RPA3) based on an IRK (e.g., IRK3) of the third electronic device 1803 in operation 1815. According to an embodiment, thereafter, if address information of the third electronic device 1803 included in a connection request packet by the third electronic device 1803 is the BLE public address, the BLE fixed address, or the NRPA, not the RPA, operation 1815 may be omitted.

In operation 1817, the first electronic device 1801 may detect occurrence of a trigger event triggering BLE ADV transmission. The trigger event has been described in operation 417 in FIG. 4, so a detailed description thereof will be omitted herein. Upon detecting the occurrence of the trigger event triggering the BLE ADV transmission, the first electronic device 1801 may transmit a BLE ADV packet including RPA1' in operation 1819. In an embodiment, the first electronic device 1801 may broadcast the BLE ADV packet including RPA1'.

In operation 1821, the second electronic device 1802 may receive the BLE ADV packet. The second electronic device 1802 may resolve the RPA included in the received BLE ADV packet based on IRKs included in a resolving list managed by the second electronic device 1802. An operation of resolving the RPA included in the received BLE ADV packet based on the IRKs included in the resolving list managed by the second electronic device 1802 may be implemented similarly to an RPA resolving process described in FIG. 5, so a detailed description thereof will be omitted. The second electronic device 1802 may detect an electronic device (e.g., the first electronic device 1801) transmitting the BLE ADV packet based on the resolved RPA.

In operation 1823, the third electronic device 1803 may receive the BLE ADV packet. The third electronic device 1803 may resolve the RPA included in the received BLE ADV packet based on IRKs included in a resolving list managed by the third electronic device 1803. An operation of resolving the RPA included in the received BLE ADV packet based on the IRKs included in the resolving list managed by the third electronic device 1803 may be implemented similarly to an RPA resolving process described in FIG. 5, so a detailed description thereof will be omitted. The third electronic device 1803 may detect an electronic device (e.g., the first electronic device 1801) transmitting the BLE ADV packet based on the resolved RPA.

If the second electronic device 1802, detecting that the electronic device which transmits the BLE ADV packet is the first electronic device 1801, needs to be connected to the first electronic device 1801, the second electronic device 1802 may transmit, to the first electronic device 1801, a connection request packet including the RPA (e.g., RPA2) of the second electronic device 1802 in operation 1825. In FIG. 18, a case that the address information of the second electronic device 1802 included in the connection request packet is the RPA has been described, however, the address information of the second electronic device 1802 may be the BLE public address, the BLE fixed address, or the NRPA. Upon receiving the connection request packet from the second electronic device 1802, the first electronic device 1801 may resolve an RPA included in the received connection request packet based on IRKs included in a resolving list managed by the first electronic device 1801 in operation 1827. An operation of resolving the RPA included in the received connection request packet based on the IRKs included in the resolving list managed by the first electronic device 1801 may be implemented similarly to the RPA resolving process described in FIG. 5, so a detailed description thereof will be omitted. The first electronic device 1801 may detect an electronic device (e.g., the second electronic device 1802) transmitting the connection request packet based on the resolved RPA. The first electronic device 1801 may set authority for the second electronic device 1802 in operation 1827. In operation 1827, the first electronic device 1801 may set permitted authority permitted for the second electronic device 1802.

If the third electronic device 1803, detecting that the electronic device which transmits the BLE ADV packet is the first electronic device 1801, needs to be connected to the first electronic device 1801, the third electronic device 1803 may transmit, to the first electronic device 1801, a connection request packet including the RPA (e.g., RPA3) of the third electronic device 1803 in operation 1829. In FIG. 18, a case that the address information of the third electronic device 1803 included in the connection request packet is the RPA has been described, however, the address information of the third electronic device 1803 may be the BLE public address, the BLE fixed address, or the NRPA. Upon receiving the connection request packet from the third electronic device 1803, the first electronic device 1801 may resolve an RPA included in the received connection request packet based on the IRKs included in the resolving list managed by the first electronic device 1801 in operation 1831. An operation of resolving the RPA included in the received connection request packet based on the IRKs included in the resolving list managed by the first electronic device 1801 may be implemented similarly to the RPA resolving process described in FIG. 5, so a detailed description thereof will be omitted. The first electronic device 1801 may detect an electronic device (e.g., the third electronic device 1803) transmitting the connection request packet based on the resolved RPA. The first electronic device 1801 may set authority for the third electronic device 1803 in operation 1831. In operation 1831, the first electronic device 1801 may set permitted authority permitted for the third electronic device 1803.

The first electronic device 1801, the second electronic device 1802, and the third electronic device 1803 may detect that a validity period of the temporary IRK of the first electronic device 1801 has expired, and in operation 1833, the first electronic device 1801, the second electronic device 1802, and the third electronic device 1803 may delete the temporary IRK of the first electronic device 1801 and the RPA which is generated based on the temporary IRK of the first electronic device 1801. According to an embodiment, if the first electronic device 1801, the second electronic device 1802, and the third electronic device 1803 are managed by a server (not shown), the server may identify that the validity period of the temporary IRK of the first electronic device 1801 has expired, and in this case, the server may request to delete the temporary IRK of the first electronic device 1801 from the second electronic device 1802 and the third electronic device 1803. According to an embodiment, even though the validity period of the temporary IRK of the first electronic device 1801 has expired, the first electronic device 1801, the second electronic device 1802, and the third electronic device 1803 may retain the temporary IRK of the first electronic device 1801 without deleting the temporary IRK of the first electronic device 1801.

In operation 1835, the first electronic device 1801 may detect occurrence of a trigger event triggering BLE ADV transmission. The trigger event has been described in operation 417 in FIG. 4, so a detailed description thereof will be omitted herein.

As the first electronic device 1801 detects the occurrence of the trigger event triggering the BLE ADV transmission, in operation 1837, the first electronic device 1801 may generate an RPA (e.g., RPA1) based on an IRK (e.g., IRK1) of the first electronic device 1801. Because the validity period of the temporary IRK has expired, the first electronic device 1801 may generate the RPA based on the IRK. According to an embodiment, even though the validity period of the temporary IRK of the first electronic device 1801 does not expire, if necessary, the first electronic device 1801 may generate an RPA based on the IRK, not the temporary IRK, and transmit a BLE ADV packet including the generated RPA. In operation 1839, the first electronic device 1801 may transmit a BLE ADV packet including RPA1. In an embodiment, the first electronic device 1801 may broadcast the BLE ADV packet including RPA1.

In operation 1841, the second electronic device 1802 may receive the BLE ADV packet. The second electronic device 1802 may resolve the RPA included in the received BLE ADV packet based on IRKs included in a resolving list managed by the second electronic device 1802. An operation of resolving the RPA included in the received BLE ADV packet based on the IRKs included in the resolving list managed by the second electronic device 1802 may be implemented similarly to an RPA resolving process described in FIG. 5, so a detailed description thereof will be omitted. The second electronic device 1802 may detect an electronic device (e.g., the first electronic device 1801) transmitting the BLE ADV packet based on the resolved RPA.

In operation 1843, the third electronic device 1803 may receive the BLE ADV packet. The third electronic device 1803 may try to resolve the RPA included in the received BLE ADV packet based on IRKs included in a resolving list managed by the third electronic device 1803. An operation of resolving the RPA included in the received BLE ADV packet based on the IRKs included in the resolving list managed by the third electronic device 1803 may be implemented similarly to an RPA resolving process described in FIG. 5, so a detailed description thereof will be omitted. Because the resolving list does not include the IRK of the first electronic device 1801, the third electronic device 1803 may not resolve the RPA included in the received BLE ADV packet, and may not detect an electronic device (e.g., the first electronic device 1801) transmitting the BLE ADV packet.

In FIG. 18, a case that the first electronic device 1801 includes the RPA generated based on the temporary IRK in the BLE ADV packet before the validity period of the temporary IRK expires has been described, however, the first electronic device 1801 may include the RPA generated based on the IRK in the BLE ADV packet even before the validity period of the temporary IRK expires.

Figure 19:
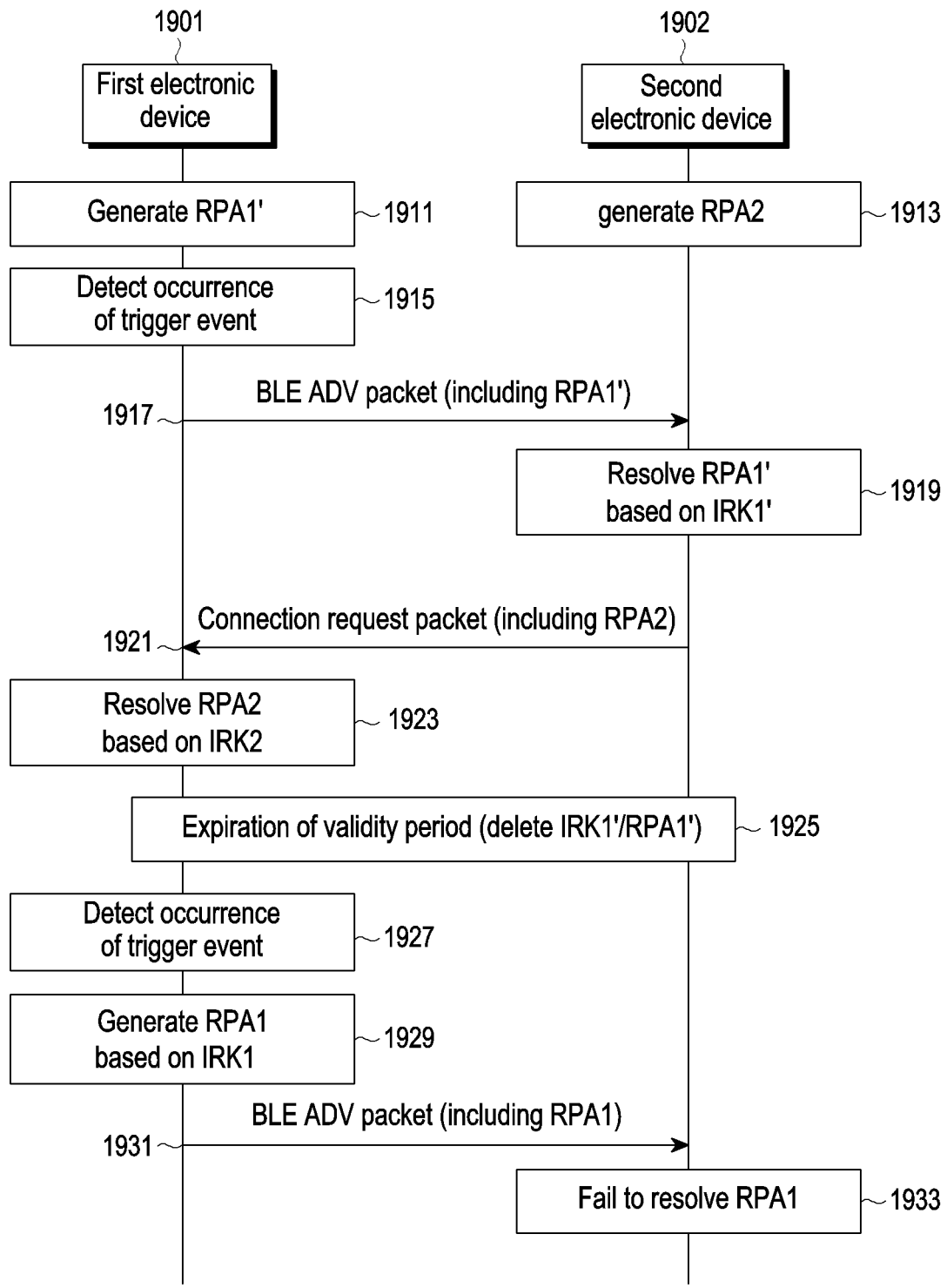
FIG. 19 is a diagram schematically illustrating another example of a BLE privacy process according to an embodiment.

FIG. 19 is a diagram schematically illustrating another example of a BLE privacy process according to an embodiment.

Referring to FIG. 19, a plurality of electronic devices may exist in a wireless communication network, and it will be assumed that a second electronic device 1902 (e.g., a third electronic device 603 in FIG. 6, a second electronic device 1602 in of FIG. 16, or a second electronic device 1702 in of FIG. 17) among the plurality of electronic devices shares an IRK of a first electronic device 1901 (e.g., an electronic device 101 in FIG. 1, a first electronic device 601 in FIG. 6, a first electronic device 1601 in FIG. 16, or a first electronic device 1701 in FIG. 17) without going through a separate intermediate sharing electronic device. In an embodiment, the first electronic device 1901 may be a target sharing electronic device, and the second electronic device 1902 may be a source sharing electronic device.

There is no electronic device operating as an intermediate sharing electronic device, so a BLE privacy process illustrated in FIG. 19 may be the same as a BLE privacy process illustrated in FIG. 18 except that only the first electronic device 1901 and the second electronic device 1902 perform the BLE privacy process. Specifically, operations 1911, 1913, 1915, 1917, 1919, 1921, 1923, 1925, 1927, 1929, 1931, and 1933 in FIG. 19 may be implemented similarly to operations 1811, 1815, 1817, 1819, 1823, 1829, 1831, 1833, 1835, 1837, 1839, and 1843 of FIG. 18, so a detailed description thereof will be omitted.

According to an embodiment of the disclosure, an operating method performed by an electronic device (e.g., a first electronic device 601 in FIG. 6, a first electronic device 701 in FIG. 7, a first electronic device 1601 in FIG. 16, or a first electronic device 1801 in FIG. 18) may include connecting a communication with a first external electronic device (e.g., a second electronic device 602 in FIG. 6, a second electronic device 702 in FIG. 7, a server 1603 in FIG. 16, or a second electronic device 1802 in FIG. 18).

According to an embodiment of the disclosure, the operating method may further include receiving, from the first external electronic device (e.g., the second electronic device 602 in FIG. 6, the second electronic device 702 in FIG. 7, the server 1603 in FIG. 16, or the second electronic device 1802 in FIG. 18), a first packet requesting generation of a temporary identity resolving key (IRK) of the electronic device (e.g., the first electronic device 601 in FIG. 6, the first electronic device 701 in FIG. 7, the first electronic device 1601 in FIG. 16, or the first electronic device 1801 in FIG. 18) by a second external electronic device (e.g., a third electronic device 603 in FIG. 6, a third electronic device 703 in FIG. 7, a second electronic device 1602 in FIG. 16, or a third electronic device 1803 in FIG. 18).

According to an embodiment of the disclosure, the operating method may further include generating a temporary IRK, setting a validity period for the temporary IRK.

According to an embodiment of the disclosure, the operating method may further include transmitting, to the first external electronic device (e.g., the second electronic device 602 in FIG. 6, the second electronic device 702 in FIG. 7, the server 1603 in FIG. 16, or the second electronic device 1802 in FIG. 18), a second packet including the temporary IRK and the validity period for the temporary IRK.

According to an embodiment of the disclosure, setting the validity period for the temporary IRK may include setting the validity period for the temporary IRK based on a validity period for the temporary IRK which is included in the first packet and is requested by the second external electronic device (e.g., the third electronic device 603 in FIG. 6, the third electronic device 703 in FIG. 7, the second electronic device 1602 in FIG. 16, or the third electronic device 1803 in FIG. 18).

According to an embodiment of the disclosure, the operating method may further include, based on information, which is included in the first packet, related to an authority which the second external electronic device (e.g., the third electronic device 603 in FIG. 6, the third electronic device 703 in FIG. 7, the second electronic device 1602 in FIG. 16, or the third electronic device 1803 in FIG. 18) requests to have if the second external electronic device (e.g., the third electronic device 603 in FIG. 6, the third electronic device 703 in FIG. 7, the second electronic device 1602 in FIG. 16, or the third electronic device 1803 in FIG. 18) accesses the electronic device (e.g., the first electronic device 601 in FIG. 6, the first electronic device 701 in FIG. 7, the first electronic device 1601 in FIG. 16, or the first electronic device 1801 in FIG. 18), setting authority which the second external electronic device (e.g., the third electronic device 603 in FIG. 6, the third electronic device 703 in FIG. 7, the second electronic device 1602 in FIG. 16, or the third electronic device 1803 in FIG. 18) is permitted to have if the second external electronic device (e.g., the third electronic device 603 in FIG. 6, the third electronic device 703 in FIG. 7, the second electronic device 1602 in FIG. 16, or the third electronic device 1803 in FIG. 18) accesses the electronic device (e.g., the first electronic device 601 in FIG. 6, the first electronic device 701 in FIG. 7, the first electronic device 1601 in FIG. 16, or the first electronic device 1801 in FIG. 18), and the second packet may further include information related to the authority which the second external electronic device (e.g., the third electronic device 603 in FIG. 6, the third electronic device 703 in FIG. 7, the second electronic device 1602 in FIG. 16, or the third electronic device 1803 in FIG. 18) is permitted to have if the second external electronic device (e.g., the third electronic device 603 in FIG. 6, the third electronic device 703 in FIG. 7, the second electronic device 1602 in FIG. 16, or the third electronic device 1803 in FIG. 18) accesses the electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the operating method may further include, based on a first address, which is included in the first packet, to be used for a communication with the electronic device (e.g., the first electronic device 601 in FIG. 6, the first electronic device 701 in FIG. 7, the first electronic device 1601 in FIG. 16, or the first electronic device 1801 in FIG. 18) by the second external electronic device (e.g., the third electronic device 603 in FIG. 6, the third electronic device 703 in FIG. 7, the second electronic device 1602 in FIG. 16, or the third electronic device 1803 in FIG. 18), setting a second address to be used for the communication with the electronic device (e.g., the first electronic device 601 in FIG. 6, the first electronic device 701 in FIG. 7, the first electronic device 1601 in FIG. 16, or the first electronic device 1801 in FIG. 18) by the second external electronic device (e.g., the third electronic device 603 in FIG. 6, the third electronic device 703 in FIG. 7, the second electronic device 1602 in FIG. 16, or the third electronic device 1803 in FIG. 18), and the second packet may further include the second address to be used for the communication with the electronic device (e.g., the first electronic device 601 in FIG. 6, the first electronic device 701 in FIG. 7, the first electronic device 1601 in FIG. 16, or the first electronic device 1801 in FIG. 18) by the second external electronic device (e.g., the third electronic device 603 in FIG. 6, the third electronic device 703 in FIG. 7, the second electronic device 1602 in FIG. 16, or the third electronic device 1803 in FIG. 18).

According to an embodiment of the disclosure, the operating method may further include, detecting that a trigger event triggering advertisement packet transmission occurs, generating an advertisement packet including a resolvable private address (RPA) generated based on the temporary IRK, and transmitting the advertisement packet.

According to an embodiment of the disclosure, the operating method may further include deleting the temporary IRK based on identifying that the validity period for the temporary IRK has expired.

According to an embodiment of the disclosure, an operating method performed by an electronic device (e.g., a second electronic device 602 in FIG. 6, a second electronic device 702 in FIG. 7, a server 1603 in FIG. 16, or a second electronic device 1802 in FIG. 18) may include connecting a communication with a first external electronic device (e.g., a third electronic device 603 in FIG. 6, a third electronic device 703 in FIG. 7, a second electronic device 1602 in FIG. 16, or a third electronic device 1803 in FIG. 18) and a second external electronic device (e.g., a first electronic device 601 in FIG. 6, a first electronic device 701 in FIG. 7, a first electronic device 1601 in FIG. 16, or a first electronic device 1801 in FIG. 18).

According to an embodiment of the disclosure, the operating method may further include receiving, from the first external electronic device (e.g., the third electronic device 603 in FIG. 6, the third electronic device 703 in FIG. 7, the second electronic device 1602 in FIG. 16, or the third electronic device 1803 in FIG. 18), a first packet requesting generation of a temporary identity resolving key (IRK) of the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the operating method may further include transmitting, to the second external electronic device (e.g., the first electronic device 601 in FIG. 6, the first electronic device 701 in FIG. 7, the first electronic device 1601 in FIG. 16, or the first electronic device 1801 in FIG. 18), a second packet requesting generation of the temporary IRK by the first external electronic device (e.g., the third electronic device 603 in FIG. 6, the third electronic device 703 in FIG. 7, the second electronic device 1602 in FIG. 16, or the third electronic device 1803 in FIG. 18).

According to an embodiment of the disclosure, the operating method may further include receiving, from the second external electronic device (e.g., the first electronic device 601 in FIG. 6, the first electronic device 701 in FIG. 7, the first electronic device 1601 in FIG. 16, or the first electronic device 1801 in FIG. 18), a third packet including the temporary IRK of the second external electronic device (e.g., the first electronic device 601 in FIG. 6, the first electronic device 701 in FIG. 7, the first electronic device 1601 in FIG. 16, or the first electronic device 1801 in FIG. 18) and a validity period for the temporary IRK.

According to an embodiment of the disclosure, the operating method may further include transmitting, to the first external electronic device (e.g., the third electronic device 603 in FIG. 6, the third electronic device 703 in FIG. 7, the second electronic device 1602 in FIG. 16, or the third electronic device 1803 in FIG. 18), a fourth packet including the temporary IRK and the validity period for the temporary IRK.

According to an embodiment of the disclosure, the operating method may further include mapping an IRK of the second external electronic device (e.g., the first electronic device 601 in FIG. 6, the first electronic device 701 in FIG. 7, the first electronic device 1601 in FIG. 16, or the first electronic device 1801 in FIG. 18) and the temporary IRK and storing a mapped result.

According to an embodiment of the disclosure, the operating method may further include receiving an advertisement packet, and if a resolvable private address (RPA) included in the advertisement packet is resolvable based on the temporary IRK, identifying that the advertisement packet is an advertisement packet transmitted by the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the operating method may further include deleting the temporary IRK based on identifying that the validity period for the temporary IRK has expired.

According to an embodiment of the disclosure, the validity period for the temporary IRK included in the third packet may be set based on a validity period for the temporary IRK requested by the first external electronic device (e.g., the third electronic device 603 in FIG. 6, the third electronic device 703 in FIG. 7, the second electronic device 1602 in FIG. 16, or the third electronic device 1803 in FIG. 18) included in the first packet.

According to an embodiment of the disclosure, the third packet may further include information related to authority which the first external electronic device (e.g., the third electronic device 603 in FIG. 6, the third electronic device 703 in FIG. 7, the second electronic device 1602 in FIG. 16, or the third electronic device 1803 in FIG. 18) is permitted to have if the first external electronic device (e.g., the third electronic device 603 in FIG. 6, the third electronic device 703 in FIG. 7, the second electronic device 1602 in FIG. 16, or the third electronic device 1803 in FIG. 18) accesses the second external electronic device (e.g., the first electronic device 601 in FIG. 6, the first electronic device 701 in FIG. 7, the first electronic device 1601 in FIG. 16, or the first electronic device 1801 in FIG. 18), and the information may be set based on information, which is included in the first packet, related to authority which the first external electronic device (e.g., the third electronic device 603 in FIG. 6, the third electronic device 703 in FIG. 7, the second electronic device 1602 in FIG. 16, or the third electronic device 1803 in FIG. 18) requests to have if the first external electronic device (e.g., the third electronic device 603 in FIG. 6, the third electronic device 703 in FIG. 7, the second electronic device 1602 in FIG. 16, or the third electronic device 1803 in FIG. 18) accesses the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the third packet may further include a first address to be used by the first external electronic device (e.g., the third electronic device 603 in FIG. 6, the third electronic device 703 in FIG. 7, the second electronic device 1602 in FIG. 16, or the third electronic device 1803 in FIG. 18) for a communication with the second external electronic device (e.g., the first electronic device 601 in FIG. 6, the first electronic device 701 in FIG. 7, the first electronic device 1601 in FIG. 16, or the first electronic device 1801 in FIG. 18), and the first address may be set based on a second address, which is included in the first packet, to be used by the first external electronic device (e.g., the third electronic device 603 in FIG. 6, the third electronic device 703 in FIG. 7, the second electronic device 1602 in FIG. 16, or the third electronic device 1803 in FIG. 18) for the communication with the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, an operating method performed by an electronic device (e.g., a third electronic device 603 in FIG. 6, a third electronic device 703 in FIG. 7, a second electronic device 1602 in FIG. 16, or a third electronic device 1803 in FIG. 18) may include connecting a communication with a first external electronic device (e.g., a second electronic device 602 in FIG. 6, a second electronic device 702 in FIG. 7, a server 1603 in FIG. 16, or a second electronic device 1802 in FIG. 18).

According to an embodiment of the disclosure, the operating method may further include transmitting, to the first external electronic device (e.g., the second electronic device 602 in FIG. 6, the second electronic device 702 in FIG. 7, the server 1603 in FIG. 16, or the second electronic device 1802 in FIG. 18), a first packet requesting generation of a temporary identity resolving key (IRK) of a second external electronic device (e.g., a first electronic device 601 in FIG. 6, a first electronic device 701 in FIG. 7, a first electronic device 1601 in FIG. 16, or a first electronic device 1801 in FIG. 18).

According to an embodiment of the disclosure, the operating method may further include receiving, from the first external electronic device (e.g., the second electronic device 602 in FIG. 6, the second electronic device 702 in FIG. 7, the server 1603 in FIG. 16, or the second electronic device 1802 in FIG. 18), a second packet including the temporary IRK of the second external electronic device (e.g., the first electronic device 601 in FIG. 6, the first electronic device 701 in FIG. 7, the first electronic device 1601 in FIG. 16, or the first electronic device 1801 in FIG. 18) and a validity period for the temporary IRK.

According to an embodiment of the disclosure, the operating method may further include receiving an advertisement packet, and in response to identifying that a resolvable private address (RPA) included in the advertisement packet is resolvable based on the temporary IRK, identifying that the advertisement packet is an advertisement packet transmitted by the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the operating method may further include deleting the temporary IRK based on identifying that the validity period for the temporary IRK has expired.

According to an embodiment of the disclosure, the validity period for the temporary IRK may be set based on a validity period for the temporary IRK requested by the electronic device (e.g., the third electronic device 603 in FIG. 6, the third electronic device 703 in FIG. 7, the second electronic device 1602 in FIG. 16, or the third electronic device 1803 in FIG. 18) included in the first packet.

According to an embodiment of the disclosure, the second packet may further include information related to an authority which the electronic device (e.g., the third electronic device 603 in FIG. 6, the third electronic device 703 in FIG. 7, the second electronic device 1602 in FIG. 16, or the third electronic device 1803 in FIG. 18) is permitted to have if the electronic device (e.g., the third electronic device 603 in FIG. 6, the third electronic device 703 in FIG. 7, the second electronic device 1602 in FIG. 16, or the third electronic device 1803 in FIG. 18) accesses the second external electronic device (e.g., the first electronic device 601 in FIG. 6, the first electronic device 701 in FIG. 7, the first electronic device 1601 in FIG. 16, or the first electronic device 1801 in FIG. 18), and the information may be set based on information, which is included in the first packet, related to authority which the electronic device (e.g., the third electronic device 603 in FIG. 6, the third electronic device 703 in FIG. 7, the second electronic device 1602 in FIG. 16, or the third electronic device 1803 in FIG. 18) requests to have if the electronic device (e.g., the third electronic device 603 in FIG. 6, the third electronic device 703 in FIG. 7, the second electronic device 1602 in FIG. 16, or the third electronic device 1803 in FIG. 18) accesses the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the second packet may further include a first address to be used by the electronic device (e.g., the third electronic device 603 in FIG. 6, the third electronic device 703 in FIG. 7, the second electronic device 1602 in FIG. 16, or the third electronic device 1803 in FIG. 18) for a communication with the second external electronic device (e.g., the first electronic device 601 in FIG. 6, the first electronic device 701 in FIG. 7, the first electronic device 1601 in FIG. 16, or the first electronic device 1801 in FIG. 18), and the first address may be set based on a second address, which is included in the first packet, to be used by the electronic device (e.g., the third electronic device 603 in FIG. 6, the third electronic device 703 in FIG. 7, the second electronic device 1602 in FIG. 16, or the third electronic device 1803 in FIG. 18) for the communication with the second external electronic device (e.g., the first electronic device 601 in FIG. 6, the first electronic device 701 in FIG. 7, the first electronic device 1601 in FIG. 16, or the first electronic device 1801 in FIG. 18).

According to an embodiment of the disclosure, the temporary IRK may be different from an IRK of the second external electronic device (e.g., the first electronic device 601 in FIG. 6, the first electronic device 701 in FIG. 7, the first electronic device 1601 in FIG. 16, or the first electronic device 1801 in FIG. 18).

What is claimed is:
1. An electronic device, comprising:
memory storing instructions;
a communication circuit; and
at least one processor operatively connected to the communication circuit and the memory, wherein the instructions, when executed by the at least one processor, cause the electronic device to:

connect, via the communication circuit, a communication with a first external electronic device;
receive, from the first external electronic device via the communication circuit, a first packet for generation of a temporary identity resolving key (IRK) of the electronic device wherein the generation of the IRK is requested by a second external electronic device, and the first packet includes a requested validity period for the temporary IRK;
generate the temporary IRK of the electronic device based on receiving the first packet;
set a validity period for the temporary IRK of the electronic device based on the requested validity period; and
transmit, to the first external electronic device via the communication circuit, a second packet including the temporary IRK of the electronic device and the validity period for the temporary IRK of the electronic device.

2. The electronic device of claim 1, wherein the instructions, when executed by the at least one processor, cause the electronic device to;
based on information, which is included in the first packet, related to an authority which the second external electronic device requests to have if the second external electronic device accesses the electronic device, set an authority which the second external electronic device is permitted to have if the second external electronic device accesses the electronic device, and
wherein the second packet further includes information related to the authority which the second external electronic device is permitted to have if the second external electronic device accesses the electronic device.

3. The electronic device of claim 1, wherein the instructions, when executed by the at least one processor, cause the electronic device to:
based on a first address, which is included in the first packet, to be used for a communication with the electronic device by the second external electronic device, set a second address to be used for the communication with the electronic device by the second external electronic device, and
wherein the second packet further includes the second address to be used for the communication with the electronic device by the second external electronic device.

4. The electronic device of claim 1, wherein the instructions, when executed by the at least one processor, cause the electronic device to:
detect that a trigger event triggering an advertisement packet transmission occurs;
generate an advertisement packet including a resolvable private address (RPA) generated based on the temporary IRK; and
transmit, via the communication circuit, the advertisement packet.

5. The electronic device of claim 1, wherein the instructions, when executed by the at least one processor, cause the electronic device to:
delete the temporary IRK based on identifying that the validity period for the temporary IRK has expired.

6. An electronic device, comprising:
memory storing instructions;
a communication circuit; and
at least one processor operatively connected to the communication circuit and the memory, wherein the instructions, when executed by the at least one processor, cause the electronic device to:
connect, via the communication circuit, a communication with a first external electronic device and a second external electronic device;
receive, from the first external electronic device via the communication circuit, a first packet requesting generation of a temporary identity resolving key (IRK) of the second external electronic device, wherein the first packet includes a requested validity period for the temporary IRK;
based on receiving the first packet, transmit, to the second external electronic device via the communication circuit, a second packet requesting generation of the temporary IRK of the second external electronic device, wherein the first packet includes a requested validity period for the temporary IRK;
receive, from the second external electronic device via the communication circuit, a third packet including the temporary IRK of the second external electronic device and a validity period for the temporary IRK of the second external electronic device, wherein the validity period for the temporary IRK of the second external electronic device is set based on the requested validity period; and
transmit, to the first external electronic device via the communication circuit, a fourth packet including the temporary IRK of the second external electronic device and the validity period for the temporary IRK of the second external electronic device.

7. The electronic device of claim 6,
wherein the instructions, when executed by the at least one processor, cause the electronic device to:
map an IRK of the second external electronic device and the temporary IRK and store a mapped result in the memory.

8. The electronic device of claim 6, wherein the instructions, when executed by the at least one processor, cause the electronic device to:
receive, via the communication circuit, an advertisement packet; and
in response to identifying that a resolvable private address (RPA) included in the advertisement packet is resolvable based on the temporary IRK, identify that the advertisement packet is an advertisement packet transmitted by the second external electronic device.

9. The electronic device of claim 6, wherein the instructions, when executed by the at least one processor, cause the electronic device to:
delete the temporary IRK based on identifying that the validity period for the temporary IRK has expired.

10. The electronic device of claim 6, wherein the third packet further includes information related to an authority which the first external electronic device is permitted to have if the first external electronic device accesses the second external electronic device, and
wherein the information is set based on information, which is included in the first packet, related to an authority which the first external electronic device requests to have if the first external electronic device accesses the second external electronic device.

11. The electronic device of claim 6, wherein the third packet further includes a first address to be used by the first external electronic device for a communication with the second external electronic device, and
wherein the first address is set based on a second address, which is included in the first packet, to be used by the first external electronic device for the communication with the second external electronic device.

12. An electronic device, comprising:
   memory storing instructions;
   a communication circuit; and
   at least one processor operatively connected to the communication circuit and the memory, wherein the instructions, when executed by the at least one processor, cause the electronic device to:
      connect, via the communication circuit, a communication with a first external electronic device;
      transmit, to the first external electronic device via the communication circuit, a first packet requesting generation of a temporary identity resolving key (IRK) of a second external electronic device, wherein the first packet includes a requested validity period for the temporary IRK; and
      receive, from the first external electronic device via the communication circuit, a second packet including the temporary IRK of the second external electronic device and a validity period for the temporary IRK of the second external electronic device,
      wherein the validity period for the temporary IRK of the second external electronic device is set based on the requested validity period.

13. The electronic device of claim 12, wherein the instructions, when executed by the at least one processor, cause the electronic device to:
   receive, via the communication circuit, an advertisement packet, and
   in response to identifying that a resolvable private address (RPA) included in the advertisement packet is resolvable based on the temporary IRK, identify that the advertisement packet is an advertisement packet transmitted by the second external electronic device.

14. The electronic device of claim 12, wherein the instructions, when executed by the at least one processor, cause the electronic device to:
   delete the temporary IRK based on identifying that the validity period for the temporary IRK has expired.

15. The electronic device of claim 12, wherein the second packet further includes information related to an authority which the electronic device is permitted to have if the electronic device accesses the second external electronic device, and
   wherein the information is set based on information, which is included in the first packet, related to an authority which the electronic device requests to have if the electronic device accesses the second external electronic device.

16. The electronic device of claim 12, wherein the second packet further includes a first address to be used by the electronic device for a communication with the second external electronic device, and
   wherein the first address is set based on a second address, which is included in the first packet, to be used by the electronic device for the communication with the second external electronic device.

17. The electronic device of claim 12, wherein the temporary IRK is different from an IRK of the second external electronic device.

* * * * *